US012807745B2

(12) United States Patent
Issari et al.

(10) Patent No.: US 12,807,745 B2
(45) Date of Patent: Nov. 24, 2026

(54) ISOCYANURATE RESIN COMPOSITIONS

(71) Applicant: Divergent Technologies, Inc., Los Angeles, CA (US)

(72) Inventors: Bahram Issari, Los Angeles, CA (US); Lukas Philip Czinger, Santa Monica, CA (US); Michael Thomas Kenworthy, Rancho Palos Verdes, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 115 days.

(21) Appl. No.: 17/527,101

(22) Filed: Nov. 15, 2021

(65) Prior Publication Data

US 2022/0153918 A1 May 19, 2022

Related U.S. Application Data

(60) Provisional application No. 63/114,951, filed on Nov. 17, 2020.

(51) Int. Cl.

| | |
|---|---|
| ***C08F 2/46*** | (2006.01) |
| ***C08F 2/50*** | (2006.01) |
| ***C08F 126/06*** | (2006.01) |
| ***C08G 61/04*** | (2006.01) |
| ***C08K 3/01*** | (2018.01) |
| ***C08K 3/013*** | (2018.01) |
| ***C08K 3/014*** | (2018.01) |

(52) U.S. Cl.

CPC .............. *C08F 126/06* (2013.01); *C08K 3/01* (2018.01); *C08K 3/013* (2018.01); *C08K 3/014* (2018.01)

(58) Field of Classification Search

CPC .......... C08K 3/01; C08K 3/013; C08K 3/014; C09J 133/14; C08F 126/06; C08G 18/792; C08G 18/8175

USPC ................. 522/33, 6, 189, 184, 71, 1; 520/1

See application file for complete search history.

(56) References Cited

U.S. PATENT DOCUMENTS

| | | | | |
|---|---|---|---|---|
| 4,652,274 | A * | 3/1987 | Boettcher | B24D 3/30 51/293 |
| 5,203,226 | A | 4/1993 | Hongou et al. | |
| 5,742,385 | A | 4/1998 | Champa | |
| 5,990,444 | A | 11/1999 | Costin | |
| 6,010,155 | A | 1/2000 | Rinehart | |
| 6,096,249 | A | 8/2000 | Yamaguchi | |
| 6,140,602 | A | 10/2000 | Costin | |
| 6,250,533 | B1 | 6/2001 | Otterbein et al. | |
| 6,252,196 | B1 | 6/2001 | Costin et al. | |
| 6,318,642 | B1 | 11/2001 | Goenka et al. | |
| 6,365,057 | B1 | 4/2002 | Whitehurst et al. | |
| 6,391,251 | B1 | 5/2002 | Keicher et al. | |
| 6,409,930 | B1 | 6/2002 | Whitehurst et al. | |
| 6,468,439 | B1 | 10/2002 | Whitehurst et al. | |
| 6,554,345 | B2 | 4/2003 | Jonsson | |
| 6,585,151 | B1 | 7/2003 | Ghosh | |
| 6,644,721 | B1 | 11/2003 | Miskech et al. | |
| 6,811,744 | B2 | 11/2004 | Keicher et al. | |
| 6,866,497 | B2 | 3/2005 | Saiki | |
| 6,919,035 | B1 | 7/2005 | Clough | |
| 6,926,970 | B2 | 8/2005 | James et al. | |
| 7,152,292 | B2 | 12/2006 | Hohmann et al. | |
| 7,344,186 | B1 | 3/2008 | Hausler et al. | |
| 7,500,373 | B2 | 3/2009 | Quell | |
| 7,586,062 | B2 | 9/2009 | Heberer | |
| 7,637,134 | B2 | 12/2009 | Burzlaff et al. | |
| 7,710,347 | B2 | 5/2010 | Gentilman et al. | |
| 7,716,802 | B2 | 5/2010 | Stern et al. | |
| 7,745,293 | B2 | 6/2010 | Yamazaki et al. | |
| 7,766,123 | B2 | 8/2010 | Sakurai et al. | |
| 7,852,388 | B2 | 12/2010 | Shimizu et al. | |
| 7,908,922 | B2 | 3/2011 | Zarabadi et al. | |
| 7,951,324 | B2 | 5/2011 | Naruse et al. | |
| 8,094,036 | B2 | 1/2012 | Heberer | |
| 8,163,077 | B2 | 4/2012 | Eron et al. | |
| 8,286,236 | B2 | 10/2012 | Jung et al. | |
| 8,289,352 | B2 | 10/2012 | Vartanian et al. | |

(Continued)

FOREIGN PATENT DOCUMENTS

| | | | |
|---|---|---|---|
| CN | 103666362 | B | 6/2015 |
| EP | 2965742 | B1 | 9/2020 |
| WO | 1996036455 | A1 | 11/1996 |
| WO | 1996036525 | A1 | 11/1996 |
| WO | 1996038260 | A1 | 12/1996 |
| WO | 2003024641 | A1 | 3/2003 |
| WO | 2004108343 | A1 | 12/2004 |
| WO | 2005093773 | A1 | 10/2005 |

(Continued)

OTHER PUBLICATIONS

US 9,202,136 B2, 12/2015, Schmidt et al. (withdrawn)
US 9,809,265 B2, 11/2017, Kinjo (withdrawn)
US 10,449,880 B2, 10/2019, Mizobata et al. (withdrawn)
Nguyen et al, Acrylate-based photopolymer for two-photon microfabrication and photonic applications, 2005, Adv. Funct. Mater., 15, No. 2, Feb. 2005.*
International Search Report and the Written Opinion received for International Application No. PCT/US21/59562, Mar. 17, 2022.
Extended Search Report received for European Patent Application No. 21895459.2, Mailed on Sep. 20, 2024, 7 Pages.

*Primary Examiner* — Jessica Whiteley
(74) *Attorney, Agent, or Firm* — ArentFox Schiff LLP

(57) ABSTRACT

A resin composition can includes a first isocyanurate component and a first bonding component bonded to the first isocyanurate component. The first bonding component can be configured to bond to a second bonding component that is bonded to a second isocyanurate component. The first bonding component can be configured to bond to the second bonding component based upon an application of an initiator to the resin composition. In this way, the first isocyanurate component can be coupled to the second isocyanurate component. The resin composition can be either in a pre-cured state in which the first isocyanurate component is not coupled to the second isocyanurate component or in a post-cured state in which at least a portion of the first isocyanurate component is coupled to at least a portion of the second isocyanurate component.

28 Claims, 27 Drawing Sheets

(56) References Cited

U.S. PATENT DOCUMENTS 8,297,096 B2 10/2012 Mizumura et al.
8,334,025 B2 12/2012 Fong et al.
8,354,170 B1 1/2013 Henry et al.
8,383,028 B2 2/2013 Lyons
8,408,036 B2 4/2013 Reith et al.
8,429,754 B2 4/2013 Jung et al.
8,437,513 B1 5/2013 Derakhshani et al.
8,444,903 B2 5/2013 Lyons et al.
8,452,073 B2 5/2013 Taminger et al.
8,599,301 B2 12/2013 Dowski, Jr. et al.
8,606,540 B2 12/2013 Haisty et al.
8,610,761 B2 12/2013 Haisty et al.
8,631,996 B2 1/2014 Quell et al.
8,675,925 B2 3/2014 Derakhshani et al.
8,678,060 B2 3/2014 Dietz et al.
8,686,314 B2 4/2014 Schneegans et al.
8,686,997 B2 4/2014 Radet et al.
8,694,284 B2 4/2014 Berard
8,720,876 B2 5/2014 Reith et al.
8,752,166 B2 6/2014 Jung et al.
8,755,923 B2 6/2014 Farahani et al.
8,787,628 B1 7/2014 Derakhshani et al.
8,818,771 B2 8/2014 Gielis et al.
8,873,238 B2 10/2014 Wilkins
8,978,535 B2 3/2015 Ortiz et al.
9,006,605 B2 4/2015 Schneegans et al.
9,071,436 B2 6/2015 Jung et al.
9,101,979 B2 8/2015 Hofmann et al.
9,104,921 B2 8/2015 Derakhshani et al.
9,126,365 B1 9/2015 Mark et al.
9,128,476 B2 9/2015 Jung et al.
9,138,924 B2 9/2015 Yen
9,149,988 B2 10/2015 Mark et al.
9,156,205 B2 10/2015 Mark et al.
9,186,848 B2 11/2015 Mark et al.
9,244,986 B2 1/2016 Karmarkar
9,248,611 B2 2/2016 Divine et al.
9,254,535 B2 2/2016 Buller et al.
9,266,566 B2 2/2016 Kim
9,269,022 B2 2/2016 Rhoads et al.
9,327,452 B2 5/2016 Mark et al.
9,329,020 B1 5/2016 Napoletano
9,332,251 B2 5/2016 Haisty et al.
9,346,127 B2 5/2016 Buller et al.
9,389,315 B2 7/2016 Bruder et al.
9,399,256 B2 7/2016 Buller et al.
9,403,235 B2 8/2016 Buller et al.
9,418,193 B2 8/2016 Dowski, Jr. et al.
9,457,514 B2 10/2016 Schwärzler
9,469,057 B2 10/2016 Johnson et al.
9,478,063 B2 10/2016 Rhoads et al.
9,481,402 B1 11/2016 Muto et al.
9,486,878 B2 11/2016 Buller et al.
9,486,960 B2 11/2016 Paschkewitz et al.
9,502,993 B2 11/2016 Deng
9,525,262 B2 12/2016 Stuart et al.
9,533,526 B1 1/2017 Nevins
9,555,315 B2 1/2017 Aders
9,555,580 B1 1/2017 Dykstra et al.
9,557,856 B2 1/2017 Send et al.
9,566,742 B2 2/2017 Keating et al.
9,566,758 B2 2/2017 Cheung et al.
9,573,193 B2 2/2017 Buller et al.
9,573,225 B2 2/2017 Buller et al.
9,586,290 B2 3/2017 Buller et al.
9,595,795 B2 3/2017 Lane et al.
9,597,843 B2 3/2017 Stauffer et al.
9,600,929 B1 3/2017 Young et al.
9,609,755 B2 3/2017 Coull et al.
9,610,737 B2 4/2017 Johnson et al.
9,611,667 B2 4/2017 GangaRao et al.
9,616,623 B2 4/2017 Johnson et al.
9,624,171 B2 4/2017 Matsumoto et al.
9,626,487 B2 4/2017 Jung et al.
9,626,489 B2 4/2017 Nilsson
9,643,361 B2 5/2017 Liu
9,662,840 B1 5/2017 Buller et al.
9,665,182 B2 5/2017 Send et al.
9,672,389 B1 6/2017 Mosterman et al.
9,672,550 B2 6/2017 Apsley et al.
9,676,145 B2 6/2017 Buller et al.
9,684,919 B2 6/2017 Apsley et al.
9,688,032 B2 6/2017 Kia et al.
9,690,286 B2 6/2017 Hovsepian et al.
9,700,966 B2 7/2017 Kraft et al.
9,703,896 B2 7/2017 Zhang et al.
9,713,903 B2 7/2017 Paschkewitz et al.
9,718,302 B2 8/2017 Young et al.
9,718,434 B2 8/2017 Hector, Jr. et al.
9,724,877 B2 8/2017 Flitsch et al.
9,724,881 B2 8/2017 Johnson et al.
9,725,178 B2 8/2017 Wang
9,731,730 B2 8/2017 Stiles
9,731,773 B2 8/2017 Gami et al.
9,741,954 B2 8/2017 Bruder et al.
9,747,352 B2 8/2017 Karmarkar
9,764,415 B2 9/2017 Seufzer et al.
9,764,520 B2 9/2017 Johnson et al.
9,765,226 B2 9/2017 Dain
9,770,760 B2 9/2017 Liu
9,773,393 B2 9/2017 Velez
9,776,234 B2 10/2017 Schaafhausen et al.
9,782,936 B2 10/2017 Glunz et al.
9,783,324 B2 10/2017 Embler et al.
9,783,977 B2 10/2017 Alqasimi et al.
9,789,548 B2 10/2017 Golshany et al.
9,789,922 B2 10/2017 Dosenbach et al.
9,796,137 B2 10/2017 Zhang et al.
9,802,108 B2 10/2017 Aders
9,809,977 B2 11/2017 Carney et al.
9,817,922 B2 11/2017 Glunz et al.
9,818,071 B2 11/2017 Jung et al.
9,821,339 B2 11/2017 Paschkewitz et al.
9,821,411 B2 11/2017 Buller et al.
9,823,143 B2 11/2017 Twelves, Jr. et al.
9,829,564 B2 11/2017 Bruder et al.
9,846,933 B2 12/2017 Yuksel
9,854,828 B2 1/2018 Langeland
9,858,604 B2 1/2018 Apsley et al.
9,862,833 B2 1/2018 Hasegawa et al.
9,862,834 B2 1/2018 Hasegawa et al.
9,863,885 B2 1/2018 Zaretski et al.
9,870,629 B2 1/2018 Cardno et al.
9,879,981 B1 1/2018 Dehghan Niri et al.
9,884,663 B2 2/2018 Czinger et al.
9,898,776 B2 2/2018 Apsley et al.
9,914,150 B2 3/2018 Pettersson et al.
9,919,360 B2 3/2018 Buller et al.
9,931,697 B2 4/2018 Levin et al.
9,933,031 B2 4/2018 Bracamonte et al.
9,933,092 B2 4/2018 Sindelar
9,957,031 B2 5/2018 Golshany et al.
9,958,535 B2 5/2018 Send et al.
9,962,767 B2 5/2018 Buller et al.
9,963,978 B2 5/2018 Johnson et al.
9,971,920 B2 5/2018 Derakhshani et al.
9,976,063 B2 5/2018 Childers et al.
9,987,792 B2 6/2018 Flitsch et al.
9,988,136 B2 6/2018 Tiryaki et al.
9,989,623 B2 6/2018 Send et al.
9,990,565 B2 6/2018 Rhoads et al.
9,994,339 B2 6/2018 Colson et al.
9,996,890 B1 6/2018 Cinnamon et al.
9,996,945 B1 6/2018 Holzer et al.
10,002,215 B2 6/2018 Dowski et al.
10,006,156 B2 6/2018 Kirkpatrick
10,011,089 B2 7/2018 Lyons et al.
10,011,685 B2 7/2018 Childers et al.
10,012,532 B2 7/2018 Send et al.
10,013,777 B2 7/2018 Mariampillai et al.
10,015,908 B2 7/2018 Williams et al.
10,016,852 B2 7/2018 Broda
10,016,942 B2 7/2018 Mark et al.
10,017,384 B1 7/2018 Greer et al.

(56) References Cited

U.S. PATENT DOCUMENTS 10,018,576 B2 7/2018 Herbsommer et al.
10,022,792 B2 7/2018 Srivas et al.
10,022,912 B2 7/2018 Kia et al.
10,027,376 B2 7/2018 Sankaran et al.
10,029,415 B2 7/2018 Swanson et al.
10,040,239 B2 8/2018 Brown, Jr.
10,046,412 B2 8/2018 Blackmore
10,048,769 B2 8/2018 Selker et al.
10,052,712 B2 8/2018 Blackmore
10,052,820 B2 8/2018 Kemmer et al.
10,055,536 B2 8/2018 Maes et al.
10,058,764 B2 8/2018 Aders
10,058,920 B2 8/2018 Buller et al.
10,061,906 B2 8/2018 Nilsson
10,065,270 B2 9/2018 Buller et al.
10,065,361 B2 9/2018 Susnjara et al.
10,065,367 B2 9/2018 Brown, Jr.
10,068,316 B1 9/2018 Holzer et al.
10,071,422 B2 9/2018 Buller et al.
10,071,525 B2 9/2018 Susnjara et al.
10,072,179 B2 9/2018 Drijfhout
10,074,128 B2 9/2018 Colson et al.
10,076,875 B2 9/2018 Mark et al.
10,076,876 B2 9/2018 Mark et al.
10,081,140 B2 9/2018 Paesano et al.
10,081,431 B2 9/2018 Seack et al.
10,086,568 B2 10/2018 Snyder et al.
10,087,320 B2 10/2018 Simmons et al.
10,087,556 B2 10/2018 Gallucci et al.
10,099,427 B2 10/2018 Mark et al.
10,100,542 B2 10/2018 GangaRao et al.
10,100,890 B2 10/2018 Bracamonte et al.
10,107,344 B2 10/2018 Bracamonte et al.
10,108,766 B2 10/2018 Druckman et al.
10,113,600 B2 10/2018 Bracamonte et al.
10,118,347 B2 11/2018 Stauffer et al.
10,118,579 B2 11/2018 Lakic
10,120,078 B2 11/2018 Bruder et al.
10,124,546 B2 11/2018 Johnson et al.
10,124,570 B2 11/2018 Evans et al.
10,137,500 B2 11/2018 Blackmore
10,138,354 B2 11/2018 Groos et al.
10,144,126 B2 12/2018 Krohne et al.
10,145,110 B2 12/2018 Carney et al.
10,151,363 B2 12/2018 Bracamonte et al.
10,152,661 B2 12/2018 Kieser
10,160,278 B2 12/2018 Coombs et al.
10,161,021 B2 12/2018 Lin et al.
10,166,752 B2 1/2019 Evans et al.
10,166,753 B2 1/2019 Evans et al.
10,171,578 B1 1/2019 Cook et al.
10,173,255 B2 1/2019 TenHouten et al.
10,173,327 B2 1/2019 Kraft et al.
10,178,800 B2 1/2019 Mahalingam et al.
10,179,640 B2 1/2019 Wilkerson
10,183,330 B2 1/2019 Buller et al.
10,183,478 B2 1/2019 Evans et al.
10,189,187 B2 1/2019 Keating et al.
10,189,240 B2 1/2019 Evans et al.
10,189,241 B2 1/2019 Evans et al.
10,189,242 B2 1/2019 Evans et al.
10,190,424 B2 1/2019 Johnson et al.
10,195,693 B2 2/2019 Buller et al.
10,196,539 B2 2/2019 Boonen et al.
10,197,338 B2 2/2019 Melsheimer
10,200,677 B2 2/2019 Trevor et al.
10,201,932 B2 2/2019 Flitsch et al.
10,201,941 B2 2/2019 Evans et al.
10,202,673 B2 2/2019 Lin et al.
10,204,216 B2 2/2019 Nejati et al.
10,207,454 B2 2/2019 Buller et al.
10,209,065 B2 2/2019 Estevo, Jr. et al.
10,210,662 B2 2/2019 Holzer et al.
10,213,837 B2 2/2019 Kondoh
10,214,248 B2 2/2019 Hall et al.
10,214,252 B2 2/2019 Schellekens et al.
10,214,275 B2 2/2019 Goehlich
10,220,575 B2 3/2019 Reznar
10,220,881 B2 3/2019 Tyan et al.
10,221,530 B2 3/2019 Driskell et al.
10,226,900 B1 3/2019 Nevins
10,232,550 B2 3/2019 Evans et al.
10,234,342 B2 3/2019 Moorlag et al.
10,237,477 B2 3/2019 Trevor et al.
10,252,335 B2 4/2019 Buller et al.
10,252,336 B2 4/2019 Buller et al.
10,254,499 B1 4/2019 Cohen et al.
10,257,499 B2 4/2019 Hintz et al.
10,259,044 B2 4/2019 Buller et al.
10,268,181 B1 4/2019 Nevins
10,269,225 B2 4/2019 Velez
10,272,860 B2 4/2019 Mohapatra et al.
10,272,862 B2 4/2019 Whitehead
10,275,564 B2 4/2019 Ridgeway et al.
10,279,580 B2 5/2019 Evans et al.
10,285,219 B2 5/2019 Fetfatsidis et al.
10,286,452 B2 5/2019 Buller et al.
10,286,603 B2 5/2019 Buller et al.
10,286,961 B2 5/2019 Hillebrecht et al.
10,289,263 B2 5/2019 Troy et al.
10,289,875 B2 5/2019 Singh et al.
10,291,193 B2 5/2019 Dandu et al.
10,294,552 B2 5/2019 Liu et al.
10,294,982 B2 5/2019 Gabrys et al.
10,295,989 B1 5/2019 Nevins
10,303,159 B2 5/2019 Czinger et al.
10,307,824 B2 6/2019 Kondoh
10,310,197 B1 6/2019 Droz et al.
10,313,651 B2 6/2019 Trevor et al.
10,315,252 B2 6/2019 Mendelsberg et al.
10,336,050 B2 7/2019 Susnjara
10,337,542 B2 7/2019 Hesslewood et al.
10,337,952 B2 7/2019 Bosetti et al.
10,339,266 B2 7/2019 Urick et al.
10,343,330 B2 7/2019 Evans et al.
10,343,331 B2 7/2019 McCall et al.
10,343,355 B2 7/2019 Evans et al.
10,343,724 B2 7/2019 Polewarczyk et al.
10,343,725 B2 7/2019 Martin et al.
10,350,823 B2 7/2019 Rolland et al.
10,356,341 B2 7/2019 Holzer et al.
10,356,395 B2 7/2019 Holzer et al.
10,357,829 B2 7/2019 Spink et al.
10,357,957 B2 7/2019 Buller et al.
10,359,756 B2 7/2019 Newell et al.
10,369,629 B2 8/2019 Mendelsberg et al.
10,382,739 B1 8/2019 Rusu et al.
10,384,393 B2 8/2019 Xu et al.
10,384,416 B2 8/2019 Cheung et al.
10,389,410 B2 8/2019 Brooks et al.
10,391,710 B2 8/2019 Mondesir
10,392,097 B2 8/2019 Pham et al.
10,392,131 B2 8/2019 Deck et al.
10,393,315 B2 8/2019 Tyan
10,400,080 B2 9/2019 Ramakrishnan et al.
10,401,832 B2 9/2019 Snyder et al.
10,403,009 B2 9/2019 Mariampillai et al.
10,406,750 B2 9/2019 Barton et al.
10,412,283 B2 9/2019 Send et al.
10,416,095 B2 9/2019 Herbsommer et al.
10,421,496 B2 9/2019 Swayne et al.
10,421,863 B2 9/2019 Hasegawa et al.
10,422,478 B2 9/2019 Leachman et al.
10,425,793 B2 9/2019 Sankaran et al.
10,427,364 B2 10/2019 Alves
10,429,006 B2 10/2019 Tyan et al.
10,434,573 B2 10/2019 Buller et al.
10,435,185 B2 10/2019 Divine et al.
10,435,773 B2 10/2019 Liu et al.
10,436,038 B2 10/2019 Buhler et al.
10,438,407 B2 10/2019 Pavanaskar et al.
10,440,351 B2 10/2019 Holzer et al.
10,442,002 B2 10/2019 Benthien et al.
10,442,003 B2 10/2019 Symeonidis et al.

(56) References Cited

U.S. PATENT DOCUMENTS

| | | | |
|---|---|---|---|
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2005/0004249 A1 | 1/2005 | Fuchs et al. | |
| 2006/0108783 A1 | 5/2006 | Ni et al. | |
| 2007/0241303 A1 | 10/2007 | Zhong et al. | |
| 2014/0045121 A1* | 2/2014 | Lee | G03F 7/032 430/287.1 |
| 2014/0277669 A1 | 9/2014 | Nardi et al. | |
| 2017/0113344 A1 | 4/2017 | Schönberg | |
| 2017/0341309 A1 | 11/2017 | Piepenbrock et al. | |
| 2019/0002616 A1 | 1/2019 | Spagnola et al. | |
| 2020/0283565 A1 | 9/2020 | Cho et al. | |

FOREIGN PATENT DOCUMENTS

| | | | | |
|---|---|---|---|---|
| WO | 2006023860 A3 | 3/2006 | | |
| WO | 2007003375 A1 | 1/2007 | | |
| WO | 2007110235 A1 | 10/2007 | | |
| WO | 2007110236 A1 | 10/2007 | | |
| WO | 2008019847 A1 | 2/2008 | | |
| WO | 2007128586 A3 | 6/2008 | | |
| WO | 2008068314 A2 | 6/2008 | | |
| WO | 2008086994 A1 | 7/2008 | | |
| WO | 2008087024 A1 | 7/2008 | | |
| WO | 2008107130 A1 | 9/2008 | | |
| WO | 2008138503 A1 | 11/2008 | | |
| WO | 2008145396 A1 | 12/2008 | | |
| WO | 2009083609 A2 | 7/2009 | | |
| WO | 2009098285 A1 | 8/2009 | | |
| WO | 2009112520 A1 | 9/2009 | | |
| WO | 2009135938 A1 | 11/2009 | | |
| WO | 2009140977 A1 | 11/2009 | | |
| WO | 2010125057 A2 | 11/2010 | | |
| WO | 2010125058 A1 | 11/2010 | | |
| WO | 2010142703 A2 | 12/2010 | | |
| WO | 2011032533 A1 | 3/2011 | | |
| WO | 2014016437 A1 | 1/2014 | | |
| WO | 2014187720 A1 | 11/2014 | | |
| WO | 2014195340 A1 | 12/2014 | | |
| WO | WO-2015102149 A1 * | 7/2015 | | C08K 3/013 |
| WO | 2015193331 A1 | 12/2015 | | |
| WO | 2016116414 A1 | 7/2016 | | |
| WO | 2017036461 A1 | 3/2017 | | |
| WO | WO-2018080704 A1 * | 5/2018 | | B24D 5/12 |
| WO | 2019030248 A1 | 2/2019 | | |
| WO | 2019042504 A1 | 3/2019 | | |
| WO | 2019048010 A1 | 3/2019 | | |
| WO | 2019048498 A1 | 3/2019 | | |
| WO | 2019048680 A1 | 3/2019 | | |
| WO | 2019048682 A1 | 3/2019 | | |

* cited by examiner

ISOCYANURATE RESIN COMPOSITIONS

CROSS-REFERENCE TO RELATED APPLICATION

This application claims the benefit of U.S. Provisional Patent Application No. 63/114,951 filed Nov. 17, 2020 and entitled "Resin Composition Curable by Electromagnetic Radiation", the contents of which are incorporated by reference as if fully set forth herein.

BACKGROUND

Field

The present disclosure relates generally to resin compositions, and in particular to isocyanurate resin compositions.

Introduction

Resins have found may uses throughout industry. For example, may resins may be used as adhesives that may be cured by electromagnetic radiation, heat, mixing with a counterpart resin, etc. Resins can be used to produce structures, such as through 3D printing, or to fill in structures, such as a dental filling in a tooth.

Curing time can be an important factor in choosing a resin adhesive. When used in industrial processes, sometimes it is desirable for curing time to be longer, to allow various parallel processes to occur while the resin is being cured. However, more often it is desirable for curing time to be as fast as possible, to allow sequential processes to occur quickly.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various embodiments, a resin composition can include an isocyanurate component bonded to an acrylate component, and an electromagnetic radiation initiator component. The resin composition can include a pre-cured state or a post-cured state, in which the resin composition is curable by electromagnetic radiation in the pre-cured state, wherein the resin composition is cured in the post-cured state. In various embodiments, the electromagnetic radiation may include one or more wavelengths in the ultraviolet spectrum. The electromagnetic radiation initiator component may be a photoinitiator component. The photoinitiator component may include at least one ultraviolet light photoinitiator component. The photoinitiator component may be reactive to one or more electromagnetic waves in the ultraviolet spectrum. The photoinitiator component may be configured to generate binding agents in response to a reaction with the electromagnetic radiation, wherein the binding agents are configured to bind with the acrylate component, and the binding agents may include one or more of: free radicals, acids, or a combination thereof.

In various embodiments, a method may include applying an uncured resin composition to a first structure, where the uncured resin includes a resin composition described in this disclosure, and applying electromagnetic radiation to the uncured resin composition to cure the uncured resin composition, where the cured resin composition adheres to the first structure. The method may further include assembling the first structure with a second structure, where applying the electromagnetic radiation to the uncured resin composition is performed after assembling the first structure with the second structure, and where the cured resin composition adheres to the first structure and the second structure. The first structure may include an animal tissue structure. The animal tissue structure may include a bone or a tooth.

The method may further include applying the uncured resin composition to a second structure, and assembling the first structure with the second structure, where the cured resin composition adheres to the first structure and the second structure.

In various embodiments, a resin composition can includes a first isocyanurate component and a first bonding component bonded to the first isocyanurate component. The first bonding component can be configured to bond to a second bonding component that is bonded to a second isocyanurate component. The first bonding component can be configured to bond to the second bonding component based upon an application of an initiator to the resin composition. In this way, the first isocyanurate component can be coupled to the second isocyanurate component. The resin composition can be either in a pre-cured state in which the first isocyanurate component is not coupled to the second isocyanurate component or in a post-cured state in which at least a portion of the first isocyanurate component is coupled to at least a portion of the second isocyanurate component.

The initiator can include electromagnetic radiation, such as ultraviolet (UV) light. The resin composition can further include an electromagnetic radiation initiator component configured to generate a first binding agent in response to a reaction with the electromagnetic radiation. The first binding agent can be configured to bind with the first bonding component, such that the first bonding component becomes a second binding agent to bond to the second bonding component. The first bonding component can include at least an acrylate or a methacrylate.

In various embodiments, the first bonding component can be configured to become a binding agent in response to a reaction with the electromagnetic radiation, such that the first bonding component bonds to the second bonding component. The first bonding component may include at least a maleimide or a thiol-ene.

In various embodiments, the initiator can include heat. The first bonding component can include at least a peroxide or an epoxy.

In various embodiments, a resin composition can include a first isocyanurate component, and a first bonding component bonded to the first isocyanurate component. The first bonding component can be configured to bond to a second bonding component that is bonded to a second isocyanurate component. The first bonding component can be configured to bond to the second bonding component based upon a mixing of the first bonding component with the second bonding component, such that the first isocyanurate component is coupled to the second isocyanurate component. The resin composition can be either in a pre-cured state in which the first isocyanurate component is not coupled to the second isocyanurate component or in a post-cured state in which at least a portion of the first isocyanurate component is coupled to at least a portion of the second isocyanurate component. The first bonding component can include an epoxy.

DETAILED DESCRIPTION

Figure 1:
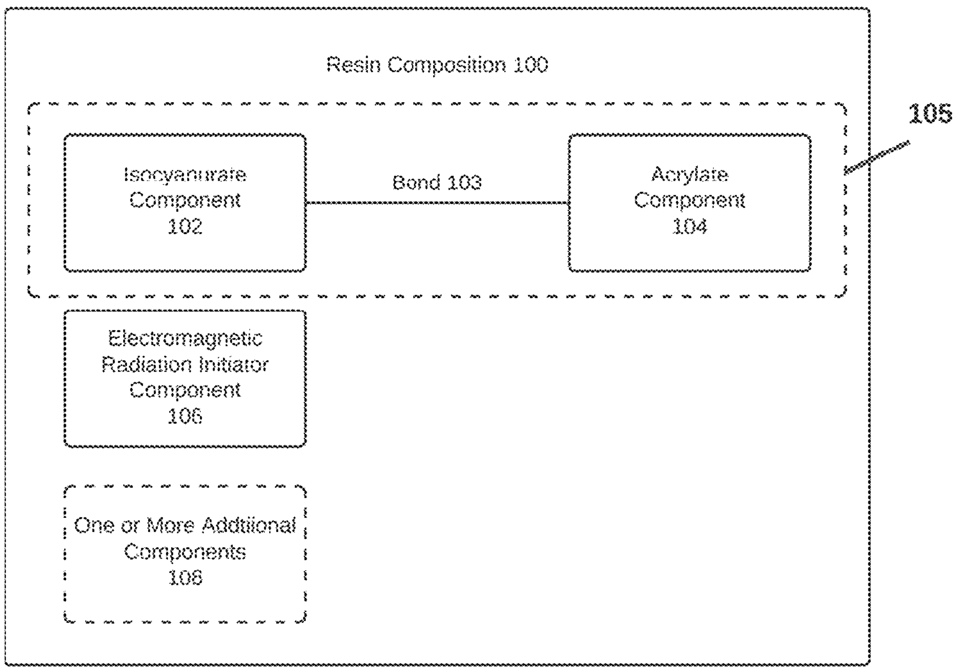
FIG. 1 illustrates an example resin composition in accordance with this disclosure.

The detailed description set forth below in connection with the drawings is intended to provide a description of various exemplary embodiments of the concepts disclosed herein and is not intended to represent the only embodiments in which the disclosure may be practiced. The terms "example" and "exemplary" used in this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

A resin composition described herein may be used in any industry or application in which a rapid cure of the resin composition is desired. As used herein, "rapid cure" refers to a resin composition described herein as being curable by electromagnetic radiation within a time period of the less than or equal to X, where X may, depending on the example, be less than or equal to 2 minutes, 1 minute, 45 seconds, 30 seconds, 15 seconds, 10 seconds, 5 seconds, 3 seconds, 2 seconds, or 1 second. In some examples, a resin composition described herein may be used, when cured, to adhere two or more structures together. In other examples, a resin composition described herein may be used, when cured, to adhere to single structure. In various embodiments, such a structure may include an additively manufactured structure or a conventionally manufactured structure. For example, a vehicle such as an automobile, truck or aircraft is made of a large number of individual structures joined together to form the body, frame, interior and exterior surfaces, etc. These structures provide form to the automobile, truck, and aircraft, and respond appropriately to the many different types of forces that are generated or that result from various actions like accelerating and braking. These structures also provide support. Structures of varying sizes and geometries may be integrated in a vehicle, for example, to provide an interface between panels, extrusions, and/or other structures. Thus, structures are an integral part of vehicles in the vehicle industry. In various embodiments, a structure may refer to an animal tissue structure. An animal tissue structure may, for example, include a bone or a tooth. In examples involving a tooth, the resin composition may be referred to as a dental filling.

In various embodiments, a resin composition described herein may improve the robotic or manual assembly of structures in an assembly process. In such an example, structures may be bonded or adhered together by curing the resin composition.

In various embodiments, a resin composition described herein may improve additive manufacturing (AM) systems (also referred to as three-dimensional (3D) printing systems), such as digital light processing (DLP), stereolithography (SLA), and selective laser sintering (SLS) additive printing. An additive manufacturing system may be configured to print a structure by depositing and curing a resin composition described herein in layers, drop by drop, or the like. For example, a resin composition described herein may be applied in a first volume (e.g., such as a layer, a drop, or the like), electromagnetic radiation may be applied to the first volume of the resin composition to cure it, and a second volume may be applied on or adjacent to the first cured volume, and so on and so forth. This process of applying and curing the resin composition builds an additively manufactured structure, where that structure may be made of the cured resin composition. In other examples, an additive manufacturing system may be configured to print a structure with multiple materials, where one type of material among the multiple materials is a resin composition described herein. In some examples, the cured resin composition itself may constitute an additively manufactured structure; or, in other examples, the cured resin composition may be used during an additive manufacturing process to cure two or more structures together. In other examples, an additively manufactured structure may include one or types of materials that may include a cured resin composition described herein. Use of a resin composition described herein may allow dispensing and rapid curing of additively manufactured segments that have no support to the platform of the additive manufacturing system. A resin composition described herein may, in some examples, be thixotropic.

In various embodiments, a resin composition described herein may replace fasteners (e.g., a rivet, nail, screw, or any other fastener) that are used to fasten two or more structures together. For example, the achieved depth of cure of a resin composition described herein may allow replacement of a fastener that, for example, is used to fasten one structure (e.g., an automotive panel) to another structure (e.g., a support structure).

In various embodiments, a resin composition described herein may be used in the electronics industry as a potting compound or an underfill. For example, the resin composition may be applied between substrates of ball grid arrays (BGAs) and cured by applying electromagnetic radiation to the resin composition, such as by applying light (e.g., ultraviolet light) to the resin composition from the sides of the BGA assembly. As the examples herein demonstrate, a resin composition described herein may reduce development costs.

FIG. 1 illustrates an example resin composition 100. Resin composition 100 includes an isocyanurate component 102, an acrylate component 104, and an electromagnetic radiation initiator component 106. In some examples, resin composition 100 only includes isocyanurate component 102, acrylate component 104, and electromagnetic radiation initiator component 106; and does not include any additional components. In such examples, one or more additional components 108 do not exist in resin composition 100. In other examples, resin composition 100 includes isocyanurate component 102, acrylate component 104, electromagnetic radiation initiator component 106, and one or more additional components 108. One or more additional components 108 may include one or more of: a filler component, a reactive monomer component, an adhesion promoter component, a flow modifier component, a toughener component, an antioxidant component, and a dye component. In some examples, a flow modifier component may be referred to as a flow aide component.

Resin composition 100 may include a pre-cured state and a post-cured state. Resin composition 100 is curable by electromagnetic radiation in the pre-cured state and is at least partially cured in the post-cured state. In the pre-cured state, resin composition 100 may have a viscosity of 100 to 100,000,000 centipoise within a temperature range. In some examples, the temperature range includes 5 °C to 70 °C. In the post-cured state, resin composition 100 may have a softening point at a temperature greater than or equal to 200 °C. In other examples, in the post-cured state, resin composition 100 may have a softening point at a temperature greater than or equal to 240 °C.

In some examples, resin composition 100 may be curable by electromagnetic radiation in the pre-cured state within a time period. For example, applying electromagnetic radiation to resin composition 100 in the pre-cured state for the duration of the time period may cause resin composition 100 to be cured up to a depth of X millimeters, where X is equal to a number within the range of 0.1 millimeters to 50 millimeters. For example, X may be 0.1 mm, 5 mm, 10 mm, or 50 mm. In some examples, the time period may be less than or equal to be less than or equal to 2 minutes, 1 minute, 45 seconds, 30 seconds, 15 seconds, 10 seconds, 5 seconds, 3 seconds, 2 seconds, or 1 second.

Resin composition 100 may have one or more of the following properties: a tack free surface in the post-cured state; high modulus and structural strength in the post-cured state, high temperature stability in the post-cured state, ability to bond to treated aluminum with epoxy primers, low creep under stress, high softening and deflection temperatures, resistance to chemicals, and low shrinkage. In some examples, a filler component of resin composition 100 may enable the property of low shrinkage.

Resin composition 100 may be bondable to a first material by electromagnetic radiation in the pre-cured state. For example, applying electromagnetic radiation to resin composition 100 in the pre-cured state may cause resin composition 100 to bond to the first material. The first material may include any material, such as metal, plastic, glass, ceramic, a composite, animal tissue, or any combination thereof. In some examples, the metal may include aluminum or an aluminum alloy. The first material may correspond to a structure. For example, the first material may be the material of a structure on which resin composition 100 may be applied. In other examples, the first material may be a coating on a second material. The second material may correspond to a structure. For example, the second material may be the material of a structure and the first material may be a material that coats the second material. In some examples, the first material may include plastic and the second material may include metal.

The pre-cured state of resin composition 100 may include a first number of unbonded components, and the post-cured state of resin composition 100 may include a second number of unbonded components, where the first number is greater than the second number. Electromagnetic radiation initiator component 106 may be in a first state in the pre-cured state of resin composition 100 and be in a second state in the post-cured state of resin composition 100. The first state may be a pre-activation state (e.g., a pre-initiated state) and the second state may be a post-activation state (e.g., a post-initiated state). As one example, the pre-cured state of resin composition 100 may include a first amount of electromagnetic radiation initiator component 106 in the first state, and the post-cured state of resin composition 100 may include a second amount of electromagnetic radiation initiator component 106 in the second state. In such an example, the second amount may be less than or equal to the first amount. As another example, the pre-cured state of resin composition 100 may include a first amount of electromagnetic radiation initiator component 106 in the first state, and the post-cured state of resin composition 100 may include a second amount of electromagnetic radiation initiator component 106 in the first state. In such an example, the second amount may be less than the first amount.

Isocyanurate component 102 and acrylate component 104 may be bonded together by bond 103. An isocyanurate component 102 bonded with an acrylate component 104 may be referred to as an acrylated isocyanurate component 105. In some examples, an acrylated isocyanurate 105 may include one, two, or three acrylate components 104 bonded to an isocyanurate component 102. In such examples, acrylated isocyanurate component 105 may respectively be referred to as a mono-, di-, or tri-acrylated isocyanurate component 105. In some examples, resin composition 100 may only include mono-acrylated isocyanurate components 105. In other examples, resin composition 100 may only include di-acrylated isocyanurate components 105. In other examples, resin composition 100 may only include tri-acrylated isocyanurate components 105. In other examples, resin composition 100 may include one or more mono-acrylated isocyanurate components 105, one or more di-acrylated isocyanurate components, one or more tri-acrylated isocyanurate components, or any combination thereof. In other examples, acrylated component 105 may be referred to as monomer component 105.

Figure 2:
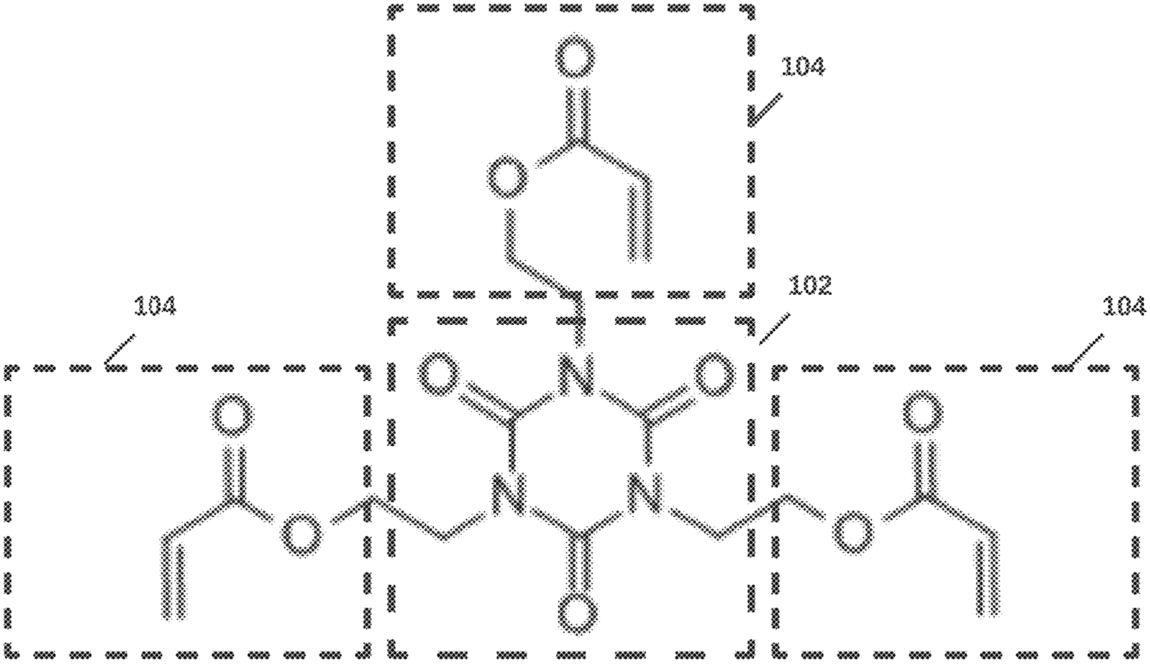
FIG. 2 illustrates an example of a single isocyanurate component bonded with three acrylate components.
Figure 3:
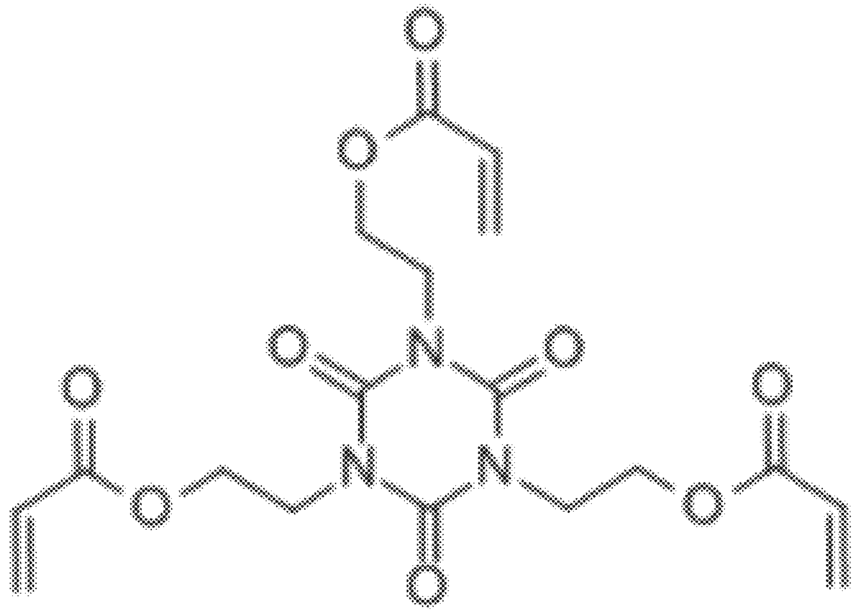
FIG. 3 illustrates the example of FIG. 2 without the boxes around the components.

In some examples, bond 103 may include a carbon-nitrogen single bond and a carbon-carbon single bond. Where a component exists in resin composition 100, reference to such component may be singular or plural. For example, reference to isocyanurate component 102 may refer to a single isocyanurate component 102 in some examples and a plurality of isocyanurate components 102 in other examples. As another example, reference to acrylate component 104 may refer to a single acrylate component 104 in some examples and a plurality of acrylate components 104 in other examples. As another example, reference to acrylated component 105 may refer to a single acrylated component 105 in some examples and a plurality of acrylated components 105 in other examples. FIG. 2 illustrates such an example. Specifically, FIG. 2 illustrates an example of a single isocyanurate component 102 bonded with three acrylate components 104. Each acrylate component 104 depicted in FIG. 2 is bonded with the single isocyanurate component with a respective bond 103. The example shown in FIG. 2 also shows an example of a tri-acrylated isocyanurate component 105. FIG. 3 illustrates the example of FIG. 2 without the boxes around the components and illustrates the example chemical formulation shown in FIGS. 2 and 3 is Tris(2-acryloyloxyethyl) isocyanurate. As another example, reference to electromagnetic radiation initiator component 106 may refer to a single electromagnetic radiation initiator component 106 in some examples and a plurality of electromagnetic radiation initiator components 106 in other examples.

Figure 4A:
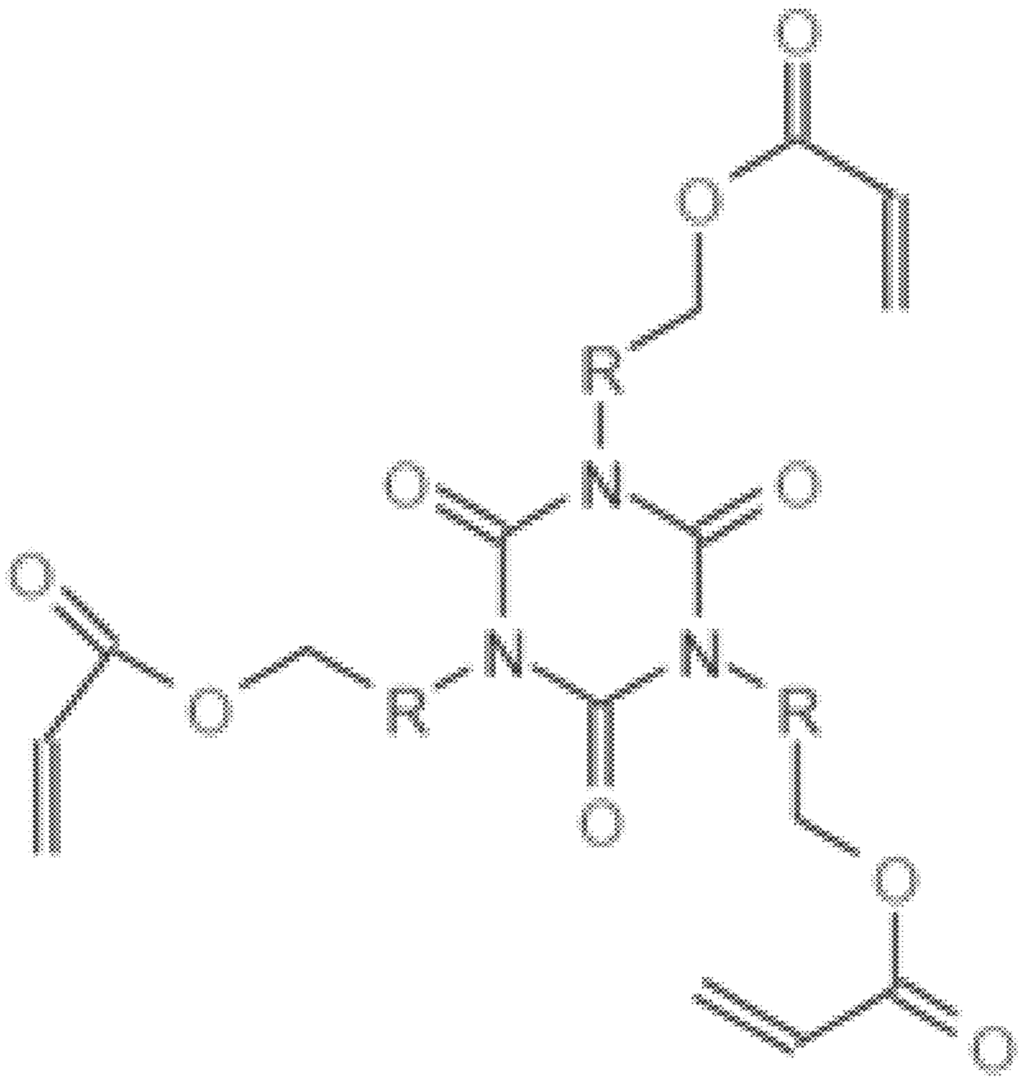
FIG. 4A illustrates an example of an acrylated isocyanurate component in accordance with this disclosure.
Figure 4B:
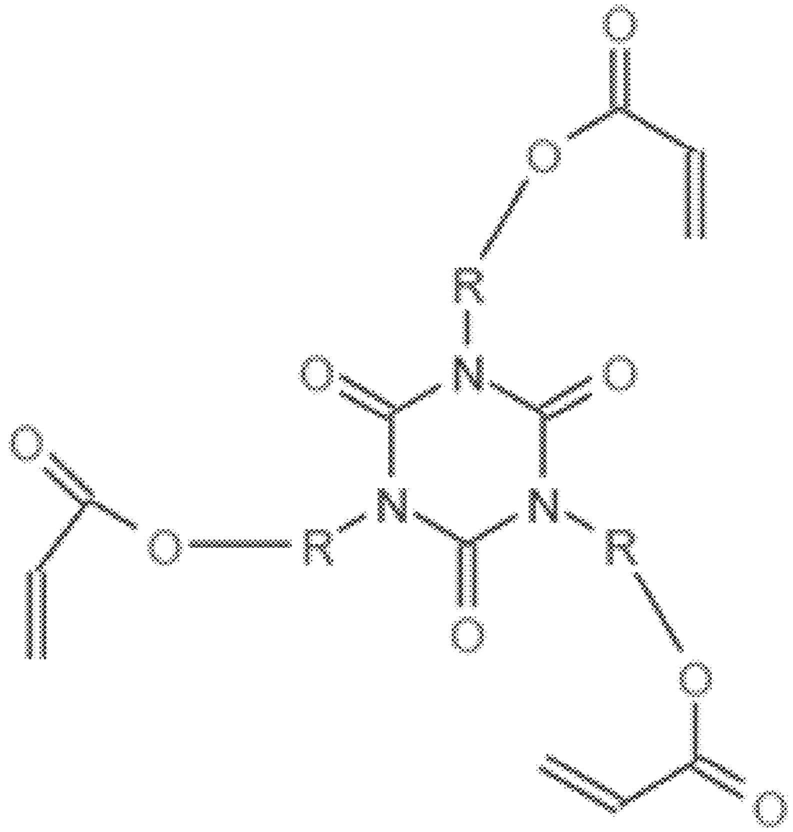
FIG. 4B illustrates an example of an acrylated isocyanurate component in accordance with this disclosure.
Figure 4C:
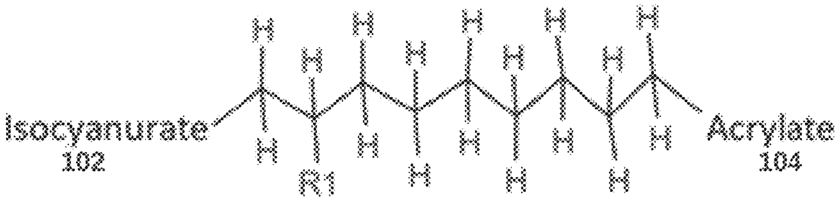
FIG. 4C illustrates an example R group in accordance with this disclosure.
Figure 4D:
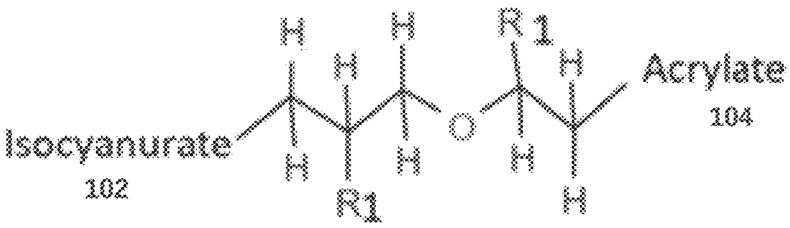
FIG. 4D illustrates an example R group in accordance with this disclosure.

FIGS. 4A and 4B each illustrate an example of an acrylated isocyanurate component 105 in accordance this disclosure. In some examples, an acrylated isocyanurate component 105 may include one or more R groups. An R group may include one or more pendant groups, which may be denoted as R1. The examples shown in FIGS. 4A and 4B each show an example R group (three R groups, each by the letter "R"). In some examples, the R groups may be the same or different. Each R group may bind a respective acylate component 104 to isocyanurate component 102. In some examples, an R group may be an aromatic R group or an aliphatic R group. An R group may include heteroatoms in the backbone and the pendant. In some examples, an R group may be a linear, branched, or cyclic divalent group selected from hydrocarbon residues having 1 to 12 carbon atoms, alkylene, arylene, oxyalkylene, oxyarylene, siloxane-alkylene, siloxane-arylene, ester, amine, glycol, imide, amide, alcohol, carbonate, urethane, urea, sulfide, ether or a derivative or combination thereof. In some examples, R1, which is an example of one or more pendant groups (shown in FIG. 4D), may be selected from the group consisting of hydrogen, halogen, amino, oximino, a substituted or unsubstituted alkyl, alkenyl, alkenyloxy, alkynyl, alkylnyloxy, cycloaliphatic, cycloaliphatic-O—, aryl, aryloxy, heteroaryl, heteroaryloxy, heteroalicyclic, heteroalicyclicoxy, acyl, acyloxy group or a combination thereof. In some examples, an R group includes the structure shown in FIG. 4C bonded between the isocyanurate component 102 and acrylate component 104. In some examples, an R group includes the structure shown in FIG. 4D bonded between the isocyanurate component 102 and acrylate component 104.

Figure 4E:
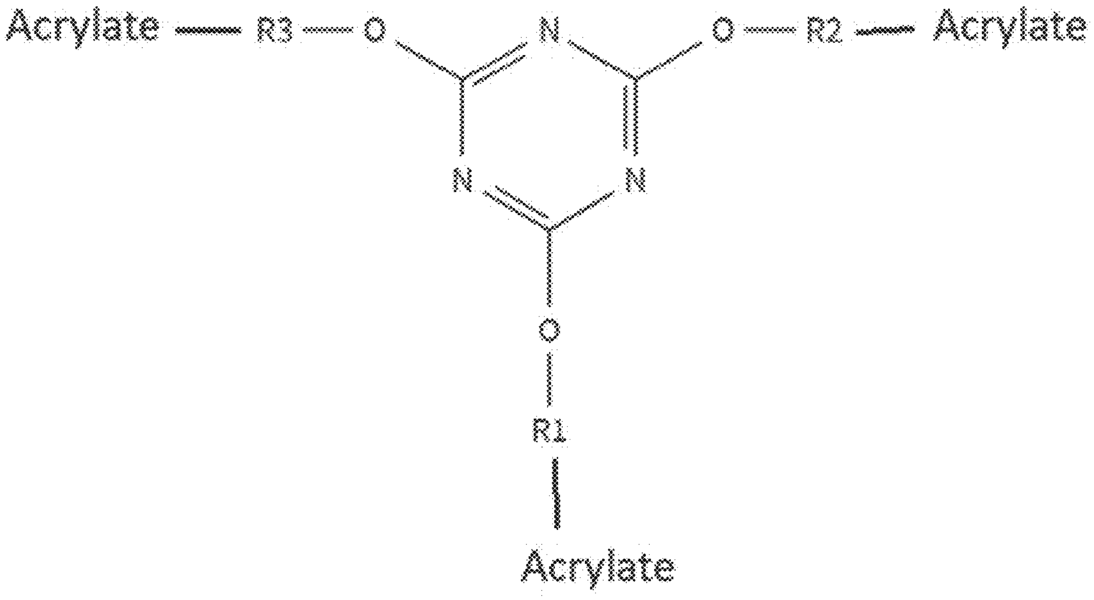
FIG. 4E illustrates an example of an acrylated cyanurate component in accordance with this disclosure.

In some examples, isocyanurate component 102 may be a cyanurate component instead of an isocyanurate component. In such, examples, acrylated isocyanurate component 105 may be referred to as an acrylated cyanurate component 105. FIG. 4E illustrates an example of an acrylated cyanurate component 105 in accordance this disclosure, which includes an example cyanurate component instead of an isocyanurate component. Any example disclosed herein that includes isocyanurate component 102 may, in other examples, instead include a cyanurate component in place of the isocyanurate component. Referring to FIG. 4E, an example cyanurate component is shown with three R groups (R1, R2, and R3) that may be the same or different. Each R group may bind a respective acylate component 104 to the cyanurate component. In some examples, an R group may be an aromatic R group or an aliphatic R group. An R group may include heteroatoms in the backbone and the pendant. In some examples, an R group may be a linear, branched, or cyclic divalent group selected from hydrocarbon residues having 1 to 12 carbon atoms, alkylene, arylene, oxyalkylene, oxyarylene, siloxane-alkylene, siloxane-arylene, ester, amine, glycol, imide, amide, alcohol, carbonate, urethane, urea, sulfide, ether or a derivative or combination thereof. In some examples, an R group includes the structure shown in FIG. 4C bonded between the cyanurate component and acrylate component 104. In some examples, an R group includes the structure shown in FIG. 4D bonded between the cyanurate component and acrylate component 104.

Electromagnetic radiation initiator component 106 may be reactive with one or more types of electromagnetic radiation to transform resin composition 100 from the pre-cured state to the post-cured state. Electromagnetic radiation initiator component 106 may be configured to generate one or more binding agents in response to a reaction with electromagnetic radiation. The one or more binding agents may bind with the acrylate component. The one or more binding agents may include one or more of: free radicals, acids, or a combination thereof. The generation of one or more binding agents and their binding with the acrylate component is part of the curing process of resin composition 100. For example, by applying electromagnetic radiation to resin composition 100 in the pre-cured state that electromagnetic radiation initiator component 106 is reactive with, resin composition 100 undergoes a curing process and may enter the post-cured state when the curing process is complete.

A binding agent generated during the curing process is configured to bind to first acrylate component 104 of resin composition 100, which causes the first acrylate component 104 to become a binding agent and becomes configured to bond with a second acrylate component 104 of resin composition 100, which causes the second acrylate component 104 to become a binding agent and becomes configured to bond with another acrylate component 104 of resin composition 100. In some examples, this propagating reaction may continue until two propagating chains meet. For example, if the first and second acrylate components 104 both include a bonded binding agent; then, when the first and second acrylate components 104 bond to each other, the propagating reaction ends in this chain. As another example, if only one of first and second acrylate components 104 includes a bonded binding agent; then, when the first and second acrylate components 104 bond to each other, the propagating reaction can continue. In other examples, the propagating reaction may terminate when oxygen reacts with a growing chain. By removing oxygen, such as by applying the requisite electromagnetic radiation to resin composition 100 in a vacuum or under a volume (e.g., a blanket) of inert gas such as nitrogen, early termination of propagating chains may be reduced.

In various embodiments, the type of electromagnetic radiation that electromagnetic radiation initiator component 106 is reactive with includes ultraviolet light. In such examples, electromagnetic radiation initiator component 106 may be referred to as a photoinitiator component or an ultraviolet light photoinitiator component. Electromagnetic radiation initiator component 106 may be reactive to one or more wavelengths in the ultraviolet spectrum. In some examples, the one or more wavelengths in the ultraviolet spectrum may include 385 nanometers. In other examples, the one or more wavelengths in the ultraviolet spectrum may be less than 385 nanometers, equal to 385 nanometers, greater than 385 nanometers, or any combination thereof. In various embodiments, the type of electromagnetic radiation that electromagnetic radiation initiator component 106 is reactive with includes ultraviolet light, visible light, infrared light, a non-light electromagnetic radiation source (e.g., heat), or any combination thereof. The type of electromagnetic radiation with which electromagnetic radiation initiator component 106 is reactive may be emitted or generated by a requisite electromagnetic radiation source. As an example, where the type of electromagnetic radiation that electromagnetic radiation initiator component 106 is reactive with includes ultraviolet light, an ultraviolet light source may be powered or activated to provide the requisite electromagnetic radiation, which is ultraviolet light in this example. An electromagnetic radiation source may, in some examples, be engaged by a robot in a robotic cell to enable manipulation of the electromagnetic radiation source in the robotic cell.

In some examples, electromagnetic radiation initiator component 106 may be a photoinitiator, such as a UV initiator, a visible initiator, or a combination of UV and visible initiators. A variety of UV initiators may be employed. In some examples, electromagnetic radiation initiator component 106 may be a member selected from the group consisting of benzophenone and substituted benzophenones, acetophenone and substituted acetophenones, benzoin and its alkyl esters, xanthone and substituted xanthones, phosphine oxides, diethoxy-acetophenone, benzoin methyl ether, benzoin ethyl ether, benzoin isopropyl ether, diethoxyxanthone, chloro-thio-xanthone, N-methyl diethanolamine-benzophenone, 2-hydroxy-2-methyl-1-phenyl-propan-1-one, 2-benzyl-2-(dimethylamino)-1-[4-(4-morpholinyl) phenyl]-1-butanone and mixtures thereof, initiators available commercially from IGM Resins under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethyl amino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis (2,6-dimethoxybenzoyl-2,4,4-trimethyl pentyl) phosphine oxide and 2-hydroxy-2-methyl-1-phenyl-propanl-one), and 819 [bis(2,4,6-trimethyl benzoyl) phenyl phosphine oxide], and "DAROCUR" 1173 (2-hydroxy-2-methyl-1-phenyl-lpropane) and 4265 (the combination of 2,4,6-trimethylbenzoyldiphenyl-phosphine oxide and 2-hydroxy-2-methyl 1-phenyl-propan-1-one); and 2,4,6-trimethylbenzoyldiphenylphosphine oxide (commercially available as LUCIRIN TPO from BASF Corp.), camphorquinone peroxyester initiators, 9-fluorene carboxylic acid peroxyesters, visible light [blue] photoinitiators, dl-camphorquinone, "IRGACURE" 784DC (photoinitiator based on substituted titanocenes), a trihalomethyl substituted-s-triazine, a sensitizing compound capable of absorbing radiation in the range of about 300-1000 nm and an electron donor, and any combination thereof. Example sensitizing compounds may include: ketones; coumarin dyes; xanthene dyes; 3H-xanthen-3-one dyes; acridine dyes; thiazole dyes; thiazine dyes; oxazine dyes; azine dyes; aminoketone dyes; methane and polymethine dyes; porphyrins; aromatic polycyclic hydrocarbons; psubstituted aminostyryl ketone compounds; aminotriaryl methanes; merocyanines; squarylium dyes; and pyridinium dyes. Example donors also may include: amines; amides; ethers; ureas; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid. In some examples, electromagnetic radiation initiator component 106 may be a member selected from the group consisting of photopolymerization initiators including a sensitizing compound that is capable of absorbing radiation in the range of about 250-1000 nm and 2-aryl-4,6-bis(trichloromethyl)-1,3,5-triazine. Example sensitizing compounds may include: cyanine dye, merocyanine dye, coumarin dye, ketocoumarin dye, (thio) xanthene dye, acridine dye, thiazole dye, thiazine dye, oxazine dye, azine dye, aminoketone dye, squarylium dye, pyridinium dye, (thia)pyrylium dye, porphyrin dye, triaryl methane dye, (poly) methane dye, amino styryl compounds and aromatic polycyclic hydrocarbons. In some examples, electromagnetic radiation initiator component 106 may be a member selected from the group consisting of fluorone photoinitiators, which are sensitive to visible light. Such fluorone initiator systems may include a coinitiator, which is capable of accepting an electron from the excited fluorone species. Example coinitiators may include: onium salts, nitrohalomethanes and diazosulfones. In some examples, electromagnetic radiation initiator component 106 may be a member selected from the group consisting of fluorone and pyronin-Y derivatives as initiators that absorb light at wavelengths of greater than 350 nm. In some examples, electromagnetic radiation initiator component 106 may be a member selected from the group consisting of a three-part photoinitiator system, which cures under UV or visible light. The three-part system may include an arylidonium salt, a sensitizing compound and an electron donor. Example iodonium salts may include diphenyliodonium salts. The sensitizer may be capable of absorbing light in the range of about 300-1000 nm. In some examples, electromagnetic radiation initiator component 106 may be a member selected from the group consisting of any electromagnetic radiation initiator component disclosed herein and any combination thereof.

Figure 5:
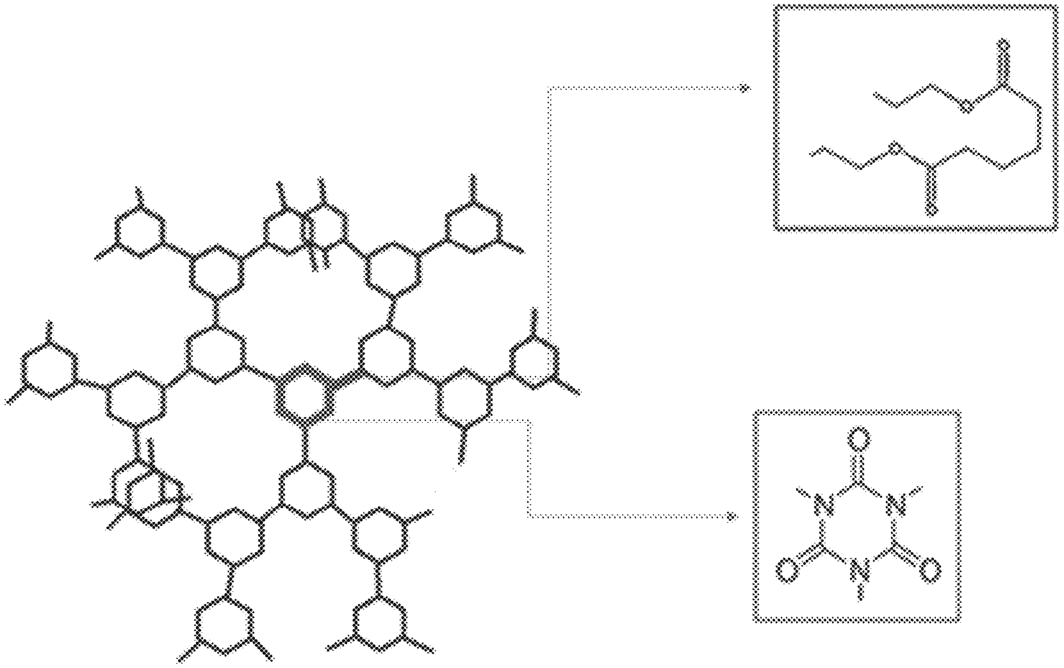
FIG. 5 illustrates an example cured matrix of an example resin composition in accordance with this disclosure.

FIG. 5 illustrates an example cured matrix of an example resin composition in accordance with this disclosure. Each hexagon represents a respective isocyanurate component 102 and each line between two hexagons represents two respective acrylate components 104 bonded together. Each unconnected line extending from a hexagon represents a respective acrylate component 104 not bonded with another respective acrylate component 104. The overlapping hexagons show that the cured matrix is three-dimensional.

Resin composition 100 may include multiple formulations. Each formulation of resin composition 100 may be described as each component of such formulation of resin composition 100 being a percent weight of the total weight of the composition in the pre-cured state or the post-cured state.

In some examples, isocyanurate component 102 and acrylate component 104 may together constitute a percentage within the range of about 30%-99.9% by weight of the total weight of an example formulation of resin composition 100 in the pre-cured state or post-cured state. Otherwise stated, acrylated component 105 may constitute a percentage within the range of about 30%-99.9% by weight of the total weight of an example formulation of resin composition 100 in the pre-cured state or post-cured state. For example, isocyanurate component 102 and acrylate component 104 may together constitute 29.5%, 30%, 40%, 50%, 60%, 80%, 90%, 95%, 97%, 99.9%, or 99.96% by weight of the total weight of resin composition 100 in the pre-cured state or post-cured state of an example formulation. As another example, isocyanurate component 102 and acrylate component 104 may together constitute at least Z % by weight of the total weight of resin composition 100 in the pre-cured state or post-cured state of an example formulation, where Z is equal to any percentage within the range of about 30%-99.9%. In such examples, the other components of a respective example formulation of resin composition 100 may constitute the remaining weight of the total weight. In some examples, such other components may include only electromagnetic radiation initiator component 106. For example, if isocyanurate component 102 and acrylate component 104 together constitute X % (where X is equal to any percentage within the range of about 30%-99.9%) by weight of the total weight of resin composition 100 in the pre-cured state or post-cured state of an example formulation, then electromagnetic radiation initiator component 106 may constitute Y % by weight of the total weight of resin composition 100 in the pre-cured state or post-cured state of the example formulation, where Y=100−X. In other examples, such other components may include electromagnetic radiation initiator component 106 and one or more additional components 108. For example, if isocyanurate component 102 and acrylate component 104 conjunctively constitute X % by weight of the total weight of resin composition 100 in the pre-cured state or post-cured state of an example formulation, then electromagnetic radiation initiator component 106 and one or more additional components 108 may conjunctively constitute Y % by weight of the total weight of resin composition 100 in the pre-cured state or post-cured state of the example formulation, where Y=100−X.

In some examples, electromagnetic radiation initiator component 106 may constitute a percentage within the range of about 0.01%-20% by weight of the total weight of an example formulation of resin composition 100 in the pre-cured state or post-cured state. For example, electromagnetic radiation initiator component 106 may constitute 0.008%, 0.01%, 0.04%, 0.08%, 0.1%, 1%, 5%, 10%, 20%, or 21% by weight of the total weight of resin composition 100 in the pre-cured state or post-cured of an example formulation. As another example, electromagnetic radiation initiator component 106 may constitute at least Z % by weight of the total weight of resin composition 100 in the pre-cured state or post-cured state of an example formulation, where Z is equal to any percentage within the range of about 0.01%-20%. In such examples, the other components of a respective example formulation of resin composition 100 may constitute the remaining weight of the total weight. In some examples, such other components may include only isocyanurate component 102 and acrylate component 104. For example, if electromagnetic radiation initiator component 106 constitutes X % (where X is equal to any percentage within the range of about 0.01%-20%) by weight of the total weight of resin composition 100 in the pre-cured state or post-cured state of an example formulation, then isocyanurate component 102 and acrylate component 104 may together constitute Y % by weight of the total weight of resin composition 100 in the pre-cured state or post-cured state of the example formulation, where Y=100−X. In other examples, such other components may include isocyanurate component 102, acrylate component 104, and one or more additional components 108. For example, if electromagnetic radiation initiator component 106 constitutes X % by weight of the total weight of resin composition 100 in the pre-cured state or post-cured state of an example formulation, then isocyanurate component 102, acrylate component 104, and one or more additional components 108 may conjunctively constitute Y % by weight of the total weight of resin composition 100 in the pre-cured state or post-cured state of the example formulation, where Y=100−X.

In examples where an example formulation of resin composition 108 includes one or more additional components 108 in the pre-cured state or post-cured state, such one or more additional components 108 may individually or together constitute a percentage within the range of about 0.1%-70% by weight of the total weight of an example formulation of resin composition 100 in the pre-cured state or post-cured state. For example, one or more additional components 108 may individually or together constitute 0.07%, 0.1%, 0.5%, 1%, 5%, 10%, 20%, 30%, 40%, 50%, 60%, 70, or 70.4% by weight of the total weight of resin composition 100 in the pre-cured state or post-cured state of an example formulation. As another example, one or more additional components 108 may individually or together constitute at least Z % by weight of the total weight of resin composition 100 in the pre-cured state or post-cured state of an example formulation, where Z is equal to any percentage within the range of about 0.1%-70%. In such examples, the other components of a respective example formulation of resin composition 100 may constitute the remaining weight of the total weight. In some examples, such other components may include only isocyanurate component 102, acrylate component 104, and electromagnetic radiation initiator component 106. For example, if one of the one or more additional components 108 constitutes X % (where X is equal to any percentage within the range of about 0.1%-70%) by weight of the total weight of resin composition 100 in the pre-cured state or post-cured state of an example formulation, then isocyanurate component 102, acrylate component 104, and electromagnetic radiation initiator component 106 may conjunctively constitute Y % by weight of the total weight of resin composition 100 in the pre-cured state or post-cured state of the example formulation, where Y=100−X. As another example, if N of the one or more additional components 108 together constitute X % (where X is equal to any percentage within the range of about 0.1%-70% and N is equal to the number of one or more additional components 108 in an example formulation of resin composition 100) by weight of the total weight of resin composition 100 in the pre-cured state or post-cured state of an example formulation, then isocyanurate component 102, acrylate component 104, and electromagnetic radiation initiator component 106 may together constitute Y % by weight of the total weight of resin composition 100 in the pre-cured state or post-cured state of the example formulation, where Y=100−X. For example, if the one or more additional components 108 includes a filler component, a toughener component, and an antioxidant component, then in such an example N equals 3. As another example, if a first component of the one or more additional components 108 constitutes A % (where A is equal to any percentage within the range of about 0.1%-70%) by weight of the total weight of resin composition 100 in the pre-cured state or post-cured state of an example formulation and a second component of the one or more additional components 108 constitutes B % (where B is equal to any percentage within the range of about 0.1%-70%) by weight of the total weight of resin composition 100 in the pre-cured state or post-cured state of the example formulation, then isocyanurate component 102, acrylate component 104, and electromagnetic radiation initiator component 106 may conjunctively constitute Y % by weight of the total weight of resin composition 100 in the pre-cured state or post-cured state of the example formulation, where Y=100−(A+B). In other examples, such other components may include isocyanurate component 102, acrylate component 104, electromagnetic radiation initiator component 106, and one or more additional components 108. For example, if one of the one or more additional components 108 constitutes X % by weight of the total weight of resin composition 100 in the pre-cured state or post-cured state of an example formulation, then isocyanurate component 102, acrylate component 104, electromagnetic radiation initiator component 106, and one or more additional components 108 (e.g., one or more additional components 108 that are different than the one additional component 108 that constitutes X %) may together constitute Y % by weight of the total weight of resin composition 100 in the pre-cured state or post-cured state of the example formulation, where Y=100−X.

In some examples, resin composition 100 may include one or more additional components 108, which may include a filler component. A filler component may be configured to impart one or more properties to resin composition 100. A filler component may include a single filler component or a combination of filler components to impart the one or more properties to resin composition 100. The one or more properties may include viscosity, tensile strength, brittleness, or any combination thereof. For example, a filler component may be configured to increase the viscosity of resin composition 100 in the pre-cured state, increase the tensile strength of resin composition 100 in the post-cured state, reduce crack propagation in resin composition 100 in the post-cured state, or any combination thereof.

In some examples, resin composition 100 may include one or more additional components 108, which may include a reactive monomer component. A reactive monomer component may be configured to impart one or more properties to resin composition 100. A reactive monomer component may include a single reactive monomer component or a combination of reactive monomer components to impart the one or more properties to resin composition 100. The one or more properties may include the speed at which resin composition 100 is curable in the pre-cured state, the hardness of resin composition 100 in the post-cured state (e.g., increasing or decreasing the softening point of resin composition 100 in the post-cured state), increasing or decreasing the dissolvability of one or components of the resin composition into the resin composition, or any combination thereof. For example, a reactive monomer component may be configured to decrease or increase the speed at which resin composition 100 is curable in the pre-cured state, increase or decrease the hardness (e.g., softening point) of resin composition 100 in the post-cured state, increase or decrease the dissolvability of one or components of resin composition 100 into resin composition 100, or any combination thereof.

In some examples, resin composition 100 may include one or more additional components 108, which may include an adhesion promoter component. An adhesion promoter component may be configured to impart one or more properties to resin composition 100. An adhesion promoter component may include a single adhesion promoter component or a combination of adhesion promoter components to impart the one or more properties to resin composition 100. The one or more properties may include enablement of a bond (e.g., a physical bond, a chemical bond, or a combination thereof) between resin composition 100 and a material. For example, an adhesion promoter component may be configured to enable a bond (e.g., a physical bond, a chemical bond, or a combination thereof) between resin composition 100 and a material. The material may include any material, such as metal, plastic, glass, ceramic, a composite, animal tissue, or any combination thereof. The material may correspond to a structure. For example, the material may be a coating on a structure on which resin composition 100 may be applied. As another example, the material may be the material of a structure on which resin composition 100 may be applied. In such an example, the material may be the structure or a portion of the structure on which resin composition 100 may be applied. In some examples, the bond enabled by the adhesion promoter component may be formed during the curing process of resin composition 100 such that the bond between resin composition 100 and the material in the post-cured state is a stronger bond than if the adhesion promoter component was not present in resin composition 100. In other examples, the bond enabled by the adhesion promoter component may be formed before the curing process of resin composition 100 such that the bond between resin composition 100 and the material in the post-cured state is a stronger bond than if the adhesion promoter component was not present in resin composition 100.

In some examples, resin composition 100 may include one or more additional components 108, which may include a flow modifier component. A flow modifier component may be configured to impart one or more properties to resin composition 100. A flow modifier component may include a single flow modifier component or a combination of flow modifier components to impart the one or more properties to resin composition 100. The one or more properties may include interaction between two or more components of resin composition 100, enablement of a filler component to impart one or more properties to the resin composition, or any combination thereof. In some examples, the two or more components may include a filler component and any other component of resin composition 100. For example, a flow modifier component may be configured to interact with or between two or more components of resin composition 100 in the pre-cured state. As another example, a flow modifier component may be configured to change the interaction between two or more other components of resin composition 100 with themselves.

In some examples, resin composition 100 may include one or more additional components 108, which may include a toughener component. A toughener component may be configured to impart one or more properties to resin composition 100 in the post-cured state. A toughener component may include a single toughener component or a combination of toughener components to impart the one or more properties to resin composition 100. The one or more properties may include brittleness. For example, a toughener component may be configured to reduce crack propagation in resin composition 100 in the post-cured state.

In some examples, resin composition 100 may include one or more additional components 108, which may include an antioxidant component. An antioxidant component may be configured to impart one or more properties to resin composition 100 in the post-cured state. An antioxidant component may include a single antioxidant component or a combination of antioxidant components to impart the one or more properties to resin composition 100. The one or more properties may include resilience of the resin composition 100 in the post-cured state, such as at, above, or below a temperature. For example, an antioxidant component may be configured to increase or decrease the resilience of resin composition 100 in the post-cured state at, above, or below a temperature. In some examples, the temperature may be a temperature within the range of about 5 °C-300 °C. For example, an antioxidant component may be configured to increase or decrease the resilience of resin composition in the post-cured state at, above, or below X° C., where X equals a temperature within the range of 5 °C-300 °C, such as 5 °C, 10 °C, 20 °C, 40 °C, 100 °C, 200 °C, 250 °C, 300 °C, or 303 °C. In some examples, resilience may refer to the temperature at which resin composition 100 may begin to decompose.

In some examples, resin composition 100 may include one or more additional components 108, which may include a dye component. A dye component may be configured to impart one or more color properties to resin composition 100. A dye component may include a single dye component or a combination of dye components to impart the one or more color properties to resin composition 100. The one or more properties may include one or more colors. For example, a dye component may be configured to provide one or more color properties to resin composition 100. For example, the one or more colors may include a first color and a second color. The first color may be indicative of resin composition 100 being in the pre-cured state, and the second color may be indicative of resin composition 100 being in the post-cured state.

In some examples, acrylate component 104 or acrylated isocyanurate component 105 may be or include a methacrylate component. In some examples, acrylate component 104 or acrylated isocyanurate component 105 may be or include a member selected from the group consisting of monofunctional (meth)acrylic monomers including, for example, butanediol mono(meth)acrylate, cyclohexyl (meth)acrylate, dicyclopentanyl (meth)acrylate, dicyclopentenyl (meth) acrylate, dicyclopentenyl oxyethyl (meth)acrylate, N,N-di ethyl aminoethyl (meth)acrylate, 2-ethoxyethyl (meth)acrylate, 2-hydroxyethyl (meth)acrylate, 2-hydroxypropyl (meth)acrylate, caprolactone-modified 2-hydroxyethyl (meth)acrylate, isobornyl (meth)acrylate, lauryl (meth)acrylate, acryloylmorpholine, N-vinyl caprolactam, nonylphenoxypolyethylene glycol (meth)acrylate, nonylphenoxypolypropylene glycol (meth)acrylate, phenoxyethyl (meth) acrylate, phenoxyhydroxypropyl (meth)acrylate, phenoxydiethylene glycol (meth)acrylate, polyethylene glycol (meth)acrylate, polypropylene glycol (meth)acrylate, tetrahydrofurfuryl (meth)acrylate and the like; polyfunctional (meth)acrylic monomers including, for example, 1,4-butanediol di(meth)acrylate, dicyclopentanyl di(meth)acrylate, ethylene glycol di(meth)acrylate, dipentaerythritol hexa (meth)acrylate, caprolactone-modified dipentaerythritol hexa(meth)acrylate, 1,6-hexanediol di(meth)acrylate, neopentyl glycol di(meth)acrylate, pentaerythritol tri (meth) acrylate, polyethylene glycol di(meth)acrylate, polypropylene glycol di(meth)acrylate, tetraethylene glycol di(meth) acrylate, trimethylolpropane tri(meth)acrylate, tris(acryloxyethyl)isocyanurate, caprolactone-modified tris(acryl oxyethyl) isocyanurate, tris(methacryloxyethyl)isocyanurate, tricyclodecane dimethanol di(meth)acrylate and the like, and any combination thereof. In some examples, monofunctional (meth)acrylic monomers and polyfunctional (meth)acrylic monomers may be used solely or in combination with 2 or more monomers, or may be used in combination with the monofunctional and polyfunctional monomers. (meth)acrylic oligomers are those having at least one (meth)acryloyl group, and they include, for example, epoxy acrylate, urethane acrylate, polyester acrylate, polyol acrylate, polyether acrylate, silicone resin acrylate, melamine acrylate, and the like. As a component used in combination, monofunctional (meth)acrylate compounds may be used for viscosity adjustment and/or physical property adjustment.

In some examples, a filler component may be a member selected from the group consisting of inorganic filler such as silica, diatomaceous earth, alumina, zinc oxide, iron oxide, magnesium oxide, tin oxide, titanium oxide, magnesium hydroxide, aluminum hydroxide, magnesium carbonate, barium sulphate, gypsum, calcium silicate, talc, glass bead, sericite activated white earth, bentonite, aluminum nitride, silicon nitride, and any combination thereof. In some examples, a filler component may act as a flow modifying agent.

In some examples, a reactive monomer component may be a member selected from the group consisting of any acrylate component disclosed herein, and any combination thereof.

In some examples, an adhesion promoter component may be a member selected from the group consisting of acid functional monomers such as acrylic acid or methacrylic acid, and silane adhesion promoters such as glycidoxypropyltrimethoxysilane, methacryloxypropyltrimethxysilane, methacryloxypropyltriacetxysilane, and acryloxypropyltrimethoxysilane, γ-aminopropyltriethoxysilan, γ-mercaptopropyltrimethoxysilane, and various unsaturated nitrogen-containing compounds such as N,N'-dimethylacrylamide, acryloyl morpholine, and other adhesion promoters such as N-methyl-N-vinyl acetamide, N-vinyl caprolactam, N-vinylphthalimide, Uracil, and N-vinylpyrrolidone, and any combination thereof. Adhesion promoters may be used alone or in combination. In some examples, one or more adhesion promoters may together constitute a percentage within the range of about 0.5% to about 30% by weight of the total weight of an example formulation of resin composition 100. In other examples, one or more adhesion promoters may together constitute a percentage within the range of about 1% to about 2.0% by weight of the total weight of an example formulation of resin composition 100.

In some examples, a flow modifier component may be a member selected from the group consisting of talc, fine particle silica, superfine surface-treated calcium carbonate, fine particle alumina, plate-like alumina; layered compound such as montmorillonite; spicular compound such as aluminum borate whisker, and any combination thereof. In some examples, a flow modifier component that may work in combination with a filler component may include (1) products available from BYK USA Inc. 11719 Bee Cave Rd. Suite 103, TX 78738 Austin, United States such as Rheobuk-420, Rheobyk-7405, Rheobyk-7411 ES, Byk R607; (2) titanate, zirconate, and luminate products available from Kenrich Petrochemicals, INC. in Bayonne, NJ, USA such as KR® 55, KZ® 55, KZ® TPP, LICA® 38, NZ® 38, KR® TTS, NZ® 01, LICA® 09, NZ® 09 NZ® 37, NZ® 44, KR® 44, LICA® 44, NZ® 97, LICA® 97, NZ® 33, NZ® 97, LICA® 12, NZ® 12; and (3) phosphate esters available from Rhan USA Corporation such as Genorad 40 and Genorad 41.

In some examples, a toughener component may be a member selected from the group consisting of acrylic impact modifiers, MBS based tougheners, and any combination thereof. In some examples, a toughener component may include a toughener component provided by Kaneka Americas such as FM-40, FM-41, FM-60, FM-80; an MBS based toughener such as B-22, B-51, B-56, B-522, B-564, B-626, B-632, B-636, B-637; or a toughener component available from Galata Chemicals in Hahnville, LA, USA may be used such as Blendex 338, Blendex 374, Blendex 362, Blendex 3160.

In some examples, an antioxidant component may be a member selected from the group consisting of hindered phenols, diaryl secondary amines, hindered amines and benzotriazoles, and any combination thereof. Examples of the hindered phenols may include Irganoxl 010, Irganoxl 076, Irganoxl 098, Irganoxl 1135, Irganox 245 and BHT available from BASF Corporation.

In some examples, a dye component may be a member selected from the group consisting of any dye or pigment available from Chemworld International LTD.

Figure 6:
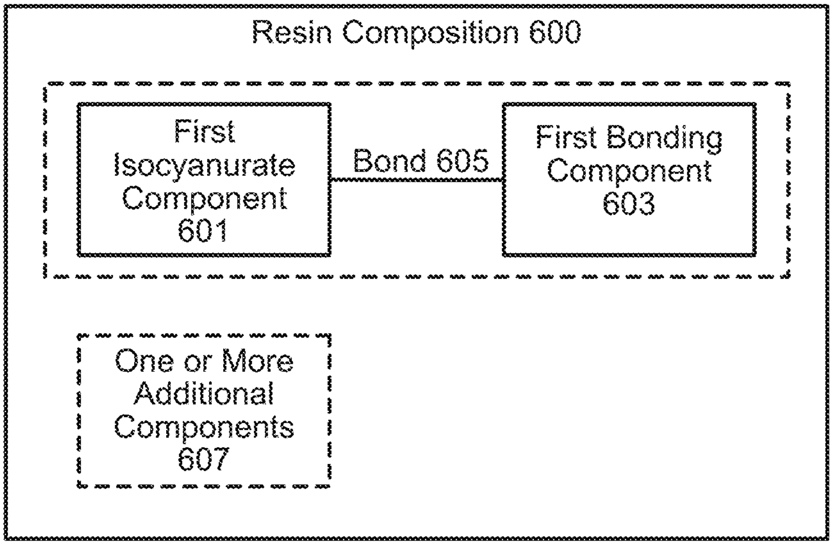
FIG. 6 illustrates an example resin composition in accordance with this disclosure.

FIG. 6 illustrates a resin composition 600 according to various embodiments. Resin composition 600 can include a first isocyanurate component 601 and a first bonding component 603 bonded to the first isocyanurate component through a bond 605. First bonding component 603 can be configured to bond to a second bonding component (not shown) that is bonded to a second isocyanurate component (not shown). In particular, first bonding component 603 can be configured to bond to the second bonding component based upon an application of an initiator to resin composition 600. In this way, first isocyanurate component 601 can be coupled to the second isocyanurate component. Resin composition 600 can be either in a pre-cured state in which the first isocyanurate component is not coupled to the second isocyanurate component or in a post-cured state in which at least a portion of the first isocyanurate component is coupled to at least a portion of the second isocyanurate component.

In various embodiments, resin composition 600 can include one or more additional components 607, such as one or more additional components 108 described above. In this regard, various of the one or more additional components described above may be included in resin composition 600.

In various embodiments, the initiator can include electromagnetic radiation, such as ultraviolet (UV) radiation. In this example, one or more additional components 607 may include an initiator component, such as an electromagnetic radiation initiator component, that is not bonded to the first or second cyanurate components or to the first or second bonding components. The electromagnetic radiation initiator component may be configured to generate a first binding agent in response to a reaction with the electromagnetic radiation. The first binding agent may be configured to bind with first bonding component 603, such that the first bonding component becomes a second binding agent to bond to the second bonding component, similar to the embodiment described above with respect to FIG. 1. In this regard, for example, first bonding component 603 may include an acrylate or a methacrylate, similar to the above embodiment.

On the other hand, in various embodiments, first bonding component 603 can be configured to become a binding agent in response to a reaction with the initiator, such as electromagnetic radiation, such that the first bonding component bonds to the second bonding component (i.e., bond 605) as a result of the reaction of the first bonding component to the initiator, which results in first isocyanurate component 601 being coupled to the second isocyanurate component through bond 605. In this regard, first bonding component may be thought of as a self-initiating bonding component because the first bonding component itself reacts to the initiator. Some examples of first bonding components that can be self-initiating are a maleimide or a thiol-ene.

In various embodiments, the initiator can include heat. In these embodiments, for example, first bonding component 603 can include a peroxide or an epoxy. A first bonding component that is a peroxide may become a binding agent as a result of being heated above a particular temperature, which can cause the peroxide to become a radical, which can then bond to another peroxide (i.e., the second bonding component). Likewise, a first bonding component that is an epoxy may be reactive to heat or electromagnetic radiation.

In various embodiments, one or more additional components 607 can include a peroxide, which can react to heat to produce radicals (i.e., a binding agent) or other component that is reactive to heat such that it produces a binding agent.

In another example, in various embodiments first bonding component 603 can be configured to bond to the second bonding component based upon a mixing of the first bonding component with the second bonding component, such that the first isocyanurate component is coupled to the second isocyanurate component when the two bonding components are mixed. For example, first bonding component 603 may include an epoxy that can bond when mixed with the second bonding component, which may be a counterpart epoxy.

The resin compositions described herein may be used in an assembly process, for example, to retain structures together during the assembly process. In this regard, any of the structural and/or UV adhesives described below in reference to FIGS. 7-15 may be any suitable resin compositions described herein. In various embodiments, the resin compositions may be used as quick-cure adhesives to retain structures. In various embodiments, the resin compositions may be used as structural adhesives.

Figure 7:
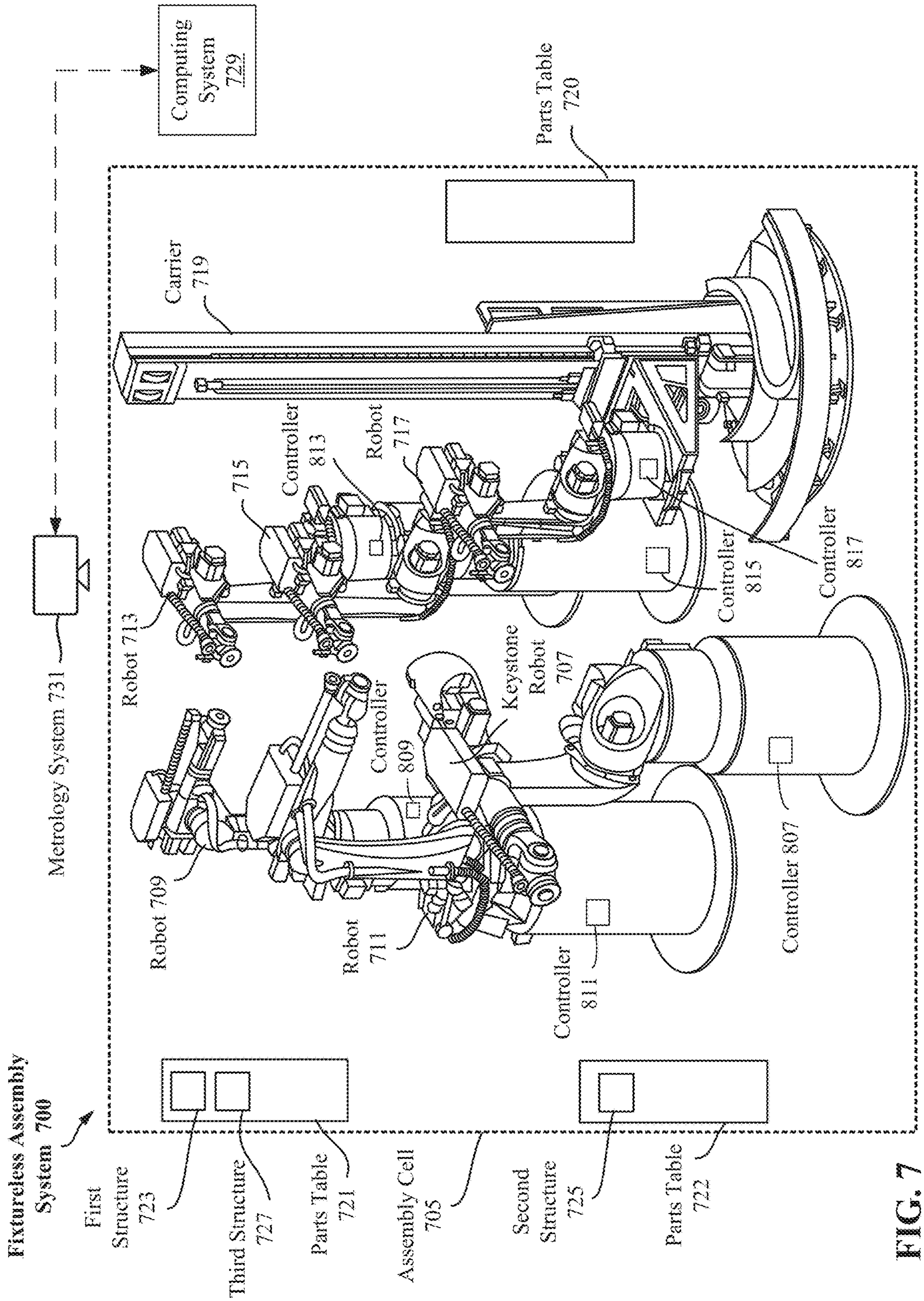
FIG. 7 illustrates a perspective view of an example fixtureless assembly system in which various suitable resin compositions described herein may be used.

FIG. 7 illustrates a perspective view of a fixtureless assembly system 700. Fixtureless assembly system 700 may be employed in various operations associated with fixtureless assembly of a vehicle, such as robotic assembly of a node-based vehicle. Fixtureless assembly system 700 may include one or more elements associated with at least a portion of the assembly of a vehicle without any fixtures. For example, one or more elements of fixtureless assembly system 700 may be configured for one or more operations in which a first structure is joined with one or more other structures without the use of any fixtures during robotic assembly of a node-based vehicle.

An assembly cell 705 may be configured at the location of fixtureless assembly system 700. Assembly cell 705 may be a vertical assembly cell. Within assembly cell 705, fixtureless assembly system 700 may include a set of robots 707, 709, 711, 713, 715, 717. Robot 707 may be referred to as a "keystone robot." Fixtureless assembly system 700 may include parts tables 720, 721, and 722 that can hold parts and structures for the robots to access. For example, a first structure 723, a second structure 725, and a third structure 727 may be positioned on one of parts tables 721, 722 to be picked up by the robots and assembled together. In various embodiments, each of the structures can weigh at least 10 g, 100 g, 500 g, 1 kg, 5 kg, 10 kg, or more. In various embodiments, each of the structures can have a volume of at least 10 ml, 100 ml, 500 ml, 1000 ml, 7000 ml, 10,000 ml, or more. In various embodiments, one or more of the structures can be an additively manufactured structure, such as a complex node.

Fixtureless assembly system 700 may also include a computing system 729 to issue commands to the various controllers of the robots of assembly cell 705, as described in more detail below. In this example, computing system 729 is communicatively connected to the robots through a wireless communication. Fixtureless assembly system 700 may also include a metrology system 731 that can accurately measure the positions of the robotic arms of the robots and/or the structures held by the robots, as described in more detail below.

In some embodiments, robot 713 of assembly cell 705 may be used to affect a structural connection between structures. In the illustrative example of FIGS. 8A through 8I, robot 713 may be referred to as a "structural adhesive robot." Structural adhesive robot 713 may be similar to the keystone robot 707, except the structural adhesive robot may include a tool at the distal end of the robotic arm that is configured to apply structural adhesive to at least one surface of structures fixturelessly retained by the keystone robot and structures fixturelessly retained by assembly robots 709, 711 before or after the structures are positioned at joining proximities with respect to other structures for joining with the other structures. The joining proximity can be a position that allows a first structure to be joined to a second structure. For example, in various embodiments, the first and second structures may be joined though the application of an adhesive, such as any suitable resin compositions described herein, while the structures are within the joining proximity and subsequent curing of the adhesive.

However, structural adhesives might take a relatively long time to cure. If this is the case, the robots retaining the first and second structures, for example, might have to hold the structures at the joining proximity for a long time in order for the structures to be joined by the structural adhesive once it finally cures. This would prevent the robots from being used for other tasks, such as continuing to pick up and assemble structures, for a long time while the structural adhesive cures. In order to allow more efficient use of the robots, for example, in various embodiments a quick-cure adhesive, such as any suitable resin compositions described herein, may be additionally applied to join the structures quickly and retain the structures so that the structural adhesive can cure without requiring both robots to hold the structures. Various resin compositions described herein may be advantageously used as quick-cure adhesives in this regard because they may have shorter cure times than conventional quick-cure adhesives.

In this regard, robot 715 of fixtureless assembly system 700 may be used to apply quick-cure adhesive and to cure the adhesive quickly. In this example embodiment, a quick-cure UV adhesive may be used, and robot 715 may be referred to as a "UV robot." UV robot 715 may be similar to keystone robot 707, except the UV robot may include a tool at the distal end of the robotic arm that is configured to apply a quick-cure UV adhesive and to cure the adhesive, e.g., when a first structure is positioned within the joining proximity with respect to a second structure. That is, UV robot 715 may cure an adhesive after the adhesive is applied to the first structure and/or second structure when the structures are within the joining proximity obtained through direction of at least one of the robotic arms of keystone robot 707 and/or assembly robots 709, 711.

In contrast to various other assembly systems that may include a positioner and/or fixture table, described above, the use of a curable adhesive (e.g., quick-cure adhesive) may provide a partial adhesive bond that provides a way to retain the first and second structures during the joining process without the use of fixtures. The partial adhesive bond may provide one way to replace various fixtures that would otherwise be employed for engagement and retention of structures in an assembly system that, for example, uses a positioner and/or fixture table. Another potential benefit of fixtureless assembly, particularly using a curable adhesive, is improved access to various structures of a structural assembly in comparison with the use of fixtures and/or other part-retention tools, which inherently occlude access to sections of the structures to which they are attached.

Moreover, at least partially replacing fixtures and/or other part-retention tools with curable adhesives may provide a more reliable connection at one or more locations on a structural assembly in need of support—particularly where such locations in need of support are rendered nearly or entirely inaccessible by the fixtures and/or other part-retention tools. In addition, at least partially replacing fixtures and/or other part-retention tools with curable adhesives may provide the ability to add more structures to a structural assembly before application of a (permanent) structural adhesive-particularly where fixtures and/or other part-retention tools would hinder access for joining additional structures.

Example operations of fixtureless assembly system 700 will now be described in FIGS. 8A through 8I. As described herein, the example operations may be caused by at least one of controllers 807, 809, 811, 813, 815, 817 communicatively coupled with robots 707, 709, 711, 713, 715, 717. In some embodiments, computing system 729 may issue commands to controllers 807, 809, 811, 813, 815, 817 to cause the example operations. Computing system 729 and/or controllers 807, 809, 811, 813, 815, 817 may cause the example operations based on CAD data, which may model the physical robots performing the example operations, and/or positional data, which may be provided by metrology system 731.

For the example operations of fixtureless assembly system 700, robots 707, 709, 711, 713, 715, 717 may be positioned relatively proximate to one another, e.g., at distances suitable for the example operations described below. In some embodiments, one or more robots 707, 709, 711, 713, 715, 717 may be positioned in fixtureless assembly system 700 at locations suitable for the one or more example operations prior to the example operations described below. At such locations, the respective bases of those one or more robots may be static throughout the example operations of fixtureless assembly system 700. However, movement of the robotics arms of robots 707, 709, 711, 713, 715, 717 may be controlled in coordination at various stages of fixtureless assembly system 700, such as by rotating about the respective bases, turn at a hinge, and/or otherwise articulate.

In some other embodiments, different robots 707, 709, 711, 713, 715, 717 may be dynamically (re)positioned at different distances from one another at different stages of fixtureless assembly. Carrier 719 may be configured to move one or more robots 707, 709, 711, 713, 715, 717 to their respective positions, e.g., according to execution by one or more processors of one or more sets of instructions associated with fixtureless assembly. Whether static or dynamic, the respective locations at which each of robots 707, 709, 711, 713, 715, 717 is positioned may be based on one or more sets of coordinates associated with fixtureless assembly system 700 (e.g., one or more sets of absolute coordinates).

Figure 8A:
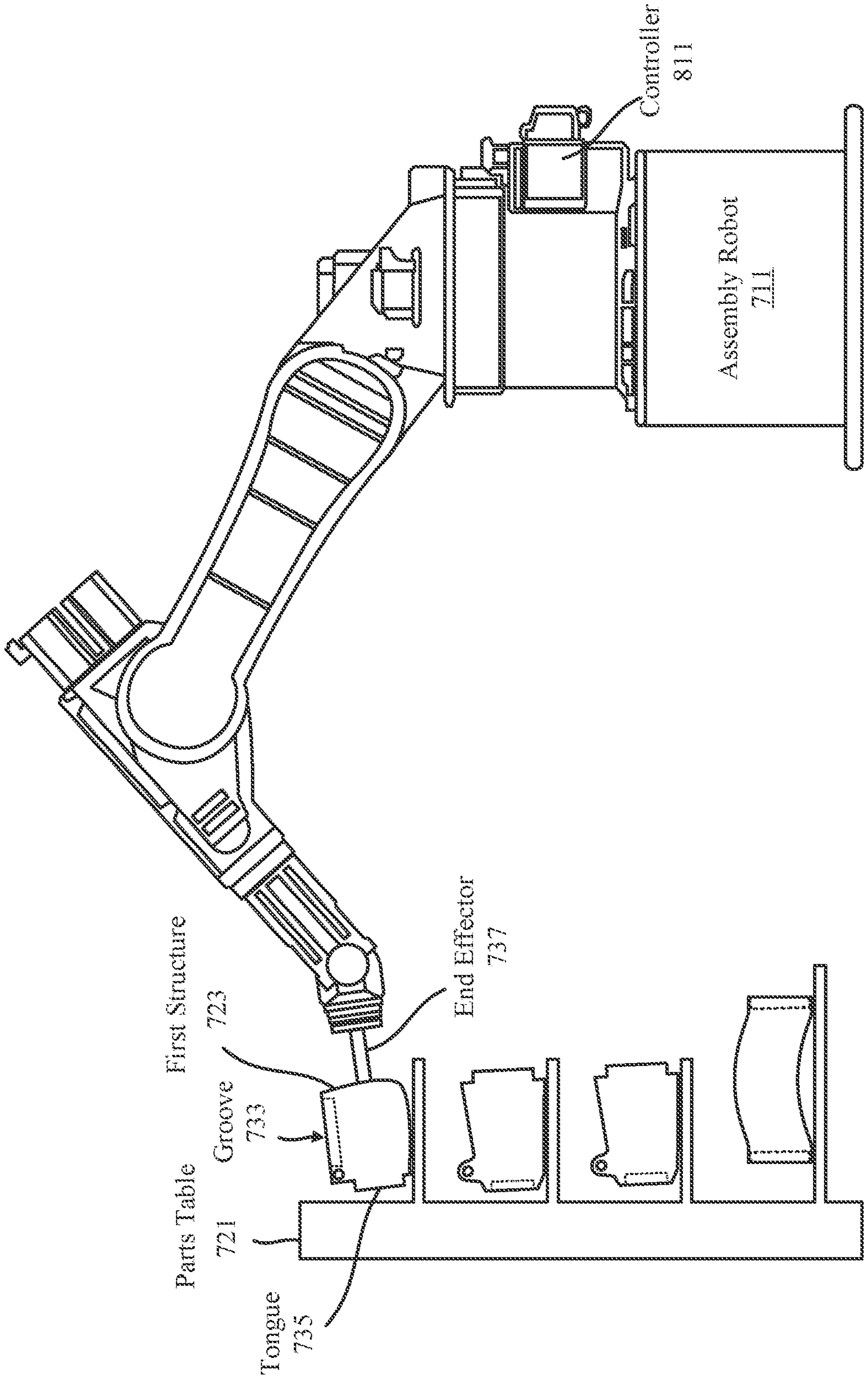
FIGS. 8A-I illustrate an example assembly process in which various suitable resin compositions described herein may be used.

Referring first to FIG. 8A, assembly robot 711 can engage first structure 723. First structure 723 may include one or more features that enable joining of first structure 723 with one or more other structures. Illustratively, first structure 723 may include a groove 733 on a first surface and may include a tongue 735 on a second surface. The first surface and the second surface of first structure 723 may be different sides of the first structure (e.g., the first surface may be on a left or top side of first structure 723 and the second surface may be on a right or bottom side of first structure 723, or vice versa).

Assembly robot 711 may be located relatively proximate to parts table 721. At such a location, the robotic arm of assembly robot 711 may be within a proximity at which the robotic arm of assembly robot 711 is able to reach at least a portion of the parts located on parts table 721. In the example embodiment of FIG. 8A, assembly robot 711 may be located at one side of parts table 721, and groove 733 of first structure 723 may be relatively closer to assembly robot 711 than tongue 735 of first structure 723 at such a location of assembly robot 711.

Assembly robot 711 may be connected to an end effector 737. Illustratively, the distal end of the robotic arm of assembly robot 711 may be connected to end effector 737, which may be built onto the distal end of the robotic arm or may be attached to the robotic arm (and may be fixed or removable). End effector 737 of assembly robot 711 may be configured to engage (e.g., "pick up") and retain one or more structures. For example, end effector 737 of assembly robot 711 may be configured to engage with different structures, such as via one or more features of the different structures. Some examples of such an end effector may include jaws or grippers.

Assembly robot 711 may engage with first structure 723, e.g., approximately at a side of the first structure that does not have groove 733 or tongue 735. Specifically, the robotic arm of assembly robot 711 may move to a position at which end effector 737 of assembly robot 711 can engage first structure 723. At this position, end effector 737 of assembly robot 711 engages with first structure 723, e.g., at the different side and/or surface than groove 733 or tongue 735. Once engaged, assembly robot 711 may retain first structure 723, e.g., by means of end effector 737. When first structure 723 is retained by assembly robot 711, assembly robot 711 may move first structure 723 to one or more positions at which one or more example operations of fixtureless assembly may be performed, as further described below.

Figure 8B:
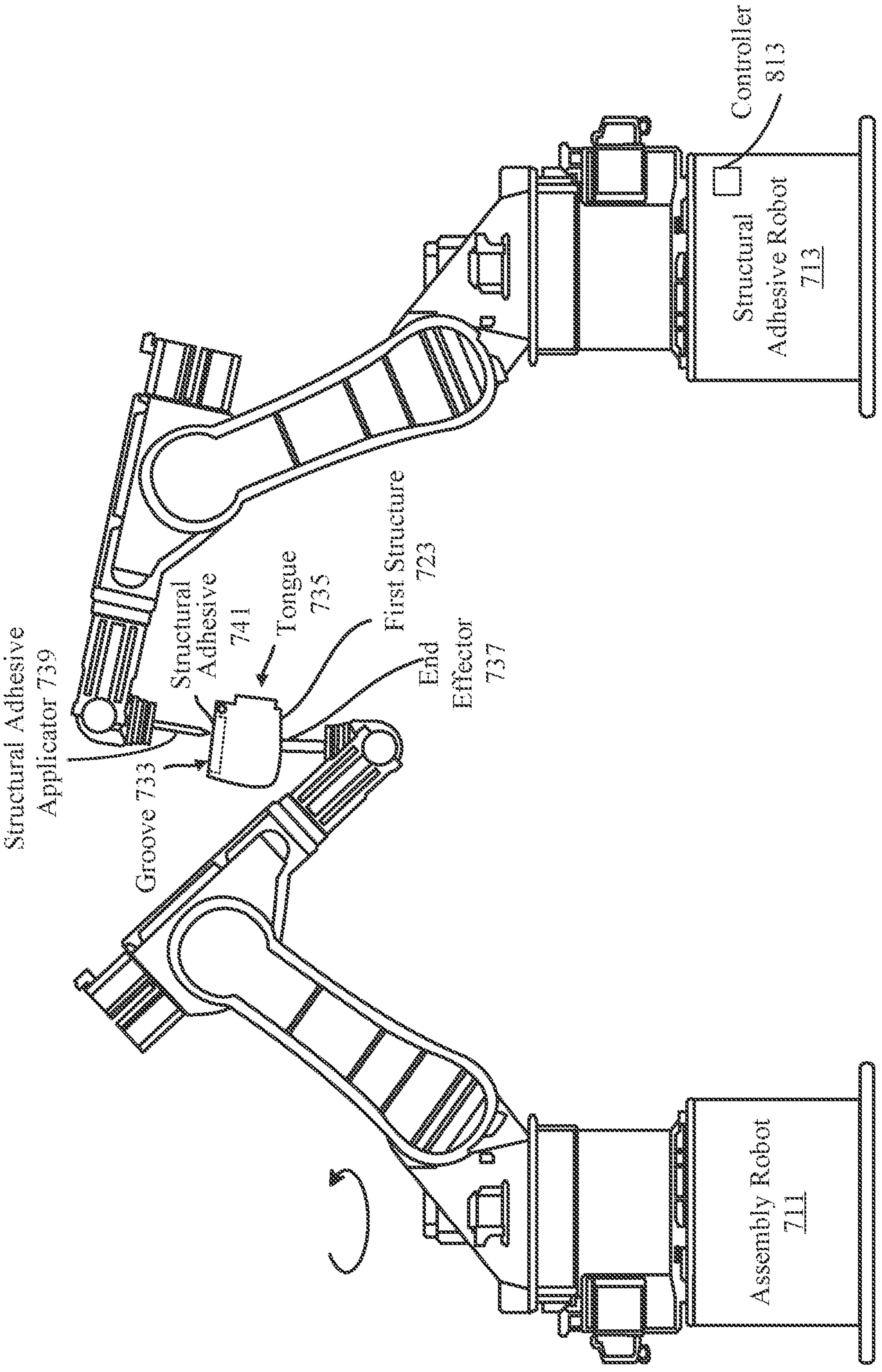

Next referring to FIG. 8B, assembly robot 711 may turn to face structural adhesive robot 713. The distal end of the robotic arm of assembly robot 711 may be positioned toward structural adhesive robot 713, and similarly, the distal end of the robotic arm of structural adhesive robot 713 may be positioned toward assembly robot 711.

At this example location illustrated in FIG. 8B, assembly robot 711 may move first structure 723 to a position at which the first structure is approximately between assembly robot 711 and structural adhesive robot 713. Further, assembly robot 711 may orient first structure 723 so that groove 733 is facing approximately upward, such as by causing the robotic arm of assembly robot 711 and/or end effector 737 of assembly robot 711 to move such that first structure 723 is oriented approximately upward.

Structural adhesive robot 713 may be connected to a structural adhesive applicator 739 or other similar tool. Illustratively, structural adhesive applicator 739 may be built onto the distal end of the robotic arm or may be attached to the robotic arm (and may be fixed or removable). Structural adhesive applicator 739 may be configured to deposit adhesive on structural surfaces.

When first structure 723 is suitably positioned (e.g., between the two robots 711, 713), structural adhesive robot 713 may cause application of the adhesive to first structure 723. Specifically, structural adhesive robot 713 may deposit the adhesive into groove 733 of first structure 723. To do so, structural adhesive robot 713 may move its robotic arm to a position such that structural adhesive applicator 739 is above groove 733, and is sufficiently close so that a controlled amount of the adhesive can be deposited within a defined area while avoiding deposition of the adhesive on unintended surfaces. At such an above position, an adhesive application tip of structural adhesive applicator 739 may be approximately directly above groove 733, and may be pointed downward into groove 733.

After being deposited, the controlled amount of adhesive may at least partially fill groove 733. In some embodiments, the controlled amount of adhesive may entirely or nearly entirely fill groove 733. The amount of adhesive, however, may be controlled such that the adhesive does not overflow outside groove 733 and onto the first surface of first structure 723 that bounds groove 733. For example, the amount of adhesive deposited in groove 733 may be controlled such that the adhesive does not leak onto any surfaces of first structure 723 when a protrusion, such as a tongue, of another structure is inserted into groove 733 when first structure 723 is joined with the other structure.

Figure 8C:
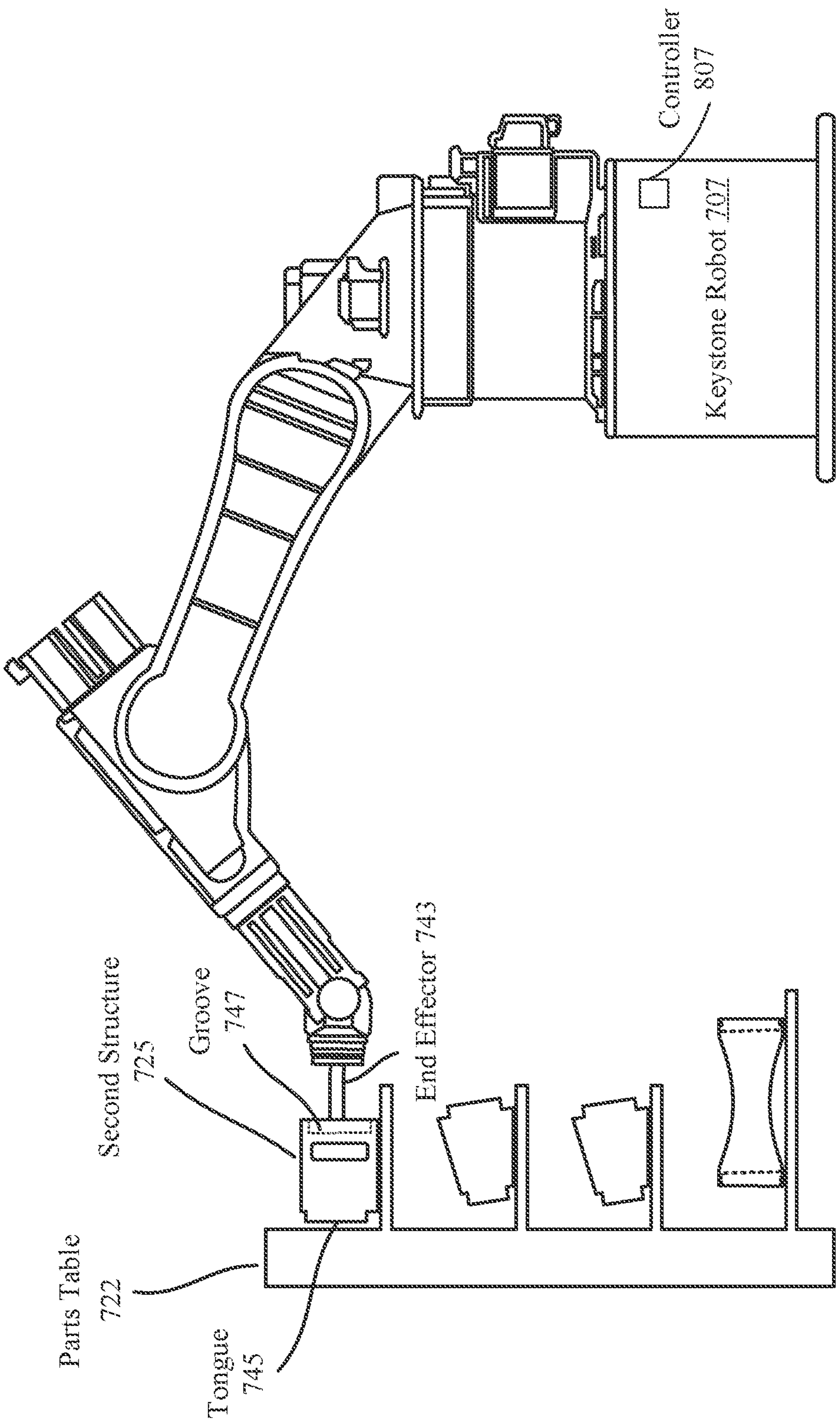

Turning to FIG. 8C, keystone robot 707 can engage second structure 725. Similar to first structure 723, second structure 725 may include one or more features that enable joining of second structure 725 with one or more other structures. In the illustrated embodiment, second structure 725 may include a groove 747 on a first surface and may include a tongue 745 on a second surface. The first surface and the second surface of second structure 725 may be on approximately opposite sides to one another.

Second structure 725 may be located on parts table 722, and keystone robot 707 may be located relatively proximate to parts table 722. At such a location, the robotic arm of keystone robot 707 may be within a proximity at which the robotic arm of keystone robot 707 is able to reach at least a portion of the parts located on parts table 722. In the example embodiment of FIG. 8C, keystone robot 707 may be located at one side of parts table 722, and tongue 745 of second structure 725 may be positioned toward the side of parts table 722 that is relatively opposite from the one side at which keystone robot 707 is located. At this position, groove 747 of second structure 725 pointing towards keystone robot 707.

Keystone robot 707 may be connected to an end effector 743. Illustratively, the distal end of the robotic arm of keystone robot 707 may be connected to end effector 743, which may be built onto the distal end of the robotic arm or may be attached to the robotic arm (and may be fixed or removable). End effector 743 of keystone robot 707 may be configured to engage (e.g., "pick up") and retain one or more structures. For example, end effector 743 of keystone robot 707 may be configured to fixturelessly engage with different structures, such as via one or more features of the different structures. Some examples of such an end effector may include jaws or grippers.

Keystone robot 707 may engage with second structure 725 at the first surface, i.e., the surface on which groove 747 is located. Specifically, the robotic arm of keystone robot 707 may be moved to a position at which the keystone robot can engage second structure 725, and keystone robot 707 may then engage and retain second structure 725 at the first surface using end effector 743.

Figure 8D:
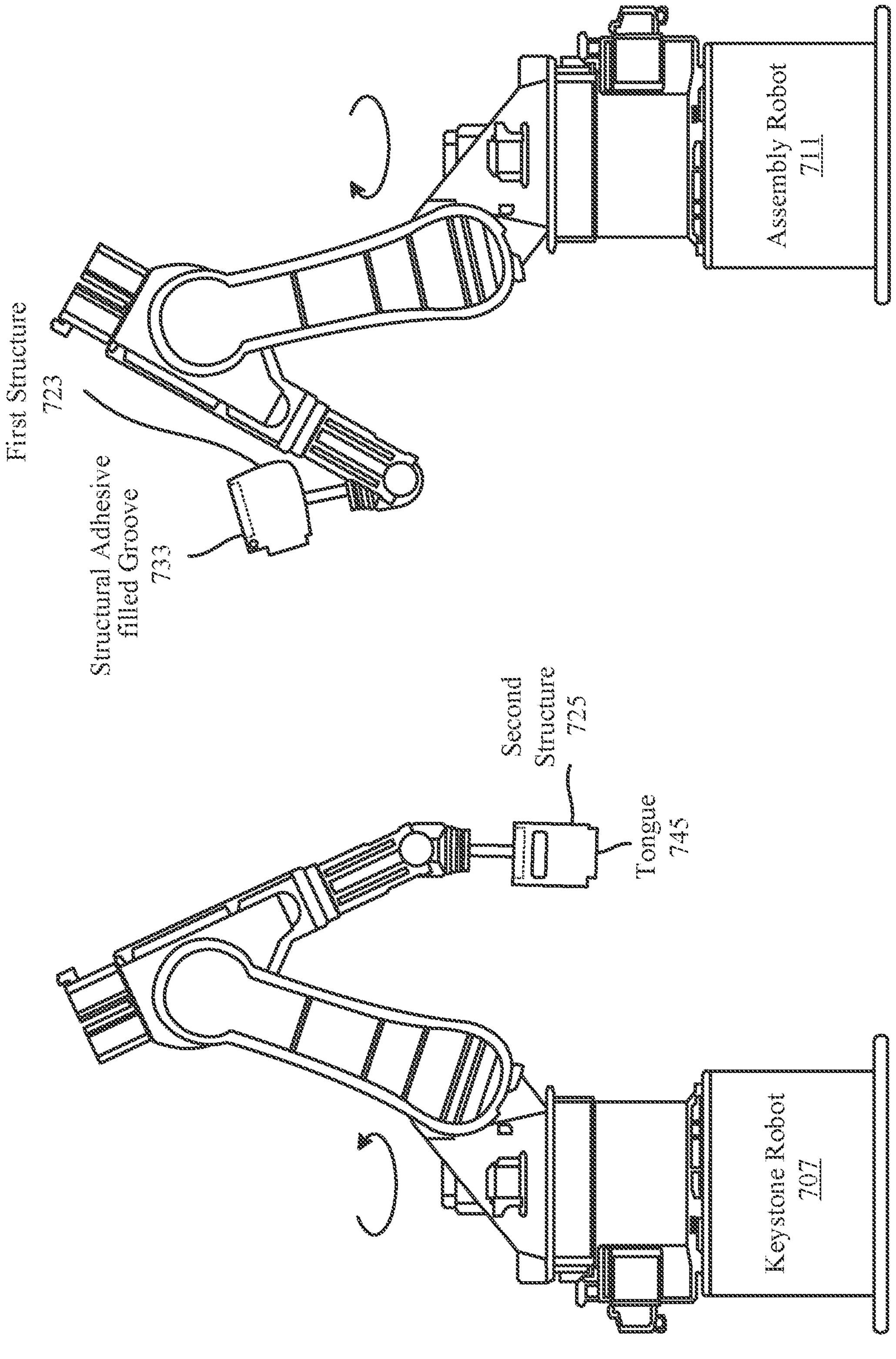

With respect to FIG. 8D, keystone robot 707 may turn to face assembly robot 711, and the assembly robot may turn to face the keystone robot. The distal end of the robotic arm of keystone robot 707 may be positioned toward assembly robot 711, and similarly, the distal end of the robotic arm of assembly robot 711 may be positioned toward keystone robot 707.

At this example location illustrated in FIG. 8D, keystone robot 707 may move second structure 725 to a position at which second structure 725 is approximately between keystone robot 707 and assembly robot 711. Further, keystone robot 707 may orient second structure 725 so that tongue 745 of second structure 725 is facing approximately downward, such as by causing the robotic arm of keystone robot 707 and/or end effector 743 of keystone robot 707 to move such that second structure 725 is oriented approximately downward.

In some embodiments, keystone robot 707 may move second structure 725 according to one or more vectors, which may be based on CAD modeling. Each of the one or more vectors may indicate a magnitude (e.g., distance) and a direction according to which second structure 725 is to be moved by keystone robot 707. Each vector may be intended to bring second structure 725 within the joining proximity, although some vectors may be intermediary vectors intended to bring second structure 725 to a position at which a vector for joining first and second structures 723, 725 can be applied.

Assembly robot 711 may position first structure 723 relatively closer to assembly robot 711 than keystone robot 707. In some embodiments, assembly robot 711 may position first structure 723 to be at least partially above at least a portion of second structure 725. For example, assembly robot 711 may retain first structure 723 at an approximately overhead position.

Figure 8E:
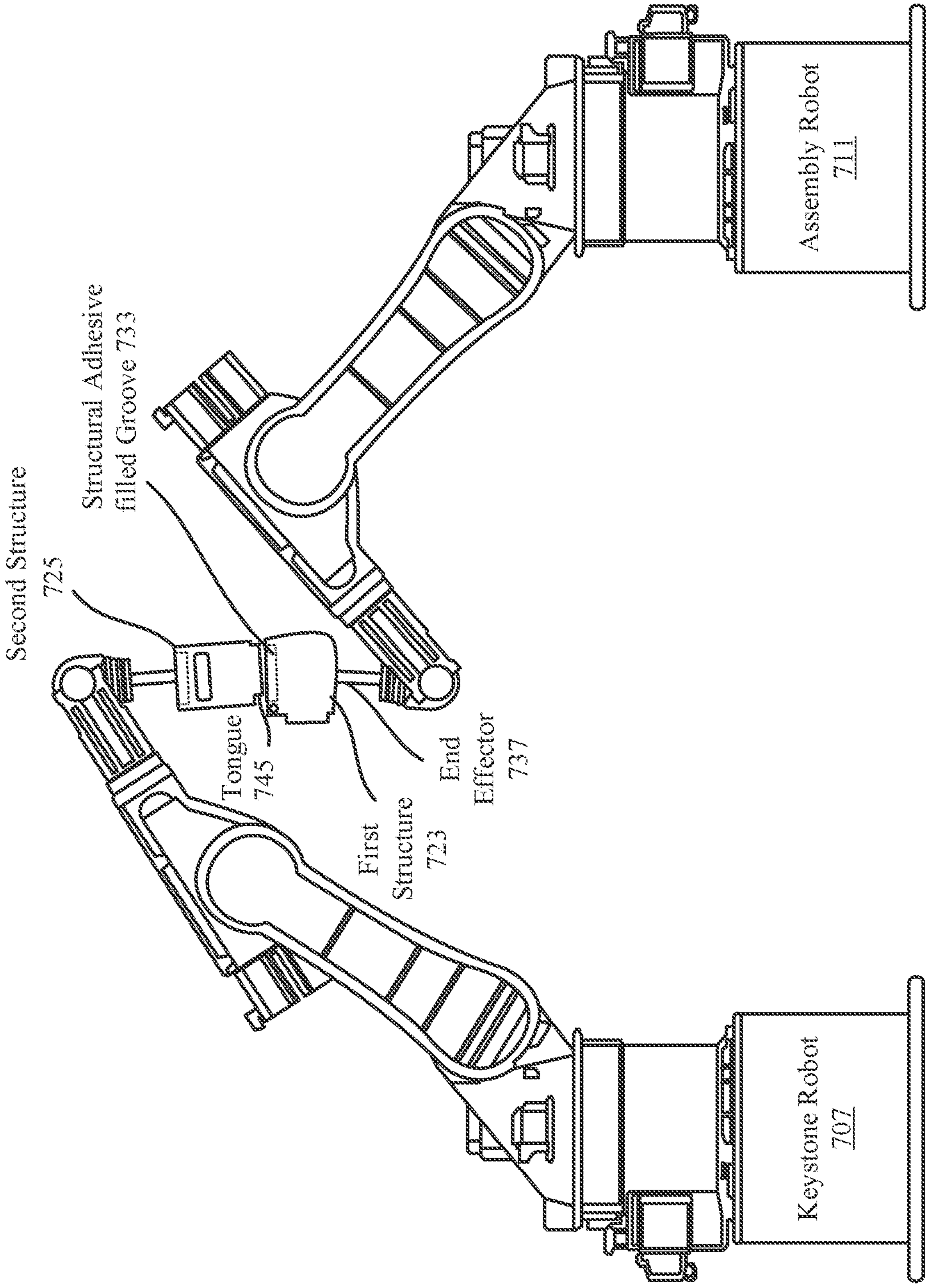

Now referring to FIG. 8E, assembly robot 711 and keystone robot 707 may move first structure 723 and second structure 725, respectively, to positions close to each other, but not close enough to be joined. Further, first structure 723 may be positioned to be below second structure 725, for example, such that first structure 723 and second structure 725 at least partially overlap in the elevational plane (or vertical space).

Assembly robot 711 may orient first structure 723 so that groove 733 of first structure 723 is facing approximately upward, having the controlled amount of adhesive previously deposited therein. For example, assembly robot 711 may cause its robotic arm and/or end effector 737 to move such that groove 733 of first structure 723 is oriented approximately upward. Thus, groove 733 of first structure 723 may face tongue 745 of second structure 725.

Similar to the movement of second structure 725 by keystone robot 707, assembly robot 711 may move first structure 723 according to one or more vectors, which may be based on CAD modeling. Each of the one or more vectors may indicate a magnitude (e.g., distance) and a direction according to which first structure 723 is to be moved by assembly robot 711. Each vector may be intended to bring first structure 723 within the joining proximity, although some vectors may be intermediary vectors intended to bring first structure 723 to a position at which a vector for joining first and second structures 723, 725 can be applied.

Keystone robot 707 may retain second structure 725 at the previously described position with tongue 745 oriented approximately downwardly; although second structure 725 may now be positioned above first structure 723 due to the movement of first structure 723 caused by assembly robot 711. However, first and second structures 723, 725 may not yet be within the joining proximity at which the first structure can be joined with the second structure.

Figure 8F:
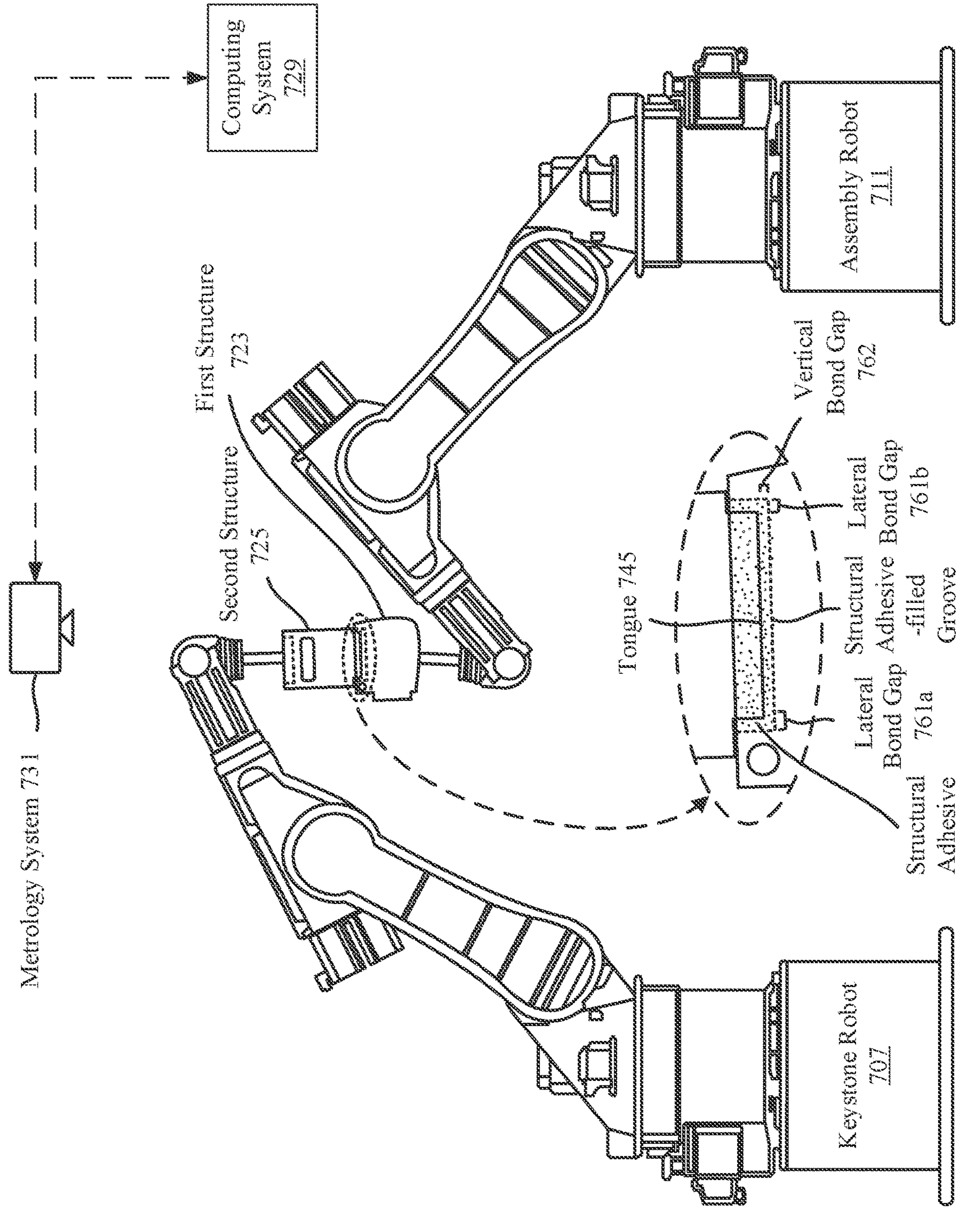

FIG. 8F illustrates how first structure 723 and second structure 725 may be brought within the joining proximity at which the two structures can be joined. To bring first and second structures 723, 725 within the joining proximity, one or both of the first and/or second structures may be moved by one or both of assembly robot 711 and/or keystone robot 707, respectively. For example, assembly robot 711 may cause the distal end of its robotic arm, at which first structure 723 is engaged, to move in an approximately upwardly direction toward second structure 725. Additionally or alternatively, keystone robot 707 may cause the distal end of its robotic arm, at which second structure 725 is engaged, to move in an approximately downwardly direction toward first structure 723.

In various embodiments, joining structures that are engaged by robots in fixtureless assembly system 700 may be accomplished using a "move-measure-correct" procedure. In effect, the move-measure-correct procedure may include moving at least one structure toward the joining proximity, measuring at least one difference between the current position of one of the structures (e.g., the physical position of the structure) and the position at which the structures can be joined (e.g., the joining proximity), and correcting the position of at least one of the structures such that the structures can be brought within the joining proximity, at which the structures can be joined. The move-measure-correct procedure may be repeated for one or more of the structures to be joined until the structures are brought within the joining proximity, at which point the joining operation can be accomplished such that the structures are joined (e.g., within acceptable tolerances). It is possible that the structures can be brought within the joining proximity in one step, thus repeating the procedure may not be necessary in all cases.

The move-measure-correct procedure may use metrology system 731, which may be configured to determine (e.g., detect, calculate, measure, capture, etc.) positional data associated with assembly cell 705. The positional data may include a set of measurements or other values indicative of one or more positions of structures and/or robots (e.g., including robotic arms and/or components connected with robots, such as tools, flanges, end effectors, and so forth). Metrology system 731 may include one or more devices located in and/or proximate to assembly cell 705 and may include, for example, a tracker-machine control sensor (T-MAC), a laser metrology device (e.g., configured for laser scanning and/or tracking), a photogrammetry device, a camera (e.g., configured to capture still images and/or video), and/or another device configured to similarly determine positional data.

In some embodiments, metrology system 731 may determine positional data based on at least one target in assembly cell 705, which may be located on one or more of the robots (e.g., including robotic arms and/or components connected with robots, such as tools, flanges, end effectors, and so forth), one or more of the structures to be joined, and/or elsewhere in assembly cell 705. The at least one target may be detectable/identifiable by metrology system 731 in assembly cell 705—for example, the at least one target may be reflective and/or may be of a specific shape so as to distinguish the at least one target in assembly cell 705.

Metrology system 731 may provide the positional data to computing system 729. For example, the positional data may indicate a set of coordinates associated with the structure.

The set of coordinates may include at least one of a set of absolute coordinates (e.g., a global coordinate frame for assembly cell 705) and/or a set of relative coordinates (e.g., relative to the joining proximity and/or relative to the other one of the structures).

The positional data may be used to determine (e.g., measure or calculate) the difference between the current position of one of the structures and the joining proximity by computing system 729. For example, computing system 729 may determine a difference between the set of coordinates indicated by the positional data and a set or expected coordinates, which may be the coordinates at which the structure is expected to be located in order to be brought within the joining proximity.

If necessary, the position of at least one of the structures can be corrected based on the determined difference. For example, robot imperfections and/or other imprecisions in fixtureless assembly system 700 may cause structures to drift or otherwise become unaligned with the joining proximity and/or the vectors or coordinates according to which structures are to be moved to be brought within the joining proximity. If the determined difference is not within the acceptable tolerances of the joining proximity, computing system 729 can determine a vector and/or set of coordinates according to which one of the structures is to be moved so that the structure can be brought within the joining proximity.

Computing system 729 may then issue a command to one of controllers 807, 809, 811, 813, 815, 817 communicatively connected with one of robots 707, 709, 711, 713, 715, 717 that is retaining the structure, and the issued command may cause the controller to correct the position of the structure such that the structure is brought within the joining proximity. For example, one of robots 707, 709, 711, 713, 715, 717 may move the structure according to the determined vector and/or set of coordinates based on the issued command.

In the context of FIG. 8F, metrology system 731 may determine positional data associated with at least one of first structure 723 and/or second structure 725 in assembly cell 705. For example, metrology system 731 may determine a set of coordinates associated with first structure 723. The set of coordinates may indicate the physical position of first structure 723 in assembly cell 705 and/or relative to the joining proximity or second structure 725.

Metrology system 731 may provide the positional data to computing system 729. Computing system 729 may receive the positional data and, based on the positional data, may determine a set of corrective operations to be applied so that first structure 723 can be brought within the joining proximity and joined with second structure 725. For example, computing system 729 may determine a difference between the set of coordinates associated with first structure 723 and the joining proximity.

Based on the determined difference, computing system 729 may determine the set of corrective operations to be applied to first structure 723 such that first structure 723 can be brought within the joining proximity. In some embodiments, the set of corrective operations may include a set of vectors that each indicate a magnitude and a direction based on which first structure 723 can be moved within the joining proximity. In some other embodiments, the set of corrective operations may include a set of coordinates associated with bringing first structure 723 within the joining proximity, such as a set of coordinates according to which the robotic arm of assembly robot 711 is to be controlled so that first structure 723 is brought within the joining proximity.

Computing system 729 may provide the set of corrective operations to controller 811 communicatively connected with assembly robot 711, such as by issuing a set of commands to controller 811. Controller 811 may apply the set of commands by controlling the robotic arm of assembly robot 711 according to the set of corrective operations indicated by the set of commands.

In some embodiments, metrology system 731 may again determine positional data associated with at least one of first structure 723 and/or second structure 725 after the aforementioned set of corrective operations is applied. Computing system 729 may receive the subsequent positional data and, based on the subsequent positional data, may determine the next set of corrective operations, if needed to bring first structure 723 and second structure 725 within the joining proximity. If the next set of corrective operations is needed, computing system 729 may issue the next set of commands to one of controller 807 or controller 811 (e.g., depending on which of first structure 723 or second structure 725 is to be moved). The controller receiving the next set of commands may control the corresponding one of keystone robot 707 or assembly robot 711 according to the next set of corrective operations. The move-measure-correct procedure may be iteratively repeated until computing system 729 determines first structure 723 and second structure 725 are at the joining proximity and no further corrective operations should be applied. Thus, first structure 723 and second structure 725 may be joined at the joining proximity.

When structures are within the joining proximity, at least a portion of one structure overlaps with at least a portion of another structure in at least one of the azimuthal (or horizon) plane and/or the elevational plane. According to such an overlap, one or more features of one structure may connect with one or more complementary features of another structure, e.g., by interlocking or fitting together, such as when a protrusion of one structure is inserted into a recess of another structure. In the illustrated example operations of fixtureless assembly system 700, tongue 745 of second structure 725 may be positioned within groove 733 of first structure 723 when first structure 723 and second structure 725 are within the joining proximity, thereby creating a tongue-and-groove joint.

In some embodiments, tongue 745 of second structure 725 may not contact first structure 723 at the joining proximity. In other words, the robots can be controlled to bring the structures within joining proximity while preventing the structures from contacting each other. For example, tongue 745 of second structure 725 may be within groove 733 of first structure 723, but lateral bond gaps, such as lateral bond gaps 761*a*, 761*b*, collectively referred to herein as lateral bond gaps 761 between the tongue and the sides of the groove, and a vertical bond gap 762 between the tongue and the bottom of the groove, can be caused because the tongue is inserted in the groove without contacting the sides and bottom. Rather, tongue 745 of second structure 725 may merely contact the structural adhesive deposited in groove 733 of first structure 723 (as shown above in FIG. 8B) when first structure 723 and second structure 725 are at the joining proximity. In some further embodiments, however, the surface surrounding groove 733 of first structure 723 may contact the surface surrounding tongue 745 of second structure 725.

The bond gaps resulting from joining without contact can provide a significant advantage in assembling multi-part structures. Specifically, for each individual joining operation, there may be spatial errors that might be caused by, for example, improper positioning of the structures, variations in the dimensions of the structures (e.g., a 3D printed structure might not have the exact dimensions as expected, due to the nature of 3D printing). In typical joining operations, these errors can add together with each joining operation of the multi-part structures, causing the final assembly to have large errors in dimension. However, the bond gaps resulting from contact-free joining can absorb the dimensional errors of each individual joining.

Figure 8G:
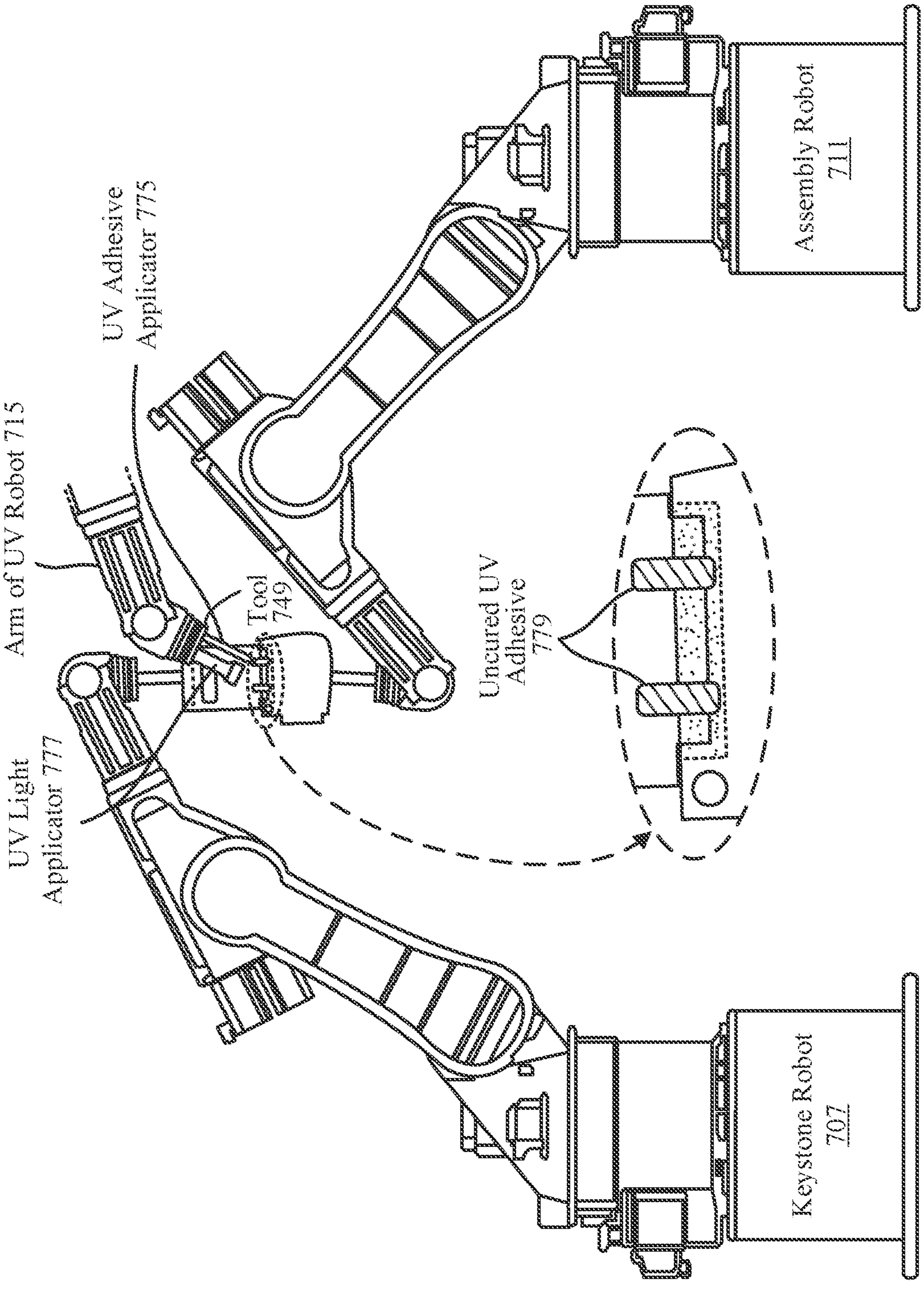

Now referring to FIG. 8G, keystone robot 707 and assembly robot 711 may remain at their respective positions such that second structure 725 and first structure 723 are at the joining proximity.

With such positioning maintained, UV robot 715 may be located relatively proximate to keystone robot 707 and assembly robot 711. The distal end of the robotic arm of UV robot 715 may be positioned toward first structure 723 and second structure 725, and specifically, toward the point at which first structure 723 and second structure 725 are joined (e.g., toward the tongue-and-groove joint). In such a position, the distal end of the robotic arm of UV robot 715 may be between keystone robot 707 and assembly robot 711.

UV robot 715 may be connected with a tool 749, which specifically may be connected with the distal end of the robotic arm of UV robot 715. Tool 749 may be configured to bond first structure 723 and second structure 725 at the joining proximity. For example, tool 749 may be configured with or connected to one or more applicators, such as applicators 775, 777, to apply UV or other temporary adhesive (e.g., via UV adhesive applicator 775) and to emit UV light (e.g., via UV light applicator 777) or otherwise cure the UV or other temporary adhesive, thereby bonding first structure 723 and second structure 725. The bond created by UV robot 715 may be temporary, while the structural adhesive (applied by structural adhesive robot 713, as shown above in FIG. 8B) may provide a permanent bond when cured.

The distal end of the robotic arm of UV robot 715 may be positioned such that tool 749 connected with the UV robot 715 is proximate to the point at which first structure 723 and second structure 725 are at the joining proximity. For example, the robotic arm of UV robot 715 may be positioned such that tool 749 is positioned at a distance from the tongue-and-groove joint (formed by positioning first structure 723 and second structure 725 at the joining proximity) that is suitable for dispensing the UV adhesive. At this suitable distance, UV robot 715 may apply UV adhesive on and/or near the tongue-and-groove joint formed by joining first structure 723 and second structure 725.

In some embodiments, tool 749 connected with UV robot 715 may apply UV adhesive as one or more UV adhesive strips. Each UV adhesive strip may be applied such that it contacts both first structure 723 and second structure 725. For example, UV robot 715 may position tool 749 so that one UV adhesive strip is placed across respective surfaces of first structure 723 (e.g., proximate to groove 733 of first structure 723) and second structure 725 (e.g., proximate to tongue 745 of second structure 725). At this stage, the UV adhesive may be uncured (e.g., uncured UV adhesive 779).

Figure 8H:
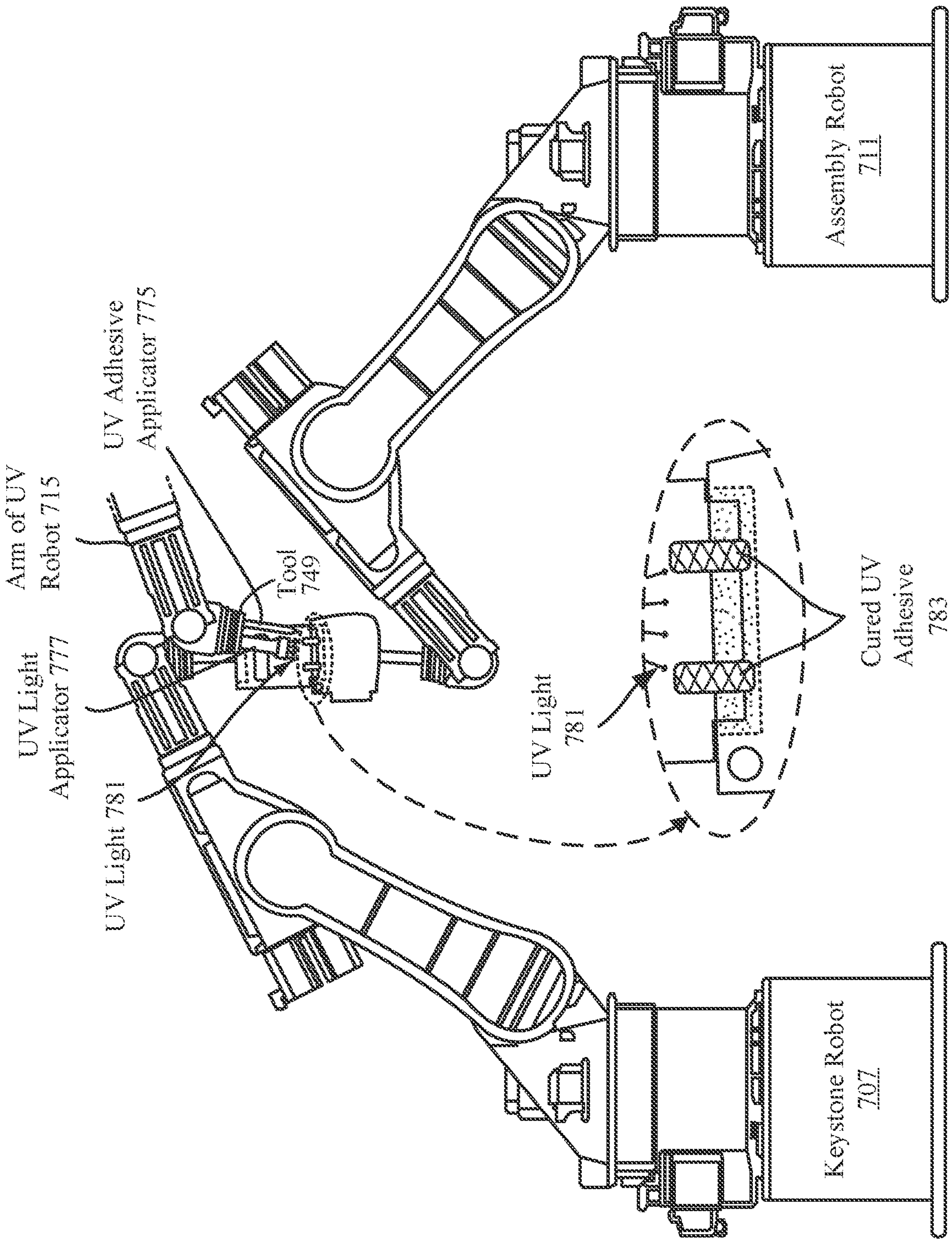

Now referring to FIG. 8H, keystone robot 707 and assembly robot 711 may remain at their respective positions such that second structure 725 and first structure 723 are positioned at the joining proximity with the UV adhesive (e.g., uncured UV adhesive strips 779) placed across first structure 723 and second structure 725.

In some embodiments, UV robot 715 may again be positioned relatively proximate to keystone robot 707 and assembly robot 711. The distal end of the robotic arm of UV robot 715 may again be positioned toward first structure 723 and second structure 725, and specifically, toward the point at which first structure 723 and second structure 725 are at the joining proximity (e.g., toward the tongue-and-groove joint).

As described above, UV robot 715 may be connected with a tool 749 that includes a curing device, e.g., UV light applicator 777, configured to cure the UV adhesive or other temporary adhesive earlier applied by UV robot 715. UV light applicator 777 may be a UV curing tool configured to emit UV light 781 to cure the UV adhesive. In some other embodiments, tool 749 may be configured to apply a temporary adhesive that can be quick-cured by other means, such as heat and/or air, and the tool can include an applicator sufficient to cure the other temporary adhesive, such as an applicator with an air dryer or heat source. In various embodiments, the temporary adhesive may be a quick-cure adhesive that cures quickly by itself, e.g., a quick set epoxy, in which case the tool may include only the adhesive applicator.

As described in the present embodiment, tool 749 can include both a UV adhesive applicator configured to apply UV adhesive and a UV light applicator configured to cure the UV adhesive—e.g., the UV robot 715 may switch an operational mode of tool 749 from one mode for applying the uncured UV adhesive to another mode for curing the UV adhesive. In some other embodiments, the tools may be different, e.g., there may be separate tools for the UV adhesive applicator and the UV light applicator. For example, UV robot 715 may switch from the UV adhesive applicator (dispenser) tool to the UV light applicator (curing) tool.

UV robot 715 may position tool 749 at a distance from the UV adhesive that is suitable for curing the UV adhesive, which may be the same position or a different position as that at which the UV adhesive was earlier applied. With tool 749 at this distance, UV robot 715 may cause UV light applicator 777 of the tool to cure the UV adhesive. For example, UV robot 715 may cause UV light applicator 777 to emit UV light 781 for a time sufficient to cure the UV adhesive. However, UV robot 715 may not cure the structural adhesive, e.g., because the structural adhesive may not be curable through exposure to UV light.

In some embodiments in which UV adhesive (e.g., UV adhesive strips) is applied at more than one location on first structure 723 and second structure 725, UV robot 715 may move tool 749 to different positions, each of which may be suitable for curing the UV adhesive. UV robot 715 may hold tool 749 at each of the different positions for a time period that is sufficient to cure the UV adhesive while UV light applicator 777 emits UV light 781 for curing. After curing, uncured UV adhesive 779 becomes cured UV adhesive 783.

Once the UV adhesive is cured, UV robot 715 may move its robotic arm away from first structure 723 and second structure 725. First structure 723 and second structure 725 may be at least temporarily bonded by the cured UV adhesive 783. However, the structural adhesive (applied by structural adhesive robot 713, as shown above in FIG. 8B) may still be uncured at this stage.

Figure 8I:
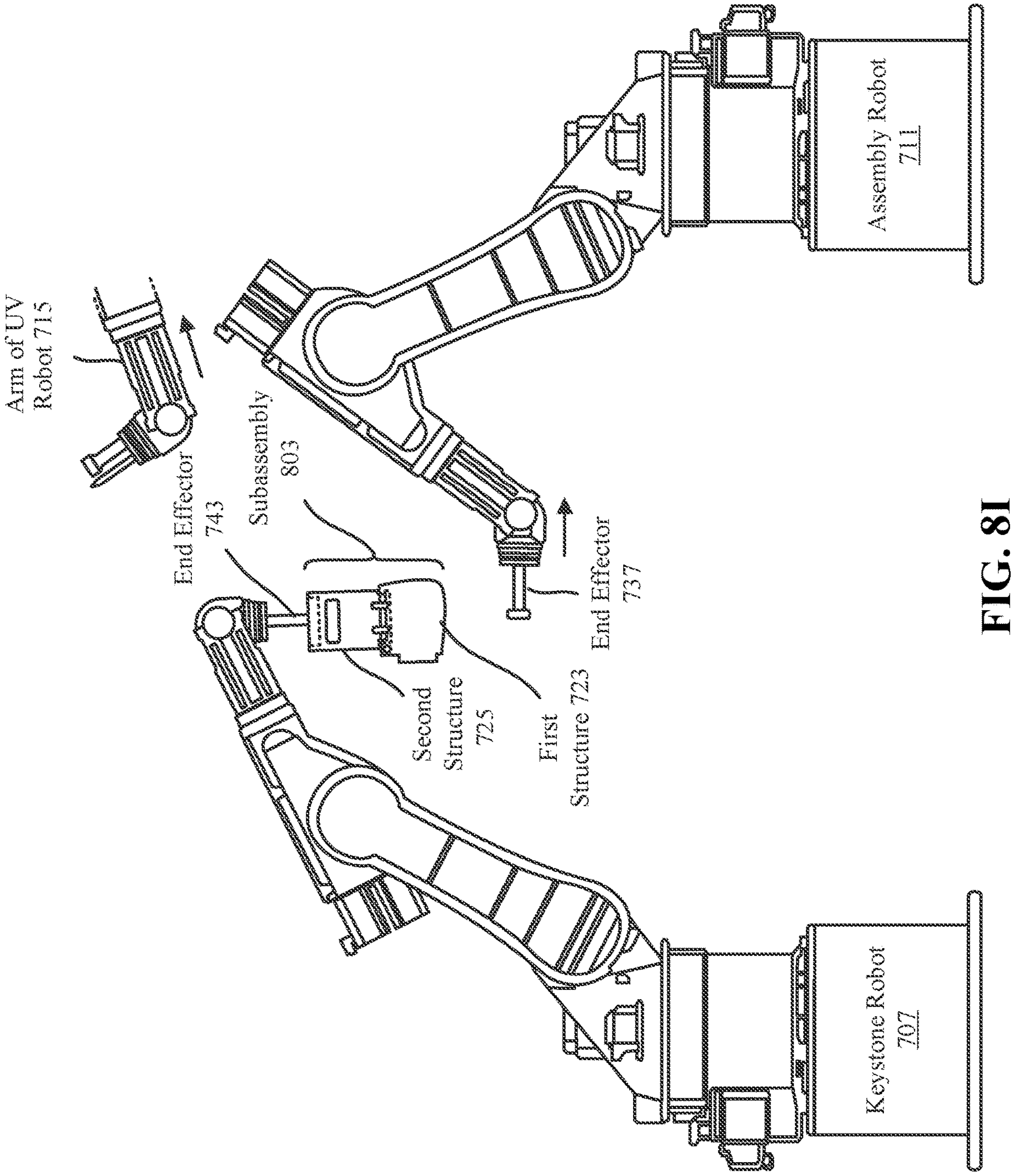

Next, FIG. 8I illustrates that keystone robot 707 may remain at its position, and may continue to retain second structure 725. At this stage, second structure 725 may be at least temporarily bonded to first structure 723, e.g., through the cured UV adhesive 783 strips across first structure 723 and second structure 725.

Assembly robot 711 may separate from first structure 723. For example, assembly robot 711 may cause its end effector to disengage from first structure 723, such as by opening jaws of end effector 737, unfastening end effector 737 from one or more features of first structure 723, and/or otherwise causing end effector 737 to release first structure 723.

Once separated from first structure 723, assembly robot 711 may move its robotic arm away from the first structure. For example, assembly robot 711 may retract its robotic arm away from keystone robot 707. In so doing, keystone robot 707 may be provided a greater area to move about.

As assembly robot 711 is separated from first structure 723, keystone robot 707 may retain first structure 723, e.g., through its retention of second structure 725 that is at least temporarily bonded with first structure 723. The cured UV adhesive 783 may provide a sufficient bond to support this retention of first structure 723, bonded with second structure 725, even though keystone robot 707 does not directly engage first structure 723 (e.g., when end effector 743 of keystone robot 707 is engaging second structure 725). When bonded (even temporarily), first structure 723 and second structure 725 may be a structure and/or may be referred to as a subassembly 803.

However, in the above-described embodiment of applying UV adhesive strips during assembly, as the first and second structures in the joining proximity may be oriented in a variety of positions, the UV adhesive strips contacting the surface(s) may occasionally move (e.g. drip off). For instance, one structure may be positioned upside-down relative to another structure, and the UV adhesive may therefore drip off due to gravity. As a result, when the UV adhesive is cured, the first and second structures may be inadvertently retained in positions that do not provide acceptable tolerance, impacting the structural integrity of the assembly.

Difficulties in applying UV adhesive at the joining proximity may also cause improper retention of structures. For example, the material handling robots retaining the first and second structures in the joining proximity may be tightly packed in the assembly cell. As a result, a quick-cure adhesive robot may have difficulty maneuvering around the material handling robots and applying the UV adhesive to the structures in the joining proximity within this tightly packed area. Moreover, since the metrology system may also be using laser tracking to perform MMC for these structures in this tightly packed area, the quick-cure adhesive robot may potentially obstruct the lasers and the MMC process when attempting to apply the UV adhesive. As a result, the entire assembly may be impacted. For instance, when assemblies are formed by stacking different parts, the misalignment of one structure may affect the alignment of other parts which the structure supports. Additionally, since structures and subassemblies are frequently moved during the assembly process, an improper retention may cause the structures or subassemblies to deflect or drop from the assembly.

Figure 9A:
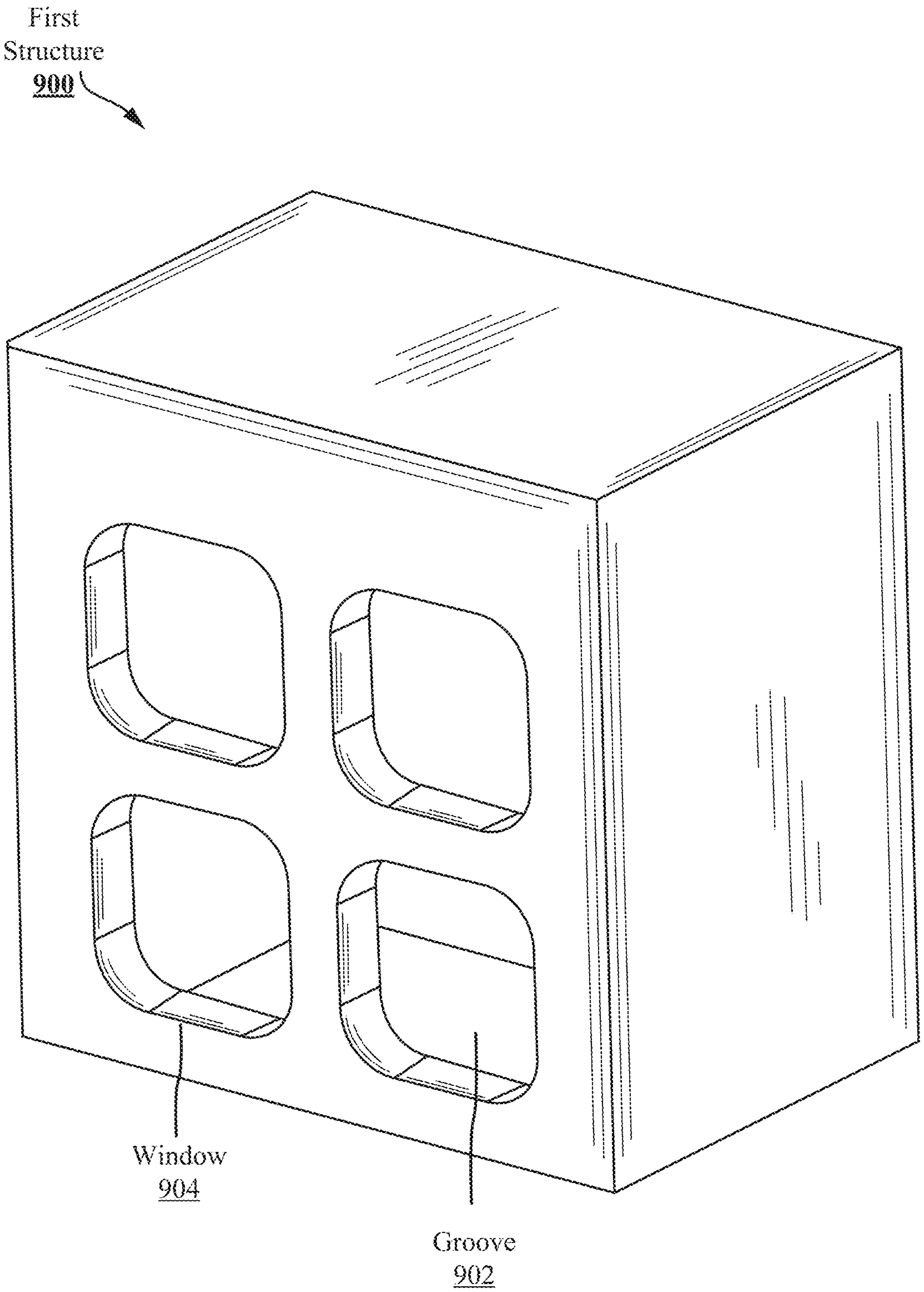
FIGS. 9A-B illustrate an example of a first structure including a retention feature in the form of a groove in which various suitable resin compositions described herein may be used.
Figure 9B:
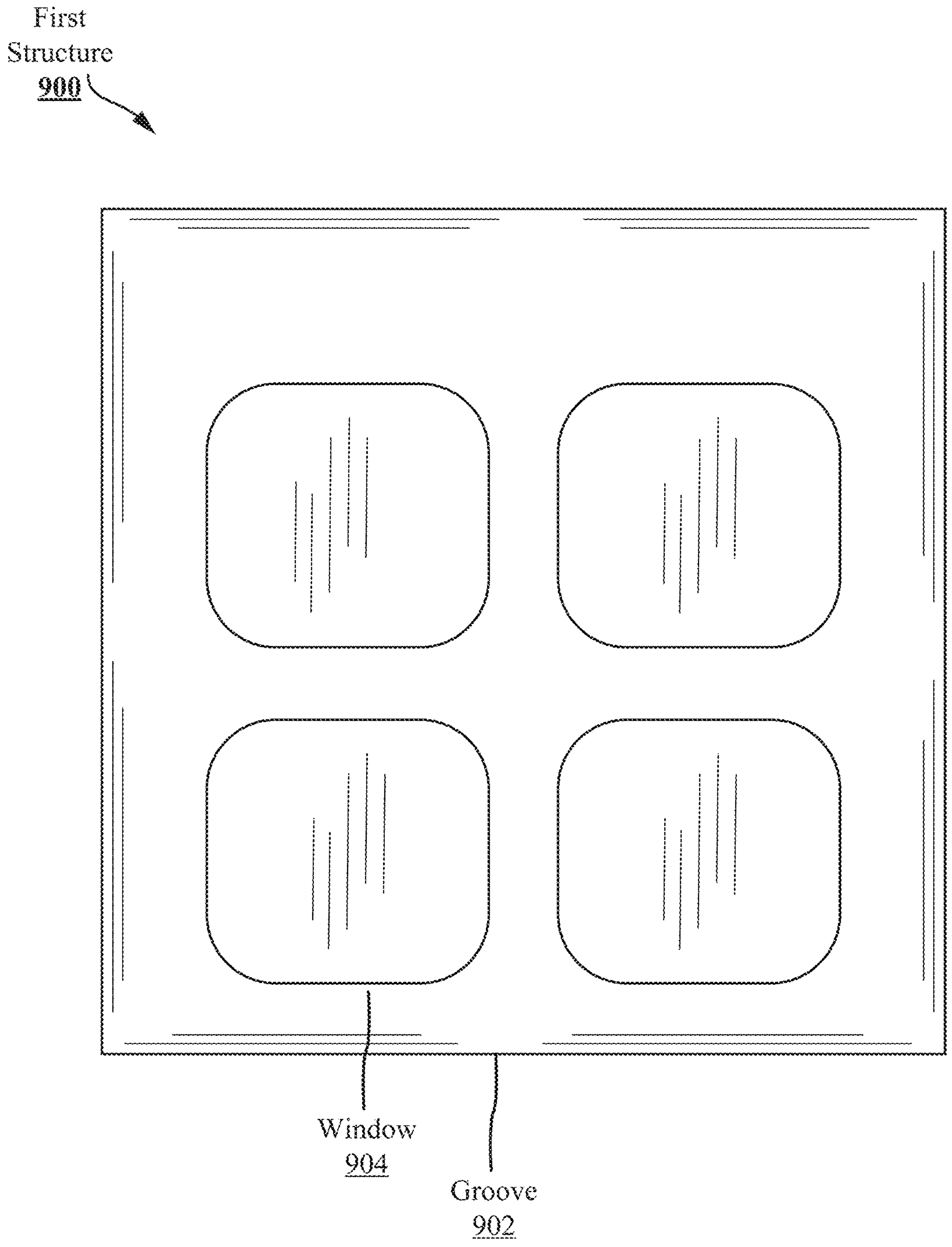
Figure 10A:
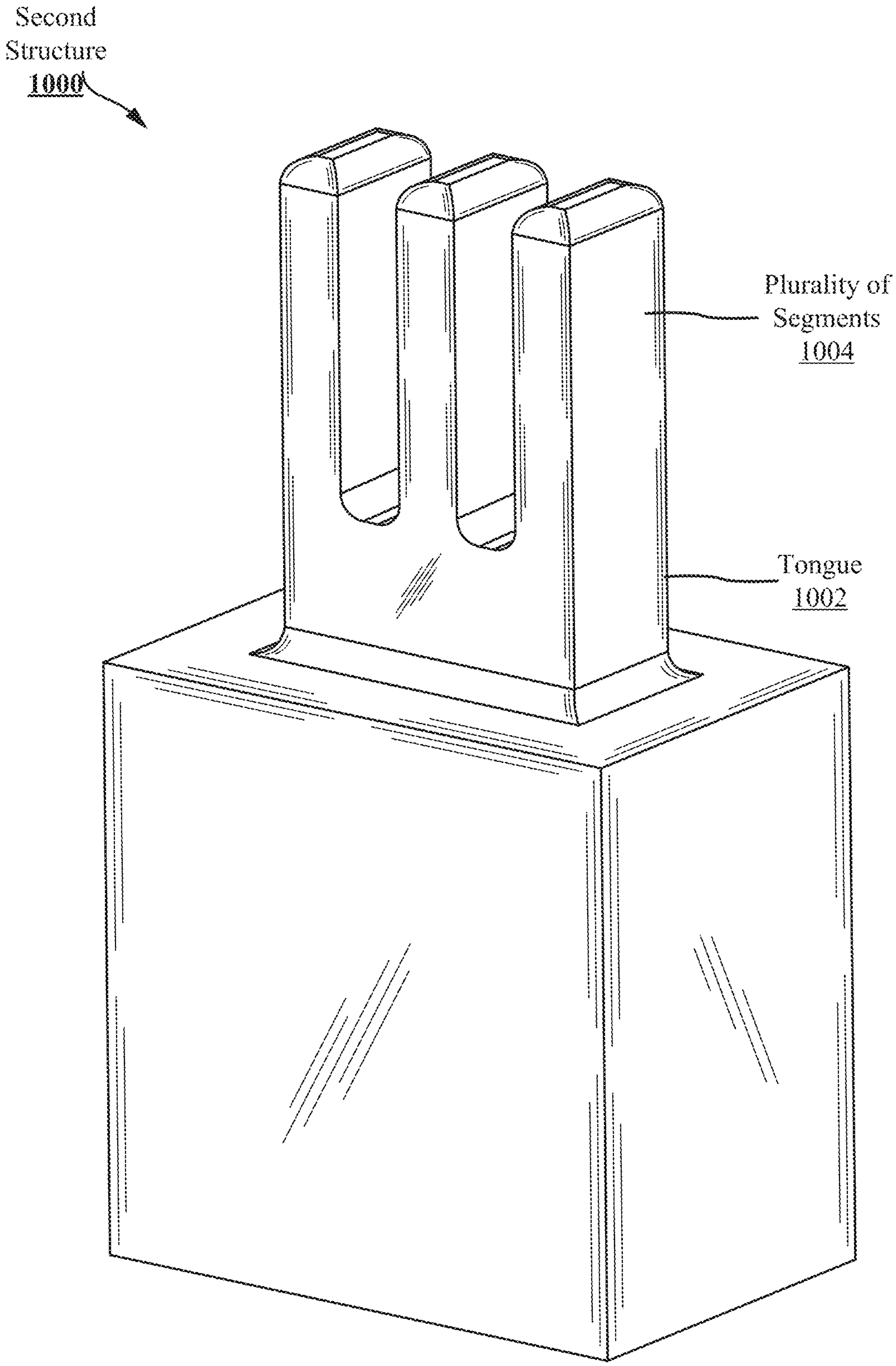
FIGS. 10A-B illustrate an example of a second structure including a retention feature in the form of a tongue that may be used in conjunction with the groove in which various suitable resin compositions described herein may be used.
Figure 10B:
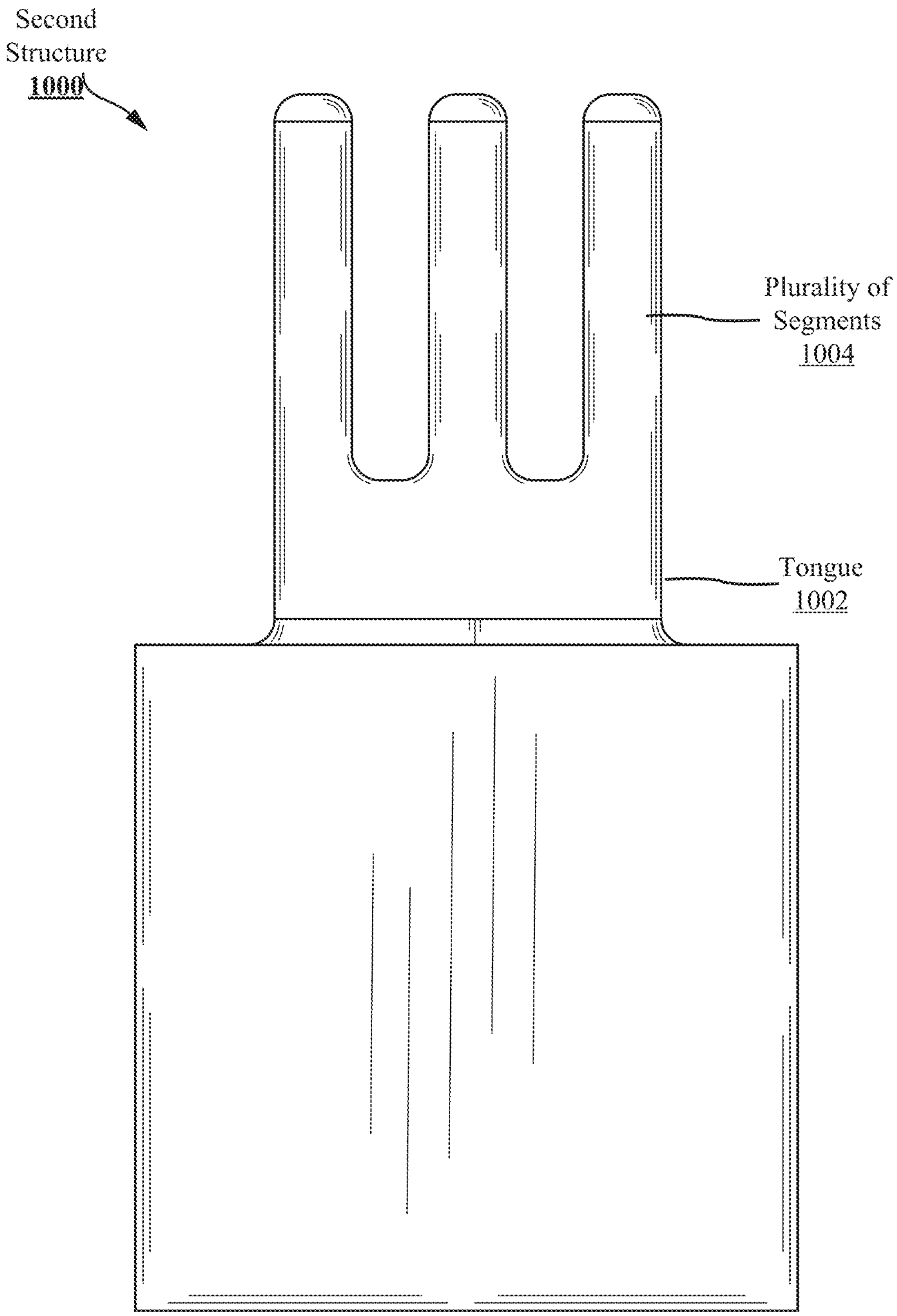
Figure 11A:
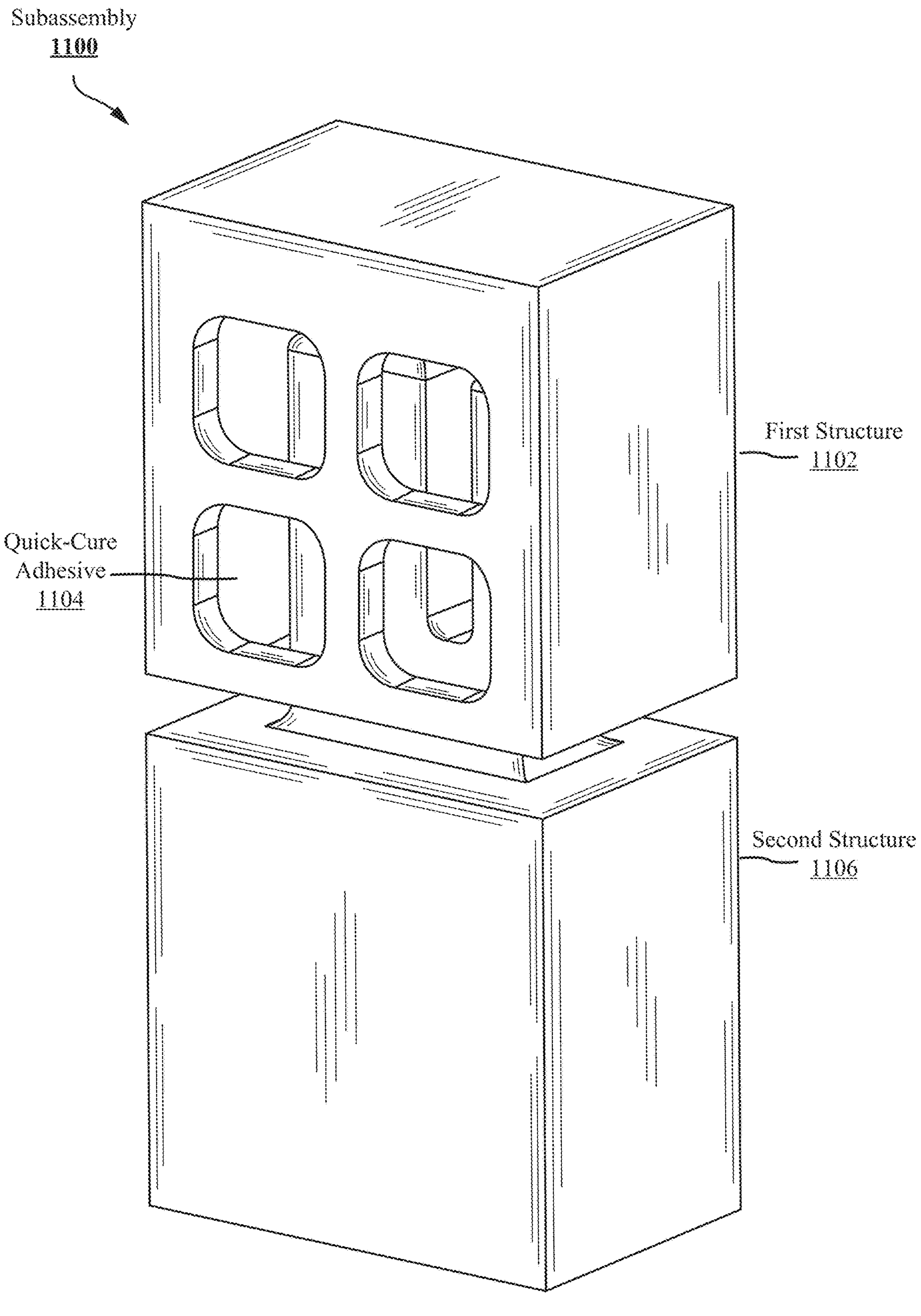
FIGS. 11A-B illustrate an example of a subassembly including a first structure joined to a second structure using various suitable resin compositions described herein.
Figure 11B:
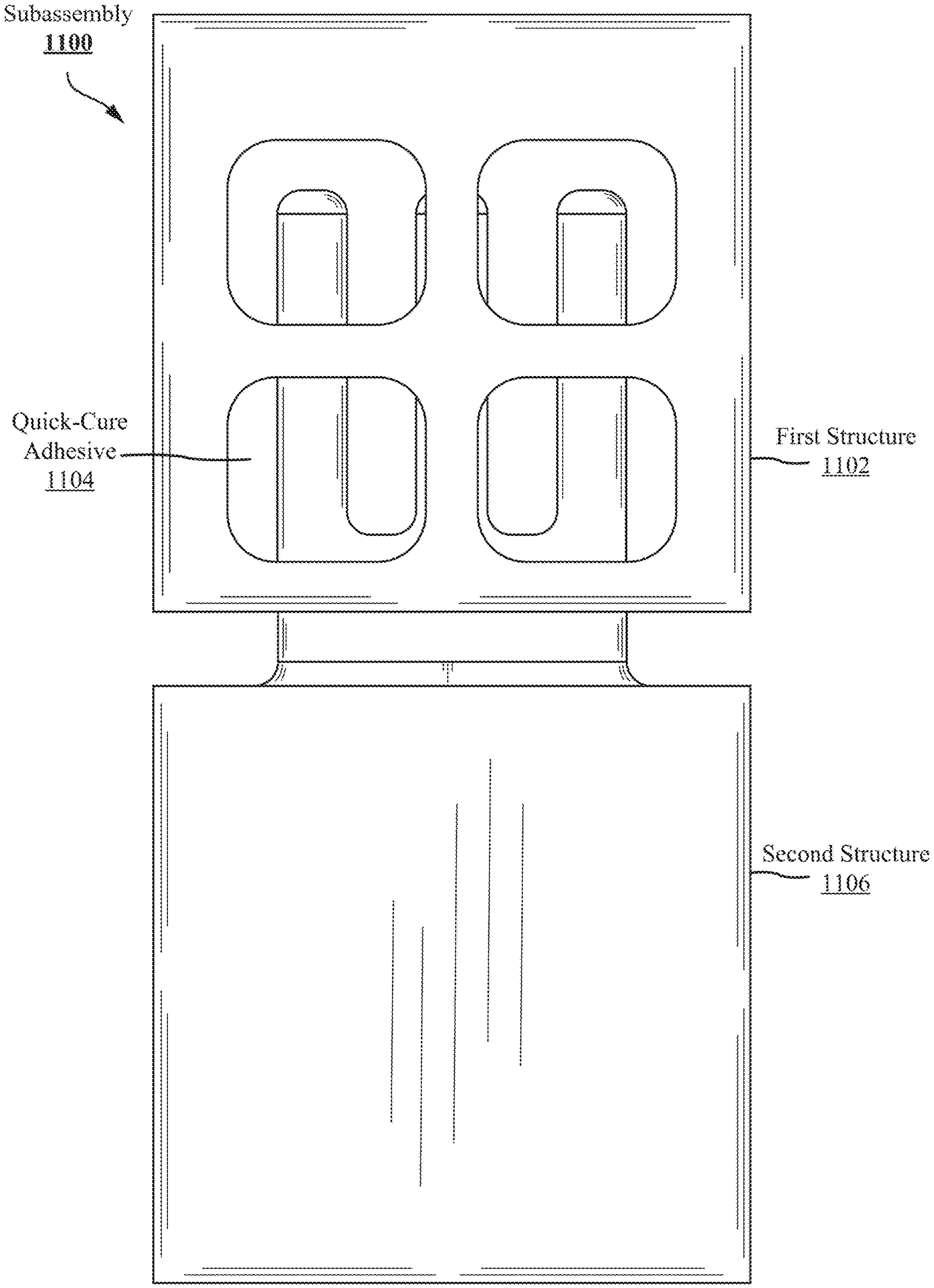

To reduce the likelihood of improper retention of structures during the fixtureless assembly process, the present disclosure provides retention features in the first and second structures (e.g., the structures to be joined) that allow for quick-cure adhesive to be applied before the structures are placed in joining proximity. FIGS. 9A and 9B illustrate an example of a first structure 900 including a retention feature in the form of a groove (e.g. a recess, etc.), and FIGS. 10A and 10B illustrate an example of a second structure 1000 including a retention feature in the form of a tongue (e.g. a projection, etc.). Moreover, FIGS. 11A and 11B illustrate an example of a subassembly 1100 including a first structure 1102 (e.g. first structure 900) joined to a second structure 1106 (e.g. second structure 1000) using the aforementioned retention features.

In this regard, first structure 723 can include a groove, such as a groove 902 described below, in which an adhesive dispensing robot may inject quick-cure adhesive 1104. The first structure may also include a window, such as a window 904 described below, (e.g. a translucent or transparent screen) opposite the groove in which a quick-cure adhesive robot may emit EM radiation to cure the quick-cure adhesive contained within the groove. Second structure 725 may include a tongue, such as tongue 1002 described below, which a material handling robot may place into the quick-cure adhesive within the groove of the first structure. The tongue may include a plurality of segments 1004 spaced apart from each other (e.g. comb shape 1206 in FIG. 12) or a plurality of openings (e.g. waffle shape 1202 in FIG. 12) which contact the quick-cure adhesive when the tongue is inserted into the groove. While the "first" structure is referred to herein as having the groove, and the "second" structure is referred to herein as having the tongue, the present disclosure is not so limited. For example, second structure 725 may include the groove containing the quick-cure adhesive, and first structure 723 may include the tongue inserted into the quick-cure adhesive.

Figure 12:
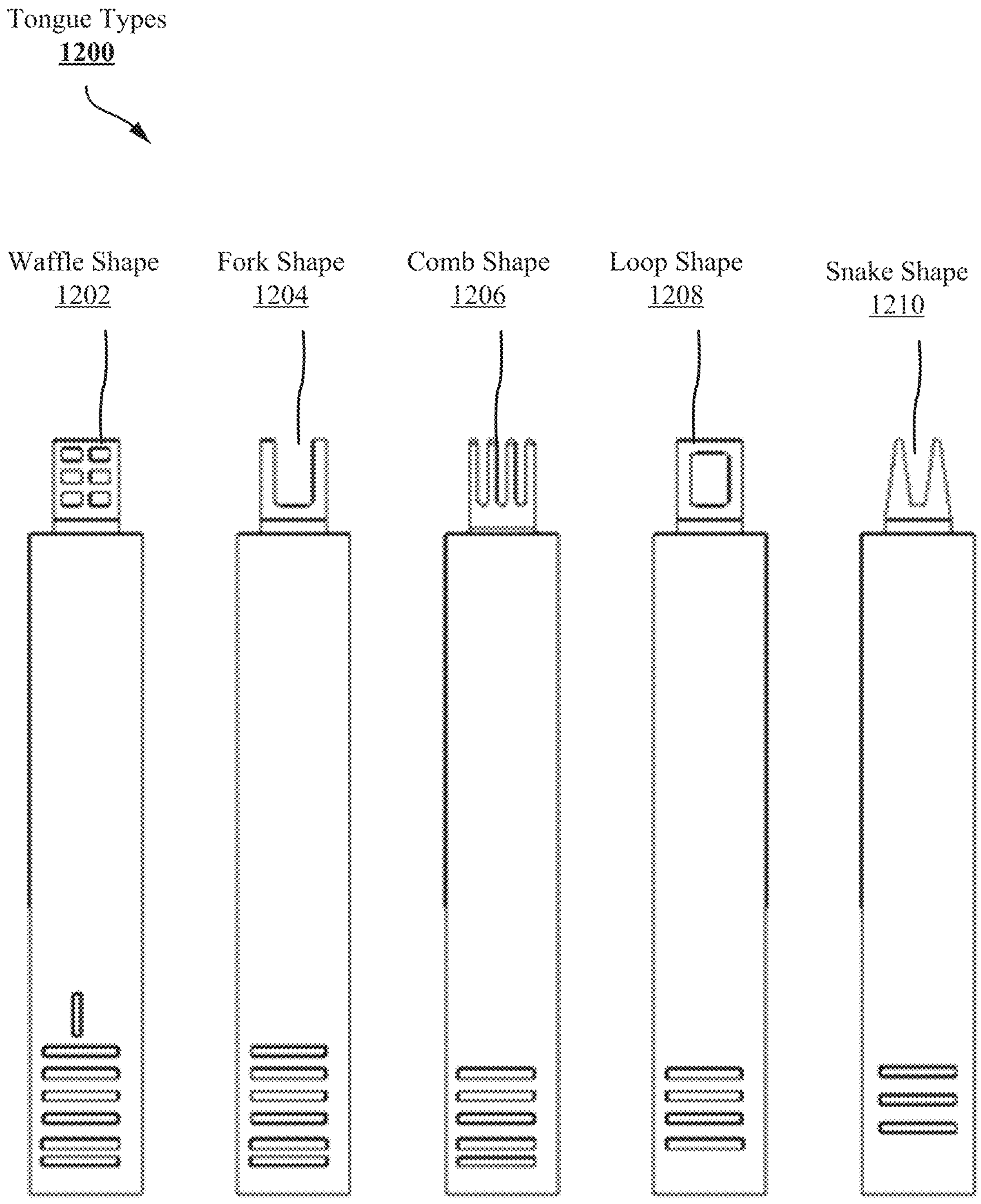
FIG. 12 illustrates examples of different tongue types.

Tongue 1002 may be selected from various types. FIG. 12 illustrates examples of different tongue types 1200. For instance, the tongue may include a waffle shape 1202, a fork shape 1204, a comb shape 1206, a loop shape 1208, or a snake shape 1210. The tongue may alternatively take other shapes. The shape of the tongue may be selected to maximize the strength of the adhesive bond between the first structure and the second structure and/or to optimize printability (e.g. in additive manufacturing). For example, when the tongue is adhered in the groove, a tongue with comb shape 1206 may require a maximum pull force of approximately 100 N more than a tongue with the other aforementioned tongue types (e.g. due to additional surface area contacting the adhesive between the plurality of segments 1004). Therefore, a comb-shaped tongue may be selected for tongue 1002 to maximize strength. Alternatively, a tongue with waffle shape 1202 may be selected with similar (but slightly less) strength, since the waffle shape may have easier printability than the other aforementioned tongue types (e.g. due to the plurality of openings in the waffle shape). Therefore, a waffle-shaped tongue may alternatively be selected for tongue 1002 to optimize printability. Other tongue types may be selected to balance adhesive strength and printability.

Figure 13:
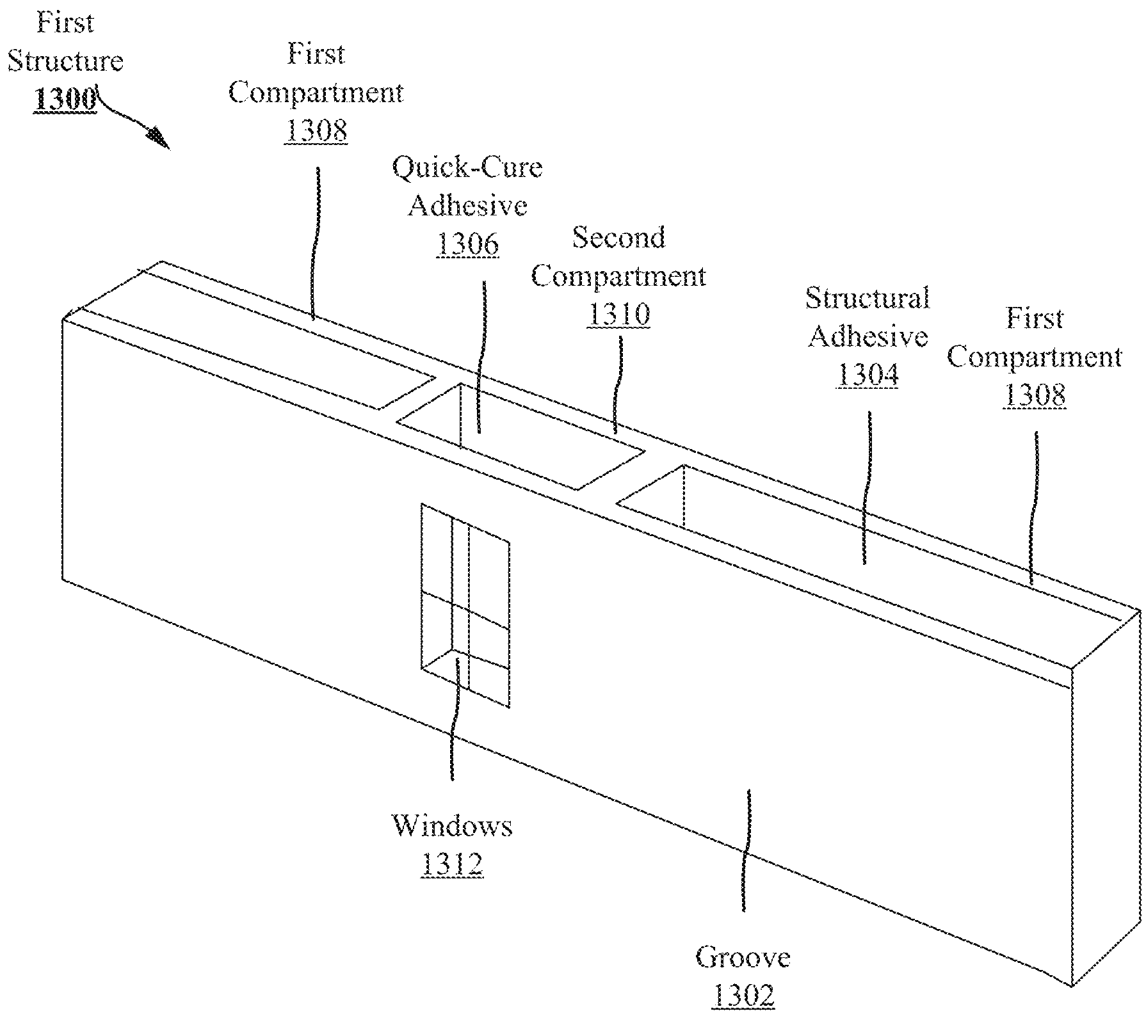
FIG. 13 illustrates an example of a first structure including a groove containing a structural adhesive and a quick-cure adhesive, such as various suitable resin compositions described herein, in separate compartments.

In one example, the structural adhesive may be separate from the quick-cure adhesive. That is, the structural adhesive may be a first adhesive that cures at a first cure rate upon exposure to time or heating, and the quick-cure adhesive may be a second adhesive that cures at a second cure rate faster than the first cure rate upon exposure to EM radiation (e.g. UV radiation). FIG. 13 illustrates an example of a first structure 1300 (e.g. first structure 723) including a groove 1302 (e.g. groove 902) containing a structural adhesive 1304 and a quick-cure adhesive 1306 in separate compartments. For example, the groove may include one or more first compartments 1308 that contain the structural adhesive and one or more second compartments 1310 that contain the quick-cure adhesive. One or more windows 1312 (e.g. window 904) may be disposed opposite the second compartments to allow the quick-cure adhesive to be exposed to EM radiation (e.g. UV radiation) for curing. Compartments 1308, 1310 also serve to prevent the structural adhesive and the quick-cure adhesive from mixing together. As a result, the quick-cure adhesive that is exposed to the EM radiation through the one or more windows may be cured at the faster, second cure rate, while the structural adhesive is cured at the slower, first cure rate.

Figure 14:
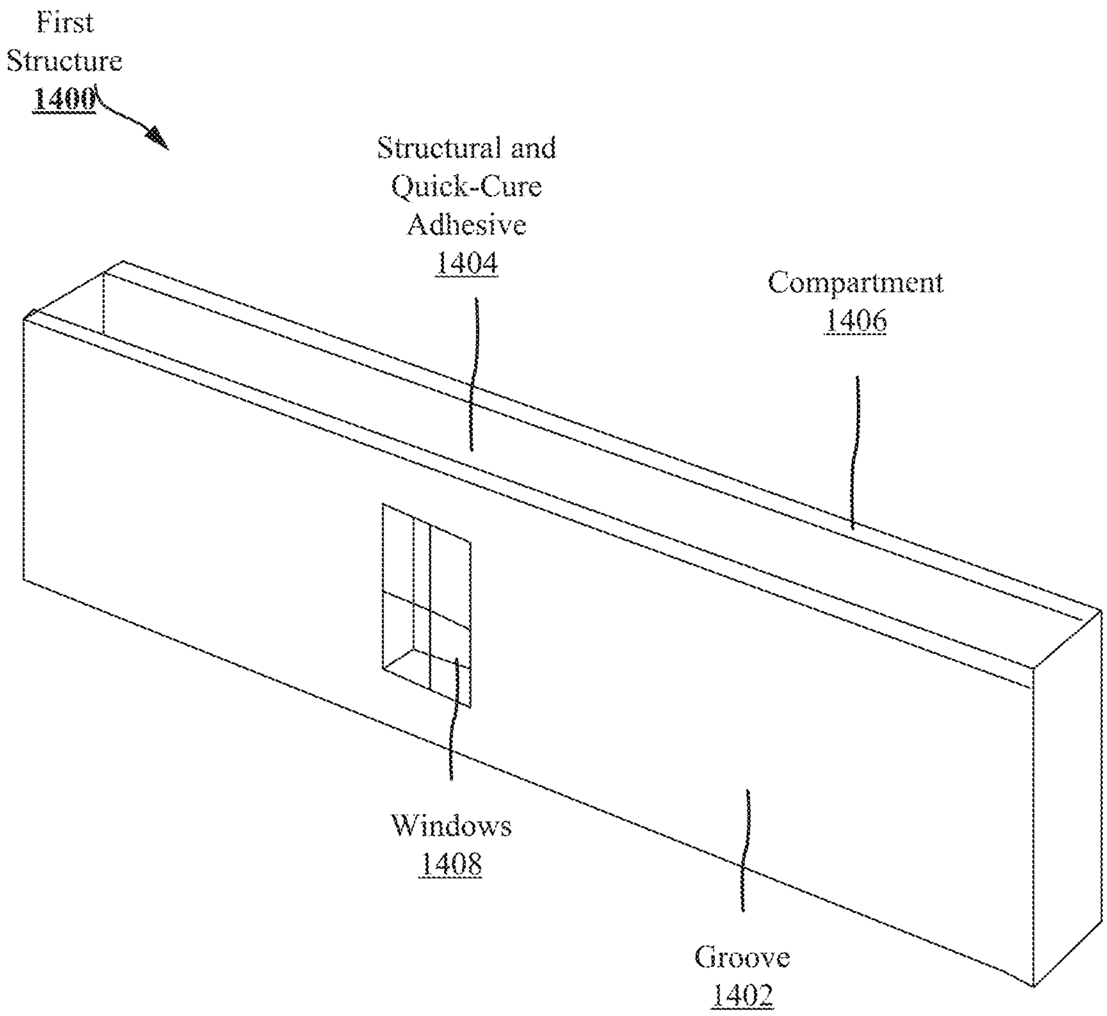
FIG. 14 illustrates an example of a first structure including a groove containing a single, structural and quick-cure adhesive, such as various suitable resin compositions described herein.

In another example, the structural adhesive and the quick-cure adhesive may be a single adhesive. That is, the structural adhesive and quick-cure adhesive may be combined into one adhesive that cures at a first cure rate upon exposure to time or heating and that cures at a second cure rate faster than the first cure rate upon exposure to EM radiation (e.g. UV radiation). FIG. 14 illustrates an example of a first structure 1400 (e.g. first structure 723) including a groove 1402 (e.g. groove 902) containing a single, structural and quick-cure adhesive 1404. Unlike the example of FIG. 13, in this illustrated example, the structural and quick-cure adhesive may be contained in a single compartment 1406 within the groove. One or more windows 1408 (e.g. window 904) may be disposed at one or more locations to allow one or more portions of the structural and quick-cure adhesive to be exposed to EM radiation (e.g. UV radiation). As a result, the one or more portions of the structural and quick-cure adhesive exposed to the EM radiation may be cured at the faster, second cure rate, while the remainder of the adhesive that is not exposed to the EM radiation is cured at the slower, first cure rate.

Figure 15:
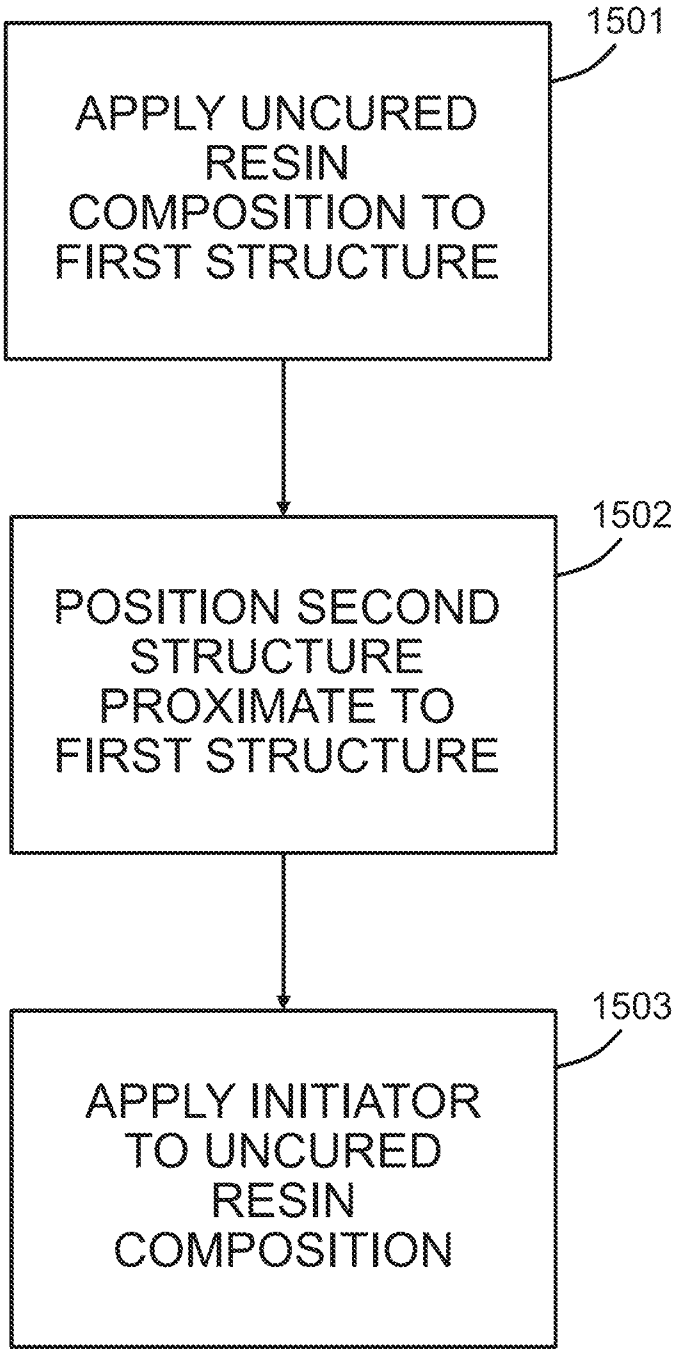
FIG. 15 illustrates an example method of assembly according to various embodiments.

FIG. 15 illustrates an example method of assembly according to various embodiments. The method may be used by an assembly system, such as fixtureless assembly system 700. The method can include applying (1501) an uncured resin composition to a first structure, such as first structure 723. The uncured resin can includes any suitable resin compositions described herein. The method can include positioning (1502) a second structure, such as second structure 725, proximate to the first structure. The method can further include applying (1503) the initiator to the uncured resin composition to cure the uncured resin composition, such that the cured resin composition adheres the first structure to the second structure.

In various embodiments, applying the uncured resin composition to the first structure is performed before positioning the second structure proximate to the first structure. For example, the embodiments described above with reference to FIGS. 9-14 describe a first structure, such as first structure 723, that includes a groove, such as second compartment 1310 of groove 1302 (or groove 1402), in which the uncured adhesive composition may be applied, e.g., deposited by a quick-cure adhesive robot, such as UV robot 715. In this case, for example, the assembly process described above with respect to FIGS. 8A-I may be slightly different. Specifically, instead of applying uncured resin composition as strips after the first and second structures have been positioned proximate to each other, the UV robot can apply the uncured resin composition in a groove of the first structure, such as compartment 1310 or groove 1402, before the second structure is positioned proximate to the first structure. The first and second structures can then be positioned proximate to each other, with the tongue, such as tongue 1002, which is part of the second structure, can be positioned in the groove. Once the first and second structures are proximate to each other, and the tongue (e.g., 1002) is positioned in the groove (e.g., 1310), the UV robot can apply the initiator (e.g., UV light) to cure the resin composition. As stated above, applying the uncured resin composition in this way may prevent, e.g., the resin from dripping or sliding off the surface of structures (as it might be more likely to do in the assembly example using strips of adhesive applied on the surface of the structures after they are brought into proximity).

However, it is noted that in various embodiments, the order of 1501 and 1502 can be switched. For the sake of brevity, another figure with the order switched is not shown. Rather, it should be understood that the order can be switched, and a method with the order switched is supported by the method shown in FIG. 15 and this simple explanation. For example, in the description above with respect to the assembly process of FIGS. 8A-I, the first and second structures may be first brought into proximity with each other, and then adhesive strips may be applied. Various embodiments may use this or similar assembly processes together with various suitable resin compositions disclosed herein.

The various techniques described herein may be performed by any suitable means capable of performing the operations, such as various hardware and/or software component(s). A hardware component may include circuitry configured to perform one or more techniques described herein.

The methods disclosed herein comprise one or more steps or actions for achieving the described method. The method steps and/or actions may be interchanged with one another without departing from the scope of the claims. In other words, unless a specific order of steps or actions is explicitly specified as being required, the order and/or use of specific steps and/or actions may be modified without departing from the scope of the claims.

Although particular aspects are described herein, many variations and permutations of these aspects fall within the scope of this disclosure. Although some potential benefits and advantages of aspects of this disclosure may be mentioned, the scope of this disclosure is not limited to particular benefits, advantages, uses, or objectives.

The claims are not limited to the precise configuration and components illustrated herein. Various modifications, changes and variations may be made in the arrangement, operation and details of the methods and apparatus described above without departing from the scope of the claims. Combinations such as “at least one of A, B, or C”; “one or more of A, B, or C”; “at least one of A, B, and C”; “one or more of A, B, and C”; and “A, B, C, or any combination thereof” include any combination of A, B, and/or C, and may include multiples of A, multiples of B, or multiples of C. Specifically, combinations such as “at least one of A, B, or C”; “one or more of A, B, or C”; “at least one of A, B, and C”; “one or more of A, B, and C”; and “A, B, C, or any combination thereof” may be A only, B only, C only, A and B, A and C, B and C, or A and B and C, where any such combinations may contain one or more member or members of A, B, or C. All structural and functional equivalents to the various aspects described throughout this disclosure that are known or later come to be known to those of ordinary skill in the art are expressly incorporated herein by reference and are intended to be encompassed by the claims.

The previous description is provided to enable any person skilled in the art to practice the various aspects described herein. Various modifications to these exemplary embodiments presented throughout this disclosure will be readily apparent to those skilled in the art, and the concepts disclosed herein may be applied to aluminum alloys. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

In various embodiments, a resin composition can include an isocyanurate component bonded to an acrylate component and an electromagnetic radiation initiator component, wherein the resin composition includes a pre-cured state or a post-cured state, wherein the resin composition is curable by electromagnetic radiation in the pre-cured state, wherein the resin composition is cured in the post-cured state. The electromagnetic radiation may include one or more wavelengths in the ultraviolet spectrum. The electromagnetic radiation initiator component may be a photoinitiator component. The photoinitiator component may comprise at least one ultraviolet light photoinitiator component. The photoinitiator component may be reactive to one or more electromagnetic waves in the ultraviolet spectrum. The photoinitiator component may be a member selected from the group consisting of any example photoinitiator component disclosed herein and any combination thereof. The photoinitiator component may be configured to generate binding agents in response to a reaction with the electromagnetic radiation, wherein the binding agents are configured to bind with the acrylate component. The binding agents may include one or more of: free radicals, acids, or a combination thereof. The isocyanurate component bonded with the acrylate component is represented by the formula:

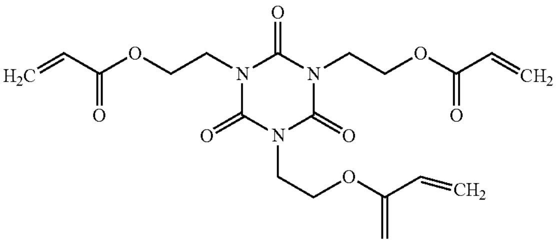 [SMILES: C=CC(=C)OCCn1c(=O)n(CCOC(=O)C=C)c(=O)n(CCOC(=O)C=C)c1=O]

The isocyanurate component bonded with the acrylate component conjunctively may constitute at least thirty percent by weight of the total weight of the resin composition in the pre-cured state. The isocyanurate component bonded with the acrylate component conjunctively may constitute at least thirty percent by weight of the total weight of the resin composition in the post-cured state. The acrylate component may comprise a methacrylate component. The pre-cured state of the resin composition may include a first number of unbonded components, wherein the post-cured state of the resin composition may include a second number of unbonded components, wherein the first number is greater than the second number. The electromagnetic radiation initiator component may be in a first state in the pre-cured state of the resin composition, and wherein the electromagnetic radiation initiator component is in a second state in the post-cured state of the resin composition. The first state may be a pre-activation state and the second state is a post-activation state. A first amount of the electromagnetic radiation initiator component may be in a pre-activation state in the pre-cured state of the resin composition, and a second amount of the electromagnetic radiation initiator component may be in the pre-activation state in the post-cured state of the resin composition, wherein the first amount is greater than the second amount.

The resin composition may further comprise one or more of: a filler component; a reactive monomer component; an adhesion promoter component; a flow modifier component; a toughener component; an antioxidant component; or a dye component. Any of these additional components may constitute 0.1 percent to 70 percent by weight of the total weight of the resin composition in the pre-cured state and/or the post-cured state. The filler component may be configured to impart one or more properties to the resin composition. The one or more properties may include viscosity, tensile strength, brittleness, or any combination thereof. The filler component may be configured to increase the viscosity of the resin composition in the pre-cured state, increase the tensile strength of the resin composition in the post-cured state, reduce crack propagation in the resin composition in the post-cured state, or any combination thereof. The filler component may be a member selected from the group consisting of: any example filler component disclosed herein and any combination thereof.

The reactive monomer component may be configured to impart one or more properties to the resin composition. The one or more properties may include a speed at which the resin composition is curable in the pre-cured state, hardness of the resin composition in the post-cured state, increasing or decreasing the dissolvability of one or components of the resin composition into the resin composition, or any combination thereof. The reactive monomer component may be configured to decrease or increase a speed at which the resin composition is curable in the pre-cured state, increase or decrease a hardness of the resin composition in the post-cured state, increase or decrease the dissolvability of one or components of the resin composition into the resin composition, or any combination thereof. The reactive monomer component may be a member selected from the group consisting of: any example reactive monomer component disclosed herein and any combination thereof.

The adhesion promoter component may be configured to impart one or more properties to the resin composition. The one or more properties may include enablement of a bond between the resin composition and a material. The bond may be a physical bond, a chemical bond, or a combination thereof. The material may be metal, plastic, glass, ceramic, a composite, animal tissue, or a combination thereof. The adhesion promoter component may be configured to enable a bond between the resin composition and a material. The adhesion promoter component may be a member selected from the group consisting of: any example adhesion promoter component disclosed herein and any combination thereof.

The flow modifier component may be configured to impart one or more properties to the resin composition in the pre-cured state. The one or more properties may include interaction between two or more components of the resin composition. The two or more components may include the filler component and any other component of the resin composition. The one or more properties may include enablement of the filler component to impart one or more properties to the resin composition.

The flow modifier component may be configured to interact between two or more components of the resin composition in the pre-cured state. The flow modifier component may be a member selected from the group consisting of: any example flow modifier component disclosed herein and any combination thereof.

The toughener component may be configured to impart one or more properties to the resin composition in the post-cured state. The one or more properties may include brittleness. The toughener component may be configured to reduce crack propagation in the resin composition in the post-cured state. The toughener component may be a member selected from the group consisting of: any example toughener component disclosed herein and any combination thereof.

The antioxidant component may be configured to impart one or more properties to the resin composition. The one or more properties may include resilience of the resin composition in the post-cured state. The one or more properties may include resilience of the resin composition in the post-cured state at or above a temperature. The temperature may be 20 °C. The antioxidant component may be configured to increase or decrease the resilience of the resin composition in the post-cured state at, above, or below a temperature. The antioxidant component may be a member selected from the group consisting of: any example antioxidant component disclosed herein and any combination thereof.

The dye component may be configured to impart one or more color properties to the resin composition. The one or more color properties may include one or more colors. The one or more colors may include a first color and a second color. The first color may be indicative of the resin composition being in the pre-cured state, and the second color may be indicative of the resin composition being in the post-cured state. The dye component may be configured to provide one or more color properties to the resin composition. The dye component may be a member selected from the group consisting of: any example dye component disclosed herein and any combination thereof.

The resin composition may have a tack free surface in the post-cured state.

The resin composition may be curable by electromagnetic radiation in the pre-cured state within a time period. The time period may be less than or equal to 60 seconds.

The resin composition may be bondable to a first material by electromagnetic radiation in the pre-cured state. The first material may include metal. The metal may include aluminum or aluminum alloy. The first material may be a coating on a second material. The first material may include plastic and the second material includes metal.

The resin composition in the pre-cured state may have a viscosity of 100-100,000,000 centipoise within a temperature range. The temperature range may include 5 °C-70 °C. The resin composition in the post-cured state may have a softening point at a temperature greater than or equal to 200 °C.

A cured resin composition may be prepared by a process comprising applying electromagnetic radiation to an uncured resin to generate the cured resin composition, wherein the uncured resin comprises a resin composition described in this disclosure.

In various embodiments, a method may comprise one or more techniques described in this disclosure.

A method may comprise applying an uncured resin composition to a first structure, wherein the uncured resin comprises a resin composition described in this disclosure, and applying electromagnetic radiation to the uncured resin composition to cure the uncured resin composition, wherein the cured resin composition adheres to the first structure. The method may further comprise assembling the first structure with a second structure, wherein applying the electromagnetic radiation to the uncured resin composition is performed after assembling the first structure with the second structure, and wherein the cured resin composition adheres to the first structure and the second structure. The first structure may include an animal tissue structure. The animal tissue structure may include a bone or a tooth.

The method may further comprise applying the uncured resin composition to a second structure, and assembling the first structure with the second structure, wherein the cured resin composition adheres to the first structure and the second structure.

While the foregoing is directed to aspects of the present disclosure, other and further aspects of the disclosure may be devised without departing from the basic scope thereof, and the scope thereof is determined by the claims that follow.

What is claimed is:

1. A resin composition comprising:

an acrylated component comprising an isocyanurate or a cyanurate component bonded to an acrylate or a methacrylate component via an R group, wherein the R group is independently selected from the group consisting of linear, branched, or cyclic divalent group selected from hydrocarbon residues having 1 to 12 carbon atoms, alkylene, arylene, oxyalkylene, oxyarylene, siloxane-alkylene, siloxane-arylene, ester, amine, glycol, imide, amide, urea, sulfide, a derivative or combination thereof, unsubstituted or substituted with one or more groups selected from hydrogen, halogen, amino, oximino, a substituted or unsubstituted alkyl, alkenyl, alkenyloxy, alkynyl, alkynyloxy, cycloaliphatic, cycloaliphatic-O—, aryl, aryloxy, heteroaryl, heteroaryloxy, heteroalicyclic, heteroalicyclicoxy group or a mixture thereof, and wherein an amount of the acrylated component in the resin composition is greater than 90 percent by weight of the resin composition; and an electromagnetic radiation initiator component, wherein the resin composition includes a pre-cured state or a post-cured state, wherein the resin composition is curable by electromagnetic radiation in the pre-cured state, wherein the resin composition is cured in the post-cured state.

2. The resin composition of claim 1, wherein the electromagnetic radiation includes one or more wavelengths in the ultraviolet spectrum.

3. The resin composition of claim 1, wherein the electromagnetic radiation initiator component is a photoinitiator component.

4. The resin composition of claim 3, wherein the photoinitiator component comprises at least one ultraviolet light photoinitiator component.

5. The resin composition of claim 3, wherein the photoinitiator component is reactive to one or more electromagnetic waves in the ultraviolet spectrum.

6. The resin composition of claim 3, wherein the photoinitiator component is configured to generate binding agents in response to a reaction with the electromagnetic radiation, wherein the binding agents are configured to bind with the acrylate component.

7. The resin composition of claim 6, wherein the binding agents includes one or more of: free radicals, acids, or a combination thereof.

8. The resin composition of claim 1, wherein the isocyanurate or the cyanurate component is bonded to the methacrylate component.

9. The resin composition of claim 1, further comprising:
a filler component;
a reactive monomer component;
an adhesion promoter component;
a flow modifier component;
a toughener component;
a peroxide;
an antioxidant component; or
a dye or pigment component.

10. A method comprising:
applying an uncured resin composition to a first structure, wherein the uncured resin comprises an isocyanurate or a cyanurate component bonded to an acrylate or a methacrylate component via an R group, wherein the R group is independently selected from the group consisting of linear, branched, or cyclic divalent group selected from hydrocarbon residues having 1 to 12 carbon atoms, alkylene, arylene, oxyalkylene, oxyarylene, siloxane-alkylene, siloxane-arylene, ester, amine, glycol, imide, amide, urea, sulfide, a derivative or combination thereof, unsubstituted or substituted with one or more groups selected from hydrogen, halogen, amino, oximino, a substituted or unsubstituted alkyl, alkenyl, alkenyloxy, alkynyl, alkyyloxy, cycloaliphatic, cycloaliphatic-O—, aryl, aryloxy, heteroaryl, heteryaryloxy, heteroalicyclic, heteroalicyclicoxy group or a mixture thereof, and wherein an amount of the acrylate component in the resin composition is greater than 90 percent by weight of the resin composition; and an electromagnetic radiation initiator component;
positioning a second structure proximate to the first structure; and
applying electromagnetic radiation to the uncured resin composition to cure the uncured resin composition, wherein the cured resin composition adheres the first structure to the second structure

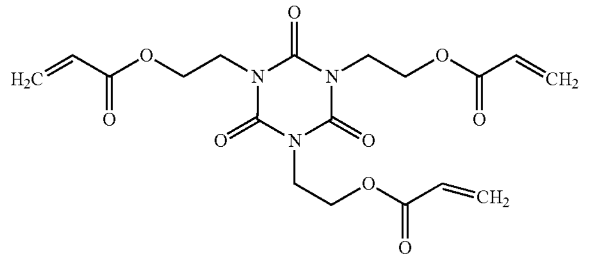 [SMILES: C=CC(=O)OCCn1c(=O)n(CCOC(=O)C=C)c(=O)n(CCOC(=O)C=C)c1=O]

11. He method of claim 10, wherein applying the uncured resin composition to the first structure is performed after positioning the second structure proximate to the first structure.

12. The method of claim 11, wherein applying the uncured resin composition to the first structure includes applying a strip of the uncured resin composition across the first and second structures.

13. The method of claim 10, wherein applying the uncured resin composition to the first structure is performed before positioning the second structure proximate to the first structure.

14. The method of claim 13, wherein applying the uncured resin composition to the first structure includes depositing the uncured resin in a groove of the first structure.

15. A method comprising:
applying an uncured resin composition to a first structure, wherein the uncured resin composition comprises a first isocyanurate component and a first bonding component bonded to the first isocyanurate component,
wherein the first bonding component comprises an R group,
wherein the R group is independently selected from the group consisting of linear, branched, or cyclic divalent group selected from hydrocarbon residues having 1 to 12 carbon atoms, alkylene, arylene, oxyalkylene, oxyarylene, siloxane-alkylene, siloxane-arylene, ester, amine, glycol, imide, amide, urea, sulfide, a derivative or combination thereof, unsubstituted or substituted with one or more groups selected from hydrogen, halogen, amino, oximino, a substituted or unsubstituted alkyl, alkenyl, alkenyloxy, alkynyl, alkylnyloxy, cycloaliphatic, cycloaliphatic-O—, aryl, aryloxy, heteroaryl, heteroaryloxy, heteroalicyclic, heteroalicyclicoxy; acyl, acyloxy group and a mixture thereof,
and an acrylate or a methacrylate component, wherein an amount of the acrylate component in the resin composition is greater than 90 percent by weight of the resin composition; and is configured to bond to a second bonding component that is bonded to a second isocyanurate component, the first bonding component being configured to bond to the second bonding component based upon an application of an electromagnetic radiation initiator to the resin composition, such that the first isocyanurate component is coupled to the second isocyanurate component;
positioning a second structure proximate to the first structure; and
applying the initiator to the uncured resin composition to cure the uncured resin composition, wherein the cured resin composition adheres the first structure to the second structure.

16. The method of claim 15, wherein applying the uncured resin composition to the first structure is performed after positioning the second structure proximate to the first structure.

17. The method of claim 16, wherein applying the uncured resin composition to the first structure includes applying a strip of the uncured resin composition across the first and second structures.

18. The method of claim 15, wherein applying the uncured resin composition to the first structure is performed before positioning the second structure proximate to the first structure.

19. The method of claim 18, wherein applying the uncured resin composition to the first structure includes depositing the uncured resin in a groove of the first structure.

20. The resin composition of claim 1, wherein the electromagnetic radiation includes visible light, infrared light, a non-light electromagnetic radiation source or any combination thereof.

21. The resin composition of claim 1, wherein the pre-cured state comprises a viscosity in a range of 100 centipoise to 100,000,000 centipoise within a temperature range of 5 °C to 70 °C.

22. The resin composition of claim 1, wherein the isocyanurate component comprises one or more isocyanurate components.

23. The resin composition of claim 1, wherein the acrylate component comprises one or more acrylate components, and wherein the isocyanurate component is bonded to the one or more acrylate components.

24. The resin composition of claim 23, wherein the R group comprises one or more R groups.

25. The resin composition of claim 24, wherein at least two R groups of the one or more R groups are the same.

26. The resin composition of claim 24, wherein each R group of the one or more R groups is bonded to a respective acrylate component of the one or more acrylate components.

27. The resin composition of claim 1, wherein the isocyanurate component comprises one or more isocyanurate components, wherein the acrylate component comprises one or more acrylate components, and wherein the one or more acrylate components are bonded to the one or more isocyanurate components.

28. The resin composition of claim 27, wherein the R group comprises one or more R groups and wherein each R group of the one or more R groups is bonded to a respective acrylate component of the one or more acrylate components.

* * * * *